United States Patent
Takebe

(10) Patent No.: US 6,356,314 B1
(45) Date of Patent: Mar. 12, 2002

(54) IMAGE SYNTHESIZING DEVICE AND IMAGE CONVERSION DEVICE FOR SYNTHESIZING AND DISPLAYING AN NTSC OR OTHER INTERLACED IMAGE IN ANY REGION OF A VCA OR OTHER NON-INTERLACED IMAGE

(75) Inventor: Makoto Takebe, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/380,811

(22) PCT Filed: Mar. 10, 1998

(86) PCT No.: PCT/JP98/00978

§ 371 Date: Sep. 9, 1999

§ 102(e) Date: Sep. 9, 1999

(87) PCT Pub. No.: WO98/40874

PCT Pub. Date: Sep. 17, 1998

(30) Foreign Application Priority Data

Mar. 10, 1997 (JP) .............................................. 9-070855
Sep. 18, 1998 (JP) .............................................. 9-253901

(51) Int. Cl.⁷ ............................ H04N 5/45; H04N 5/445
(52) U.S. Cl. ........................ 348/564; 348/567; 348/568; 348/584; 348/598
(58) Field of Search ................................ 348/563, 564, 348/565, 567, 568, 584, 586, 588, 598, 448; H04N 5/445, 5/45

(56) References Cited

U.S. PATENT DOCUMENTS 5,481,315 A * 1/1996 Matsunaga .................. 348/565

5,978,041 A * 11/1999 Masuda ....................... 348/563

FOREIGN PATENT DOCUMENTS

| JP | 63-123284 | 5/1988 |
| JP | 1-26891 | 1/1989 |
| JP | 4-56891 | 2/1992 |
| JP | 4-180373 | 6/1992 |

* cited by examiner

Primary Examiner—Sherrie Hsia
(74) Attorney, Agent, or Firm—Varndell & Varndell, PLLC

(57) ABSTRACT

Provided is an image synthesizing device with which a specific display region P of a sub-image is synthesized and displayed within a specific display region Q of a main image displayed on a display 9, wherein this image synthesizing device comprises a frame memory with which the data in the synthesis and display region P out of the sub-image data is continuously stored in the order of input, after which the stored sub-image data is read out when the scanning address of the main image data is an address corresponding to the display region Q, and a selector 4 with which the main image data displayed on the display 9 and the sub-image data continuously and sequentially read out from the frame memory are inputted, and when the scanning address of the main image data is an address corresponding to the display region Q, the selected channel is switched from main image data to the sub-image data and outputted to the display 9 where this sub-image data is displayed, which allows the capacity of the frame memory used for image synthesis to be smaller, and allows the sub-image to be reduced or magnified at the desired scale factor.

13 Claims, 18 Drawing Sheets

OVERALL VIEW

MAIN AND SUB-IMAGE SYNTHESIS SCREEN VIEW

VIEW OF EXTRACTION REGION
USED FOR SUB-IMAGE SYNTHESIS

HOW SUB-IMAGES ARE STORED IN FRAME MEMORY

FIG.15 SUB-IMAGE WRITE CONTROL TIME CHART

WRITE CONTROL SERIES IN CONTROLLER 10

IMAGE SYNTHESIZING DEVICE AND IMAGE CONVERSION DEVICE FOR SYNTHESIZING AND DISPLAYING AN NTSC OR OTHER INTERLACED IMAGE IN ANY REGION OF A VCA OR OTHER NON-INTERLACED IMAGE

TECHNICAL FIELD

This invention relates to an image synthesizing device with which an NTSC or other such interlaced image can be synthesized and displayed in full, magnified, or reduced scale in any region of a VCA or other such non-interlaced image.

BACKGROUND ART

An interlaced image of the NTSC system, such as a CCD camera, has odd-numbered fields and even-numbered fields, and one frame (one screen) of image is made up of odd-numbered field images and even-numbered field images. Image scanning is performed alternately for the odd-numbered fields and even-numbered fields in field units, and one screen of image is displayed in two scans.

In contrast, with non-interlaced scanning such as VGA, there is no skipping as above, and one screen is displayed in a single scan, with the displayed image having less flicker than an interlaced scan.

Thus, since there are two different scanning methods for displaying, numerous techniques have been proposed in the past for converting interlaced signals into non-interlaced signals and displaying these in part of a non-interlaced display screen or over the entire region.

One such prior art is Japanese Patent Application Laid-Open No. 5-114026. With this prior art, there is a main image memory that holds main image data (non-interlaced signals), and a sub-image memory of the same capacity as the main image memory that stores sub-image data (interlaced signals) at an address corresponding to this frame memory. When part of the region of the sub-image stored in the sub-image memory is to be synthesized and displayed in part of the main image display region, the sub-image is read out from the sub-image memory when the scanning address of the sub-image memory becomes a specific address corresponding to the synthesis and display region, and when the scanning address of the main image becomes the address at which the sub-image is to be displayed, the display data outputted to the CRT display is switched to the sub-image data that has been read out from the main image data, thereby synthesizing the sub-image data on the main image screen.

Specifically, with this prior art, a sub-image memory of the same capacity as the main image memory capable of storing all sub-images is readied, and the data read-out timing from this sub-image memory is controlled so as to synthesize part of the sub-image on the main image display screen.

Because this prior art is thus provided with both a frame memory for storing main image data and an image memory for storing sub-image data of the same memory capacity as this frame memory, twice the frame memory capacity is required. Consequently, the memory mounting surface area is larger when the circuit is configured, making the overall device larger more expensive.

Another problem with this prior art is that when the sub-image is reduced or magnified in scale, the scale factor is restricted to powers of two, such as "1/2m" or "2m," so the scale factor cannot be set in any way desired, which means that this approach is unsatisfactory when the goal is to reduce or magnify a sub-screen precisely to the desired size.

Also, with this prior art, the sub-image memory stores data by an address system in which the data for each pixel is in a one-to-one correspondence with the X-Y address of the CRT display device. Specifically, if the CRT display device is 640 dots wide by 480 dots high, and a one-dot image is one byte, then the sub-image data is stored in memory space as shown in FIG. 10.

Since 640 dots of image data corresponds to 640 bytes, each horizontal synchronous scanning line corresponds to 640 bytes out of the 1024 bytes made up of the lower 10 bits of the memory address. Also, since 480 lines are required in the vertical direction, 480 of the upper 9 bits of the address (512) end up being allocated.

However, with a sub-image memory configured in this way, an area A occupied by the remaining 384 bytes for every horizontal synchronous scanning line of the 480 lines, and an area B occupied by the remaining 32 lines within the upper address space of the 512 lines are unused, so that a number of memories greater than the required memory capacity are required, which is disadvantageous in terms of both cost and mounting surface area.

The present invention was conceived in light of the above problems, and an object thereof is to provide an image synthesizing device with which the image data memory capacity needed for synthesis of main images and sub-images can be decreased, and the reduction or magnification scale factor of the sub-images can be set as desired.

Another object of the present invention is to provide an image conversion device and an image conversion method with which costs can be lowered by allowing non-interlaced signals to be converted into non-interlaced signals using a single frame memory.

Yet another object of the present invention is to provide an image synthesizing device with which costs can be lowered by allowing a specific extraction region of an interlaced scan sub-image to be synthesized and displayed in a specific display region on the display screen on which a non-interlaced scan main image is displayed, using a single serial access memory.

DISCLOSURE OF THE INVENTION

The first invention is an image synthesizing device with which a specific display region P of a sub-image is synthesized and displayed within a specific display region Q of a main image displayed on a display, comprising: a frame memory that continuously stores, in an inputted order, only that data out of sub-image data that is within the display region P to be synthesized, and then reads out the stored sub-image data in the inputted order when a scanning address of the main image data is an address corresponding to the display region Q of the main image; and a selector that inputs the main image data displayed on the display and the sub-image data sequentially read out from the frame memory, and switches a selected channel from this main image data to the sub-image data and outputs it to the display, so that this sub-image data is displayed, when the scanning address of the main image data is an address corresponding to the display region Q of the main image.

Once the scanning address corresponds to the display region in which the sub-image is to be synthesized at the time of sub-image input, the sub-image data is written continuously to the frame memory in the order in which it was inputted, after which the sub-image data is continuously read out from the frame memory in this input order corresponding to the display address when the main image data is displayed in the region Q where the main image is synthesized and displayed, and the main image data is switched to this read sub-image data and displayed on the display, which results in the sub-image being displayed in full scale. In this case, the sub-image may be either interlaced or non-interlaced. Thus, with this invention of claim 1, the sub-images are stored in the continuous address space of the frame memory, so the capacity of the frame memory can be decreased.

The second invention is an image synthesizing device with which a specific display region P of a sub-image is synthesized and displayed within a specific display region Q of a main image displayed on a display, comprising: a first frame memory that continuously stores, in an inputted order, data of odd-numbered fields within the display region P to be synthesized out of interlaced sub-image data, and then reads out the stored sub-image data in the inputted order when a scanning address of the main image data is an address of an odd-numbered line corresponding to the display region Q of the main image; a second frame memory that continuously stores, in the inputted order, data of even-numbered fields within the display region P to be synthesized out of the interlaced sub-image data, and then reads out the stored sub-image data in the inputted order when the scanning address of the main image data is an address of an even-numbered line corresponding to the display region Q of the main image; and a selector that inputs the main image data displayed on the display and the sub-image data sequentially read out from the first frame memory or the second frame memory, and switches a selected channel from this main image data to the sub-image data and outputs it to the display, so that this sub-image data is displayed in full scale, when the scanning address of the main image data is an address corresponding to the display region Q of the main image.

Once the scanning address corresponds to the display region in which the sub-image is to be synthesized at the time of sub-image input, the sub-image data of odd-numbered fields is continuously written to the first frame memory (FIFO serial memory) in the inputted order, and the sub-image data of even-numbered fields is continuously written to the second frame memory (FIFO serial memory) in the inputted order. After this, when the main image data is displayed in the synthesis and display region Q, the sub-image data is continuously read out in the input order from the first frame memory for odd-numbered lines or from the second frame memory for even-numbered lines according to the display address, and the main image data is switched to this read sub-image data and displayed on the display. As a result, an interlaced sub-image is synthesized in full scale and displayed in the display region Q of the main image. Therefore, only the sub-image data to be synthesized is stored in the frame memory, and at the time of synthesis the main image data is switched to this stored sub-image data, so the capacity of the frame memory can be decreased.

The third invention is the image synthesizing device according to first or second invention, wherein, when the display region P of the sub-image is reduced to a specific scale factor and synthesized and displayed in the display region Q of the main image, the frame memory thins the lines in a vertical direction to a specific scale factor when the scanning address of the sub-image data at a time of sub-image data input corresponds to the display region P, and stores the sub-image data which have been inputted after being horizontally thinned out to the specific scale factor when a scanning address in the horizontal direction corresponds to the display region P for each of these thinned-out lines, after which the thinned-out and stored sub-image data is continuously read out in the order of the input when the scanning address of the main image data corresponds to the display region Q of the main image.

When the display region P of the sub-image is reduced to a specific scale factor and synthesized and displayed in the display region Q of the main image, the lines in the vertical direction are thinned out to the specific scale factor only for data corresponding to the display region P of the sub-image data, and each of these thinned-out lines is thinned out to the specific scale factor in the horizontal direction and continuously written to the frame memory, after which, when the main image data synthesis and display region is displayed, the stored sub-image data is read out from the frame memory in the input order, and the main image data is switched to this read sub-image data and displayed, so that the sub-image is synthesized and displayed in reduced scale. Here, since only the sub-image data to be synthesized is reduced to the desired scale factor and stored in the frame memory, the capacity of the frame memory can be decreased, and since reduction to any scale factor is possible, the scale factor required by the user can be achieved.

The fourth invention is the image synthesizing device according to first or second invention wherein a line buffer FIFO is provided with which, after the sub-image data read from the frame memory has been inputted and then stored in the order of this input, this stored sub-image data is read out in the order of the input; when the display region P of the sub-image is magnified to a specific scale factor and synthesized and displayed in the display region Q of the main image, the frame memory continuously stores only that data out of the sub-image data that is within the display region P in the inputted order, after which one line of data out of the stored sub-image data is read out at a cycle reduced to the specific scale factor with respect to a frequency of a horizontal dot clock of the main image one line at a time for a specific number of lines corresponding to the specific scale factor when the scanning address of the main image data corresponds to the display region Q of the main image; and the line buffer FIFO stores this one line of read sub-image data synchronously with the horizontal dot clock of the main image in the inputted order, after which the stored one line of sub-image data is repeatedly outputted for each line in the input order for the remaining lines of the specific lines corresponding to the specific scale factor of the display region Q of the main image data.

Only that data corresponding to the region in which the sub-image data is to be synthesized is continuously written to the frame memory in input order, and then when the synthesis and display region of the main image data is displayed, the main image data is switched so that the stored sub-image data is synthesized and displayed while being magnified horizontally and vertically as follows. The display is magnified horizontally by reading out from the frame memory one line of the stored sub-image data at a cycle reduced to a specific magnification factor for the frequency of the horizontal synchronization signal of the main image one line at a time for a specific number of lines corresponding to the above-mentioned magnification factor. Along with this, one line of this magnified sub-image data is written to the line buffer FIFO. For the rest of the above-mentioned specific number of lines, the sub-image stored in this line buffer FIFO is continuously read out in input order for each line, and repeatedly displayed on the display for every line. As a result, the sub-image can be displayed magnified by the above-mentioned specific scale factor in the horizontal and vertical directions. Therefore, only the sub-image data to be synthesized is stored in the frame memory, after which it is displayed magnified to the desired scale factor, so the capacity of the frame memory can be decreased, and it is possible to magnify to any scale factor, which allows the scale factor requirements of the user to be satisfied.

The fifth invention is the image synthesizing device according to any of first to four invention, wherein the selector 4 inputs the main image data that has undergone A/D conversion without going through a memory, switches it with the sub-image data to be synthesized, and outputs it for display on the display.

There is no need for a memory for storing the main image data used for image synthesis, and the main image data is switched with the sub-image data to be synthesized, which is outputted directly to the display, so the memory of the image data can be smaller.

The sixth invention is the image synthesizing device according to fourth invention, wherein the line buffer FIFO stores one line of the sub-image data read from the frame memory at a cycle reduced to the specific scale factor with respect to the frequency of the horizontal dot clock of the main image in the inputted order, after which one line of the stored sub-image data is read out at a cycle reduced to the specific scale factor with respect to the frequency of the horizontal dot clock of the main image in the inputted order for the remaining lines of the specific lines corresponding to the specific scale factor of the display region of the main image data, and is repeatedly outputted for each line.

Only that data corresponding to the display region where the sub-image data is to be synthesized is continuously written to the frame memory in input order, and then when the synthesis and display region of the main image data is displayed, the main image data is switched so that the stored sub-image data is synthesized and displayed while being magnified horizontally and vertically as follows. The display is magnified horizontally by reading out from the frame memory one line of the stored sub-image data at a cycle reduced to a specific magnification factor for the frequency of the horizontal synchronization signal of the main image one line at a time for a specific number of lines corresponding to the above-mentioned magnification factor. Along with this, this read sub-image data is written to the line buffer FIFO in full scale, that is, at a cycle reduced to the above-mentioned scale factor just as it was read out from the above-mentioned frame memory. Then, for the rest of the above-mentioned specific number of lines, the sub-image data is continuously read out in input order from this line buffer FIFO and displayed magnified at a cycle reduced to the above-mentioned scale factor for the frequency of the horizontal synchronization signal of the main image, and this is repeated for every line. As a result, the sub-image can be displayed magnified by the above-mentioned specific scale factor in both the horizontal and the vertical directions. Therefore, only the sub-image data to be synthesized is stored in the frame memory, after which it is displayed magnified to the desired scale factor, so the capacity of the frame memory can be decreased. Also, because it is stored still in full scale in the line buffer FIFO, and it is magnified to the specified scale factor during read-out, the memory capacity of the line buffer FIFO can also be decreased, which allows the scale factor requirements of the user to be satisfied.

The seventh invention is an image conversion device which converts interlaced scan image signals composed of odd-numbered fields and even-numbered fields into non-interlaced scan image signals, comprising: one frame memory with which write and read operations can be performed asynchronously and which stores inputted interlaced scan image signals; first write control means for storing image signals of the lines of one of the fields out of the interlaced scan image signals, corresponding to an order of the lines in the one field, in an intermittent address region in which an origin is a leading address of the frame memory emptied for each address region corresponding to one line of image data; second write control means for storing image signals of the lines of the other field out of the interlaced scan image signals, corresponding to an order of the lines in the other field, in empty address regions formed between the intermittent address regions of the frame memory; and read control means for reading, in an address order from the leading address, the interlaced signals stored in the order of non-interlaced scan lines in the continuous address region of the one frame memory by the first and second write control means; and wherein the interlaced signals are converted into non-interlaced signals through the one frame memory.

First, the interlaced image of one field is stored in alternating address regions of the frame memory, and then the interlaced image of the other field is stored in the empty regions between the above-mentioned alternating address regions, and as a result an interlaced image is stored in the line order of the non-interlaced scan in the continuous address region of the frame memory. Therefore, reading this stored image in the address order results in the interlaced signals being converted into non-interlaced signals. Therefore, with this invention, interlaced signals can be converted into non-interlaced signals using only a single frame memory, which reduces the cost of the device and is also advantageous in terms of mounting surface area.

The eight invention is an image conversion method in which interlaced scan image signals composed of odd-numbered fields and even-numbered fields are converted into non-interlaced scan image signals through one frame memory, comprising: a first step of storing image signals of lines of one of the fields out of the interlaced scan image signals, corresponding to an order of the lines in the one field, in an intermittent address region in which an origin is a leading address of the frame memory emptied for each address region corresponding to one line of image data; a second step of storing image signals of lines of the other field out of the interlaced scan image signals, corresponding to an order of lines in the other field, in empty address regions formed between the intermittent address regions of the frame memory; and a third step of reading, in an address order from the leading address, the interlaced signals stored in the one frame memory.

First, the interlaced image of one field is stored in alternating address regions of the frame memory, and then the interlaced image of the other field is stored in the empty regions between the above-mentioned alternating address regions, and as a result an interlaced image is stored in the line order of the non-interlaced scan in the continuous address region of the frame memory. Therefore, reading this stored image in the address order results in the interlaced signals being converted into non-interlaced signals. With this invention, interlaced signals can be converted into non-interlaced signals using only a single frame memory, which reduces the cost of the device and is also advantageous in terms of mounting surface area.

The ninth invention is an image conversion device which converts interlaced scan image signals composed of odd-numbered fields and even-numbered fields into non-interlaced scan image signals, comprising: one serial access memory with which write and read operations can be performed asynchronously and which sequentially stores interlaced scan image signals in an address region incremented synchronously with inputted clock signals; write clock formation means for extracting control-use synchronization signals from inputted interlaced scan image signals and forming write-use clock signals with respect to the serial access memory on the basis of the extracted signals; high-speed clock signal generation means for generating high-speed clock signals with a higher frequency than the write-use clock signals; first write control means for storing image data of one of the fields in an intermittent address region of the serial access memory corresponding to an order of lines in the one field by alternately executing a first operation, in which one line of interlaced scan image data is written while the write address of the serial access memory is incremented synchronously with the write-use clock signals when image data of one of the fields of the interlaced scan image signals has been inputted, and a second operation, in which the write address of the serial access memory is incremented by an amount equal to the address region corresponding to one line of image data synchronously with the high-speed clock signals without data writing being performed, with a leading address of the serial access memory serving as an origin; second write control means for storing, corresponding to an order of lines in the other field, image data of the other field in empty address regions formed between the address regions where the image of the lines of the one field of the serial access memory is stored by alternately executing a third operation, in which one line of interlaced scan image data is written while the write address of the serial access memory is incremented synchronously with the write-use clock signals when image data of the other field of the interlaced scan image signals has been inputted, and a fourth operation, in which the write address of the serial access memory is incremented by an amount equal to the address region corresponding to one line of image data synchronously with the high-speed clock signals without data writing being performed, with an address advanced by an address region corresponding to one line of image data from the leading address serving as the origin; and read control means for reading, in the address order from the leading address, the interlaced scan image data stored in the serial access memory by the first and second write control means; and wherein interlaced signals are converted into non-interlaced signals through the one serial access memory.

First, the required image data of one field of interlaced scan image signals is stored in alternating address regions of the serial access memory, and then the required image data of the other field is stored in the empty regions between the above-mentioned alternating address regions, and as a result interlaced scan image data is stored in the line order of the non-interlaced scan in the continuous address region of the serial access memory. Therefore, reading this stored image in the address order results in the interlaced signals being converted into non-interlaced signals. With this invention, one frame of interlaced image signals can be stored in a single serial access memory, which reduces the number of serial access memories to one and allows the memory storage region to be utilized more effectively.

The tenth invention is an image synthesizing device with which a sub-image included in a specific extraction region of an interlaced scan sub-image composed of odd-numbered fields and even-numbered fields is synthesized and displayed within a specific display region on a display screen on which a non-interlaced scan main image is displayed, comprising: one serial access memory with which write and read operations can be performed asynchronously and which sequentially stores sub-image signals in an address region which is advanced synchronously with inputted clock signals; write clock formation means for extracting control-use synchronization signals from inputted sub-image signals and forming write-use clock signals with respect to the serial access memory on the basis of the extracted signals; high-speed clock signal generation means for generating high-speed clock signals with a higher frequency than the write-use clock signals; first write control means for storing the image data to be displayed in the display region of one of the fields out of the sub-image signals in an intermittent address region of the serial access memory corresponding to an order of lines in the one field by alternately executing a first operation, in which one line of data to be displayed in the display region of the one field is written while the write address of the serial access memory is incremented synchronously with the write-use clock signals when an image of the one field has been inputted and when the sub-image included in the specific extraction region has been inputted, and a second operation, in which the write address of the serial access memory is incremented by an amount equal to the address region corresponding to one line of sub-image data to be displayed in the display region synchronously with the high-speed clock signals without data writing being performed, with a leading address of the serial access memory serving as an origin; second write control means for storing, corresponding to an order of lines in the other field out of the sub-image signals, the image data to be displayed in the display region of the other field in empty address regions formed between the address regions where the image of the lines of the one field of the serial access memory is stored by alternately executing a third operation, in which one line of data to be displayed in the display region of the other field is written while the write address of the serial access memory is incremented synchronously with the write-use clock signals when an image of the other field has been inputted and when the sub-image included in the specific extraction region has been inputted, and a fourth operation, in which the write address of the serial access memory is incremented by an amount equal to the address region corresponding to one line of sub-image data to be displayed in the display region synchronously with the high-speed clock signals without data writing being performed, with an origin address being an address advanced from the leading address by an amount equal to the address region corresponding to one line of image data to be displayed in the display region; read control means for reading, in the address order from the leading address, the sub-image data stored in the serial access memory by the first and second write control means when the scanning address of the main image is an address corresponding to the specific display region; and switching means for selecting the main image when the scanning address of the main image is not an address corresponding to the specific display region, and selecting and outputting the sub-image outputted from the serial access memory when the scanning address of the main image is an address corresponding to the specific display region.

In the course of the synthesis and display of a sub-image included in a specific extraction region out of interlaced scan sub-images composed of odd-numbered fields and even-numbered fields in a specific display region on a display screen on which a non-interlaced scan main image is displayed, first, the required image data of one field is stored in alternating address regions of the serial access memory, and then the required image data of the other field is stored in the empty regions between the above-mentioned alternating address regions, and as a result a sub-image is stored in the line order of the non-interlaced scan in the continuous address region of the serial access memory. Therefore, reading this stored sub-image in the address order, switch it to the main image, and outputting this to the display allows a sub-image to be synthesized with the main image. With this invention, one frame of interlaced image signals can be stored in a single serial access memory, which reduces the number of serial access memories to one and allows the memory storage region to be utilized more effectively. Also, because the interlaced image signals are stored in a continuous address region, when they are synthesized into a main image, the address control performed for this read-out is simpler.

The eleventh invention is such that a sub-image included in a specific extraction region out of an interlaced scan sub-image composed of odd-numbered fields and even-numbered fields will be reduced and displayed in part of the region on a display screen where a non-interlaced scan main image is displayed, and adds to the structure corresponding to fourth invention reduction factor setting means for setting a reduction factor of the sub-image; and display region setting means for setting a reduction of the display region in which the sub-image is displayed on the display screen according to the reduction factor set by the reduction factor setting means; wherein the first write control means, in a course of the execution of the first operation, thins the sub-image of one of the fields included in the specific extraction region in a main scanning direction and a sub-scanning direction according to the set reduction factor, and in a course of the execution of the second operation, increments the write address of the serial access memory by an amount equal to the address region corresponding to one line of reduced sub-image data to be displayed in the display region; the second write control means, in a course of the execution of the third operation, thins the sub-image of the other field included in the specific extraction region in the main scanning direction and the sub-scanning direction according to the set reduction factor, and in a course of the execution of the fourth operation, increments the write address of the serial access memory by an amount equal to the address region corresponding to one line of reduced sub-image data to be displayed in the display region, and alternately executes these third and fourth operations, with the origin being an address advanced from the leading address by an amount equal to the address region corresponding to one line of image data to be displayed in the display region; the read control means reads the sub-image data stored in the serial access memory by the first and second write control means in the address order from the leading address when the scanning address of the main image is an address corresponding to the display region reduced by the display region setting means; and the switching means selects the main image when the scanning address of the main image is not an address corresponding to the display region reduced by the display region setting means, and selects and outputs the sub-image outputted from the serial access memory when the scanning address of the main image is an address corresponding to the display region reduced by the display region setting means.

The timing at which data is written to the serial access memory is controlled according to the reduction factor, and as a result the sub-image of one field reduced according to the reduction factor is stored in alternating address regions of the serial access memory, and the sub-image of the other field reduced according to the reduction factor is stored in the empty spaces between the above-mentioned alternating address regions, and as a result, a reduced sub-image is stored in the order of the lines of the non-interlaced scan in the continuous address region of the serial access memory. Therefore, a reduced sub-image can be synthesized on the main image screen by reading out this stored sub-image in the address order, switching it to the main image, and displaying this on the display. Thus, with this invention, a reduced sub-image can be synthesized on the main screen using only a single serial access memory, which reduces the number of serial access memories to one and allows the memory storage region to be utilized more effectively. Also, because the reduced interlaced image signals are stored in a continuous address region, when they are synthesized into a main image, the address control performed for this read-out is simpler.

The twelfth invention is an image conversion device which converts interlaced scan image signals composed of odd-numbered fields and even-numbered fields into non-interlaced scan image signals, comprising: one video memory with which write and read operations can be performed asynchronously and which sequentially stores interlaced scan image signals in an address region corresponding to inputted address signals; first write control means for storing the image data of one of the fields in an intermittent address region of the video memory corresponding to an order of lines in the one field by alternately executing a first operation, in which one line of interlaced scan image data is written while the write address of the video memory is advanced when image data of one of the fields of the interlaced scan image signals has been inputted, and a second operation, in which the write address of the video memory is skipped by an amount equal to the address region corresponding to one line of image data without data writing being performed, with a leading address of the video memory serving as an origin; second write control means for storing, corresponding to an order of lines in the other field out of the sub-image signals, the image data of the other field in empty address regions formed between the address regions where the image of the lines of the one field of the video memory is stored by alternately executing a third operation, in which one line of interlaced scan image data is written while the write address of the video memory is advanced when an image of the other field has been inputted, and a fourth operation, in which the write address of the video memory is skipped by an amount equal to the address region corresponding to one line of image data without data writing being performed, with the origin being an address advanced from the leading address by an amount equal to the address region corresponding to one line of image data; and read control means for reading, in the address order from the leading address, the interlaced scan image data stored in the video memory by the first and second write control means; and wherein interlaced signals are converted into non-interlaced signals through the one video memory.

An ordinary video memory whose address regions are specified by ordinary addressing is used as the memory for storing the interlaced scan image. Specifically, first, the required image data of one field of interlaced scan image signals is stored in alternating address regions of the video memory, and then the required image data of the other field is stored in the empty regions between the above-mentioned alternating address regions, and as a result interlaced scan image data is stored in the line order of the non-interlaced scan in the continuous address region of the video memory. Therefore, reading this stored image data in the address order allows the interlaced signals to be converted into non-interlaced signals. Thus, with this invention, one frame of interlaced image signals can be stored in a single video memory, which reduces the number of video memories to one and allows the memory storage region to be utilized more effectively.

The thirteenth invention is an image synthesizing device with which a sub-image included in a specific extraction region of an interlaced scan sub-image composed of odd-numbered fields and even-numbered fields is synthesized and displayed within a specific display region on a display screen on which a non-interlaced scan main image is displayed, comprising: one video memory with which write and read operations can be performed asynchronously and which sequentially stores sub-image signals in an address region corresponding to inputted address signals; first write control means for storing the image data to be displayed in the display region of one of the fields out of the sub-image signals in an intermittent address region of the video memory corresponding to an order of lines in the one field by alternately executing a first operation, in which one line of data to be displayed in the display region of the one field is written while the write address of the video memory is advanced when an image of the one field has been inputted and when the sub-image included in the specific extraction region has been inputted, and a second operation, in which the write address of the video memory is skipped by an amount equal to the address region corresponding to one line of sub-image data to be displayed in the display region without data writing being performed, with a leading address of the video memory serving as an origin; second write control means for storing, corresponding to an order of lines in the other field out of the sub-image signals, the image data to be displayed in the display region of the other field in empty address regions formed between the address regions where the image of the lines of the one field of the video memory is stored by alternately executing a third operation, in which one line of data to be displayed in the display region of the other field is written while the write address of the video memory is advanced when an image of the other field has been inputted and when the sub-image included in the specific extraction region has been inputted, and a fourth operation, in which the write address of the video memory is skipped by an amount equal to the address region corresponding to one line of sub-image data to be displayed in the display region without data writing being performed, with the origin being an address advanced from the leading address by an amount equal to the address region corresponding to one line of image data to be displayed in the display region; read control means for reading, in the address order from the leading address, the sub-image data stored in the video memory by the first and second write control means when the scanning address of the main image is an address corresponding to the specific display region; and switching means for selecting the main image when the scanning address of the main image is not an address corresponding to the specific display region, and selecting and outputting the sub-image outputted from the video memory when the scanning address of the main image is an address corresponding to the specific display region.

An ordinary video memory whose address regions are specified by ordinary addressing is used as the memory for storing the interlaced scan image. Specifically, in the course of the synthesis and display of a sub-image included in a specific extraction region out of interlaced scan sub-images composed of odd-numbered fields and even-numbered fields in a specific display region on a display screen on which a non-interlaced scan main image is displayed, first, the required sub-image of one field is stored in alternating address regions of the video memory, and then the required sub-image of the other field is stored in the empty regions between the above-mentioned alternating address regions, and as a result the sub-image is stored in the line order of the non-interlaced scan in the continuous address region of the video memory. Therefore, reading this stored sub-image in the address order, switching it with the main image, and outputting it to the display allows the sub-image to be synthesized with the main image. Thus, with this invention, one frame of interlaced image signals can be stored in a single video memory, which reduces the number of video memories to one and allows the memory storage region to be utilized more effectively. Also, because the interlaced image signals are stored in a continuous address region, when they are synthesized into a main image, the address control performed for this read-out is simpler.

The fourteenth invention is the image synthesizing device according to thirteenth invention, further comprising reduction factor setting means for setting a reduction factor of the sub-image; and display region setting means for setting a reduction of the display region in which the sub-image is displayed on the display screen according to the reduction factor set by the reduction factor setting means; wherein the first write control means, in a course of the execution of the first operation, thins the sub-image of one of the fields included in the specific extraction region in a main scanning direction and a sub-scanning direction according to the set reduction factor, and in a course of the execution of the second operation, skips the write address of the video memory by an amount equal to the address region corresponding to one line of reduced sub-image data to be displayed in the display region; the second write control means, in a course of the execution of the third operation, thins the sub-image of the other field included in the specific extraction region in the main scanning direction and the sub-scanning direction according to the set reduction factor, and in a course of the execution of the fourth operation, skips the write address of the video memory by an amount equal to the address region corresponding to one line of reduced sub-image data to be displayed in the display region, and alternately executes these third and fourth operations, with the origin being an address advanced from the leading address by an amount equal to the address region corresponding to one line of image data to be displayed in the display region; the read control means reads the sub-image data stored in the video memory by the first and second write control means in the address order from the leading address when the scanning address of the main image is an address corresponding to the display region reduced by the display region setting means; and the switching means selects the main image when the scanning address of the main image is not an address corresponding to the display region reduced by the display region setting means, and selects and outputs the sub-image outputted from the video memory when the scanning address of the main image is an address corresponding to the reduced display region.

The timing at which data is written to the video memory is controlled according to the reduction factor, and as a result the sub-image of one field reduced according to the reduction factor is stored in alternating address regions of the serial access memory, and the sub-image of the other field reduced according to the reduction factor is stored in the empty spaces between the above-mentioned alternating address regions, and as a result, a reduced sub-image is stored in the order of the lines of the non-interlaced scan in the continuous address region of the video memory. Therefore, a reduced sub-image can be synthesized on the main image screen by reading out this stored sub-image in the address order, switching it to the main image, and displaying this on the display. Thus, with this invention, a reduced sub-image can be synthesized on the main screen using only a single video memory, which reduces the number of serial access memories to one and allows the memory storage region to be utilized more effectively. Also, because the reduced interlaced image signals are stored in a continuous address region, when they are synthesized into a main image, the address control performed for this read-out is simpler.

With the fifteenth invention the video memory according to fifteenth invention claim 13 comprises: random access memory means allowing write and read operations to be performed asynchronously and for sequentially storing sub-image signals written by the first and second write control means;

- serial access memory means for temporarily storing at least one line of sub-image signals by data transfer from the random access memory means; and first read control means for performing data read control from the serial access memory means on the basis of inputted serial clock signals; read clock formation means is provided for extracting control-use synchronization signals from inputted main image signals and forming read-out clock signals with respect to the video memory on the basis of the extraction signals; the display screen on which the main image is displayed performing a display operation synchronously with the read clock signals;

- magnification factor setting means is provided for setting the magnification factor M; and display region setting means is provided for setting the magnification of the display region in which the sub-image is displayed on the display screen according to a magnification factor M set by the magnification factor setting means; the read control means comprises: address generation means for generating addresses increased by an amount of address skipped by the first and second write control means once for every M-number of sub-scans of the main image, with an initial value being a leading address of the random access memory means; second read control means for causing the data transfer to be performed, with an output address of the address generation means being a transfer start address, at least once for every M-number of sub-scans of the main image when the sub-scanning address of the main image is an address corresponding to the display region magnified by the display region setting means; main scanning direction magnification means for forming serial clock signals obtained by dividing the read clock signals into 1/M according to the magnification factor, inputting the serial clock signals thus formed to the second read control means, and causing data corresponding to the amount of address skipped by the second write control means out of the sub-image signals stored temporarily in the serial access memory means to be outputted at a frequency of 1/M when the scanning address of the main image is an address corresponding to the display region magnified by the display region setting means; and sub-scanning direction magnification means for outputting the sub-image signals temporarily stored in the serial access memory means continuously for M times and synchronously with the sub-scanning of the main image when the scanning address of the main image is an address corresponding to the display region magnified by the display region setting means; and wherein the switching means selects the main image when the scanning address of the main image is not an address corresponding to the display region magnified by the display region setting means, and selects and outputs the sub-image outputted from the video memory when the scanning address of the main image is an address corresponding to the display region magnified by the display region setting means.

Since a magnified sub-image is superimposed over the main image using the serial access memory housed in an ordinary video memory, there is no need for the line buffer FIFO used in fourth and sixth, which allows the circuit structure to be that much simpler and the cost that much lower.

BEST MODE FOR CARRYING OUT THE INVENTION

An embodiment of this invention will now be described in detail through reference to the appended figures.

Figure 1:
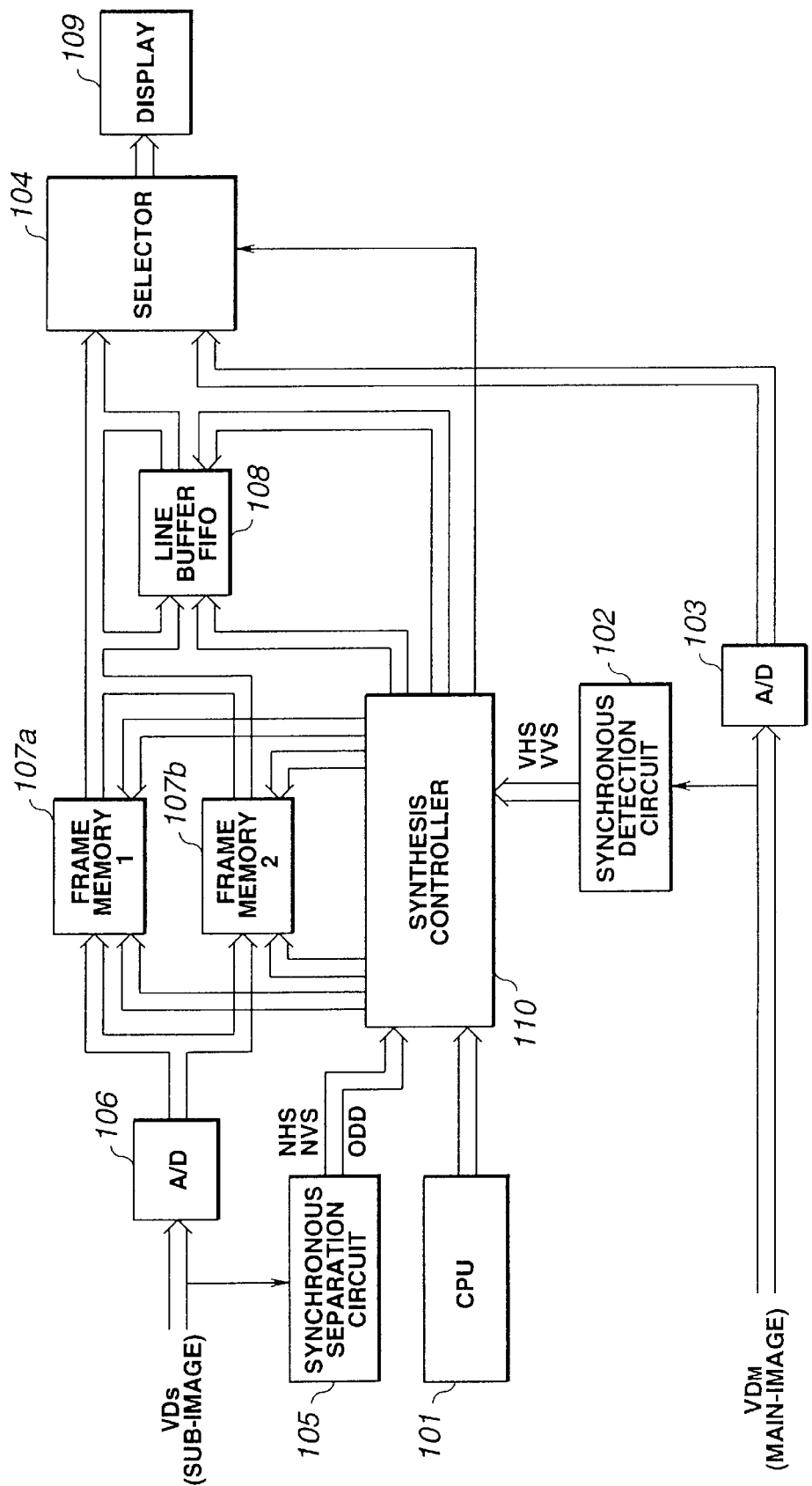
FIG. 1 is a hardware structure block diagram of the image synthesizing device pertaining to the present invention.

FIG. 1 is a hardware structure block diagram of the image synthesizing device pertaining to the present invention. The synthesis of a monochrome image signal is described here, but the present invention is not limited to this. Also, the main image signal is a so-called non-interlaced signal here, and the sub-image signal is an interlaced video signal.

The non-interlaced image signal VDm of the main image (hereinafter referred to as main image signal) is inputted to a synchronization detection circuit 102 and a first A/D conversion circuit 103. This synchronization detection circuit 102 detects a horizontal synchronization signal VHS and a vertical synchronization signal VVS of the main image from the main image signal VDm, and outputs these to a synthesis controller 110. Here, the horizontal synchronization signal VHS and vertical synchronization signal VVS represent scan synchronization signals in an ordinary image signal such as that shown in FIG. 2, with the horizontal synchronization signal VHS being a signal inputted at specific time intervals once for every horizontal line, and the vertical synchronization signal VVS being a signal inputted ahead of the image signal once for every frame. The above-mentioned first A/D conversion circuit 103 converts the image signal of the main image signal VDm into digital data (main image data), and then outputs this to a selector 104. This embodiment deals with monochrome image data, and thus the first A/D conversion circuit 103 is constituted by a conversion circuit having a resolution of a specific number of bits (such as 8 bits), with the output being converted into image data of a specific step size according to the brightness.

The interlaced image signal VDs of the sub-image (hereinafter referred to as the sub-image signal) is inputted to a synchronous separation circuit 105 and a second A/D conversion circuit 106. This synchronous separation circuit 105 separates the horizontal synchronization signal NHS and vertical synchronization signal NVS of the sub-image from the sub-image signal VDs, generates a signal ODD indicating the distinction between odd-numbered fields (a combination of image data for all odd-numbered lines) and even-numbered fields (a combination of image data for all even-numbered lines), and outputs this to the synthesis controller 110. Here again, the horizontal synchronization signal NHS and vertical synchronization signal NVS, just as above, represent scan synchronization signals in the ordinary image signal in FIG. 2. The above-mentioned second A/D conversion circuit 106 converts the sub-image signal VDs into digital data (sub-image data), and then outputs this to two frame memories 107a and 107b. For the same reason as given above, this second A/D conversion circuit 106 is also constituted by a conversion circuit having a resolution of a specific number of bits.

Figure 3:
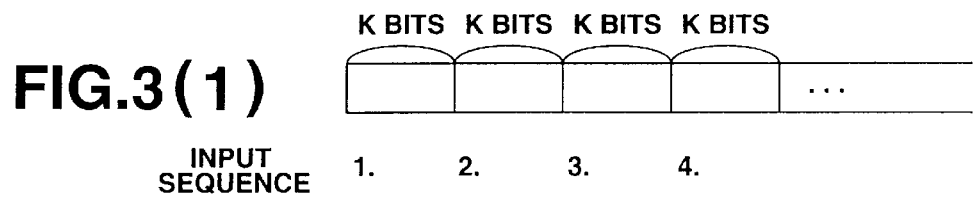
FIGS. 3(1) and 3(2) are diagrams of the sub-image data write order and read order in the frame memory of the image synthesizing device pertaining to the present invention.
Figure 3:
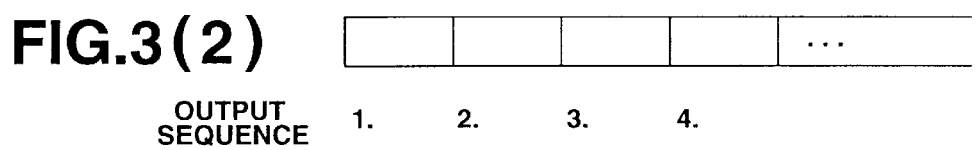

The above-mentioned two frame memories 107a and 107b are serial access memories capable of asynchronous reading and writing, and first store and then output the above-mentioned sub-image data by an operation commonly referred to as FIFO. Specifically, as shown in FIG. 3(1), the frame memories 107a and 107b store the above-mentioned sub-image data (such as K bits of data) in its inputted order in synchronization with the various specific signals discussed below which are outputted from the synthesis controller 110 in order to control the writing of data, and as shown in FIG. 3(2), continuously output the above-mentioned stored data in its inputted order in synchronization with the various specific signals discussed below which are outputted from the synthesis controller 110. The decision as to in which of the frame memories 107a and 107b the sub-image data will be written is made according to the odd-numbered fields, the even-numbered fields, and the scale factor of the sub-image (full scale, reduced, or magnified) as discussed below.

The sub-image data outputted from the frame memories 107a and 107b is inputted to the selector 104, and is also inputted to the selector 104 via a line buffer FIFO 108 that is in parallel thereto. The line buffer FIFO 108 is constituted by a FIFO memory capable of asynchronous reading and writing; the sub-image data outputted from the above-mentioned frame memories 107a and 107b is inputted in order depending on a specific write control signal or read control signal from the synthesis controller 110, and is continuously outputted to the selector 104 in this input order.

The selector 104 switches the main image data from the first A/D conversion circuit 3 at a specific timing with the sub-image data from the frame memories 107a and 107b or the line buffer FIFO 108, and outputs this to a display 109. This results in a sub-image being synthesized and displayed in a specific region of the main image. The switching of the main image data and sub-image data here is performed on the basis of a select signal from the synthesis controller 110.

A CPU 101 is constituted by an ordinary computer device such as a microcomputer, and in the image synthesizing device of this embodiment the CPU 101 executes display region management, scale factor management, synthesis management, and the like related to image synthesis through software processing. Specifically, address data for the part of the display region of the main image where the sub-image is to be synthesized, address data for the display region of the sub-image data to be synthesized into a main image, or the sub-image scale factor (such as full-scale, reduced, or magnified) is inputted from an input means (not shown). The start and end addresses of the display region out of the sub-image data, and the start and end addresses of the synthesis and display region of the main image data are then calculated on the basis of the above data. The address data and scale factor data thus calculated are outputted to the synthesis controller 110. The above-mentioned input means can be, for example, an input switch with which data can be inputted when the switch is operated by the user, or a data receiver that involves communication from another, superior computer or the like.

The synthesis controller 110 is constituted by a control circuit that controls, for example, the timing of the writing (input) and reading (output) of sub-image data in the constituent circuits of the above-mentioned frame memories 107a and 107b, line buffer FIFO 108, selector 104, and so on, or the timing at which the main image data and the sub-image data are switched, on the basis of the above-mentioned address data and scale factor data inputted from the CPU 101. The synthesis controller 110 is internally provided with various resistors, counter and comparator circuits, PLL circuits, and so on for controlling this timing, and these circuits will now be described in detail.

Figure 4:
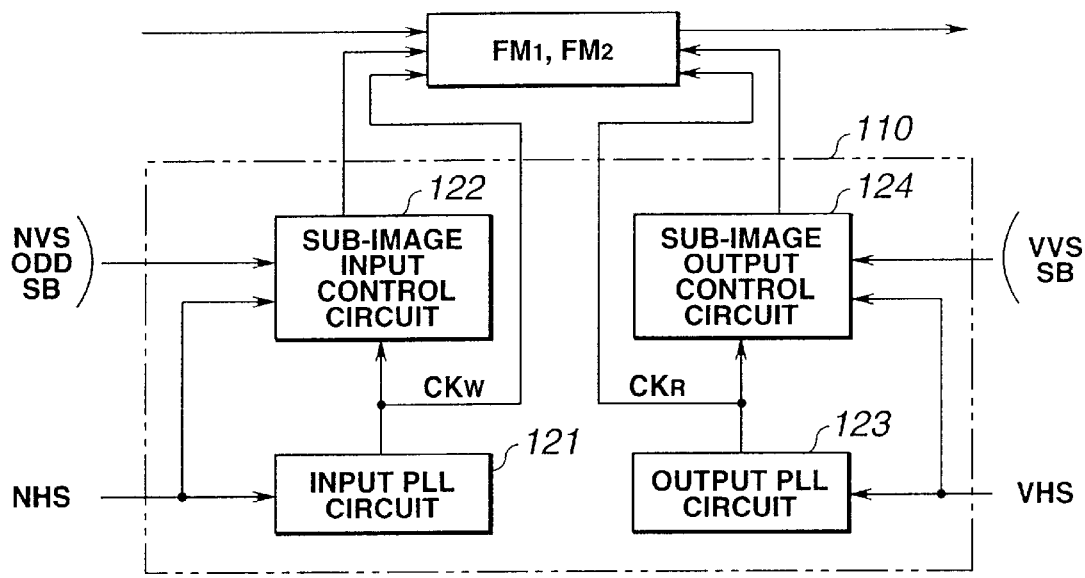
FIG. 4 is a hardware structure block diagram of the synthesis controller of the image synthesizing device pertaining to the present invention.

FIG. 4 is a simplified hardware structure block diagram of the synthesis controller 110. In this figure, the synthesis controller 110 comprises an input PLL circuit 121, a sub-image input control circuit 122, an output PLL circuit 123, and a sub-image output control circuit 124. The input PLL circuit 121 is a so-called PLL circuit that inputs the horizontal synchronization signal NHS from the above-mentioned synchronous separation circuit 105, and generates a write dot clock signal CKw of a specific phase and frequency on the basis of this horizontal synchronization signal NHS. The write dot clock signal CKw thus generated is inputted to the sub-image input control circuit 122 and the frame memories 107a and 107b, and specifies the timing at which the sub-image data will be written to the frame memories 107a and 107b. Similarly, the output PLL circuit 123 is a PLL circuit that inputs the horizontal synchronization signal VHS from the above-mentioned synchronization detection circuit 102, and generates a read dot clock signal CKr of a specific phase and frequency on the basis of this horizontal synchronization signal VHS. The read dot clock signal CKr thus generated is inputted to the sub-image output control circuit 124 and the frame memories 107a and 107b, and specifies the timing at which the above-mentioned sub-image data stored in the frame memories 107a and 107b will be read out.

Figure 5:
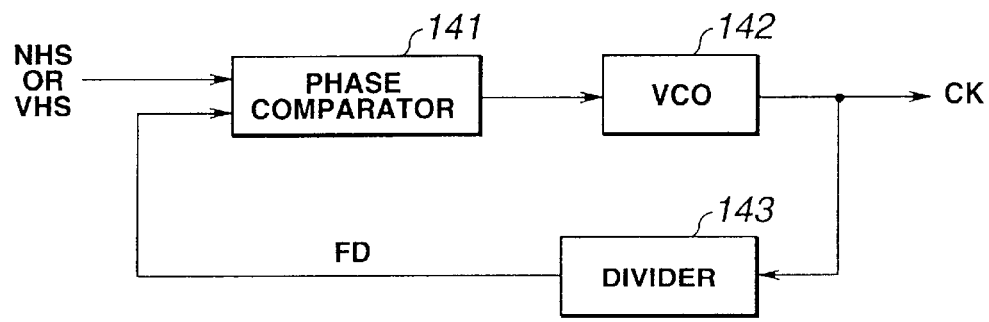
FIG. 5 is a diagram of the PLL circuit of the image synthesizing device pertaining to the present invention.

The structure of the input PLL circuit 121 and the output PLL circuit 123 will now be described through reference to FIG. 5. Since both circuits are similarly configured, the figure illustrates the basic circuit. A phase comparator 141 inputs a reference signal (here, the horizontal synchronization signal NHS or horizontal synchronization signal VHS), and outputs a voltage signal corresponding to the magnitude of the phase differential from a comparison signal FD. A VCO 142 is constituted by an oscillator that generates a clock of a frequency proportional to this voltage signal, and is set so as to generate a clock CK of a specific frequency locked to the phase of the above-mentioned reference signal. A divider 143 inputs this oscillation clock CK and divides it in specific fractions, and this divided clock FD is fed back to the phase comparator 141 as the comparison signal FD as mentioned above. As a result, it is possible to generate a write dot clock signal CKw or read dot clock signal CKr of a specific frequency synchronous with the phase of the horizontal synchronization signal NHS or horizontal synchronization signal VHS. The above-mentioned specific frequency is set so as to coincide with the image frequency of the various horizontal lines of the sub-image signal or main image signal (the repeating frequency of the various pixels).

The sub-image input control circuit 122 and the sub-image output control circuit 124 are each controlled in their timing such that only the sub-image data in the display region to be synthesized out of the inputted sub-image data is written to the frame memories 107a and 107b, or the above-mentioned stored sub-image data is read out in a specific sequence in the case of the synthesis and display region of the main image data, on the basis of the write dot clock signal CKw, the read dot clock signal CKr, the horizontal synchronization signal NHS, the horizontal synchronization signal VHS, and so on.

The above-mentioned sub-image input control circuit 122 and sub-image output control circuit 124 will now be described in detail.

Figure 6:
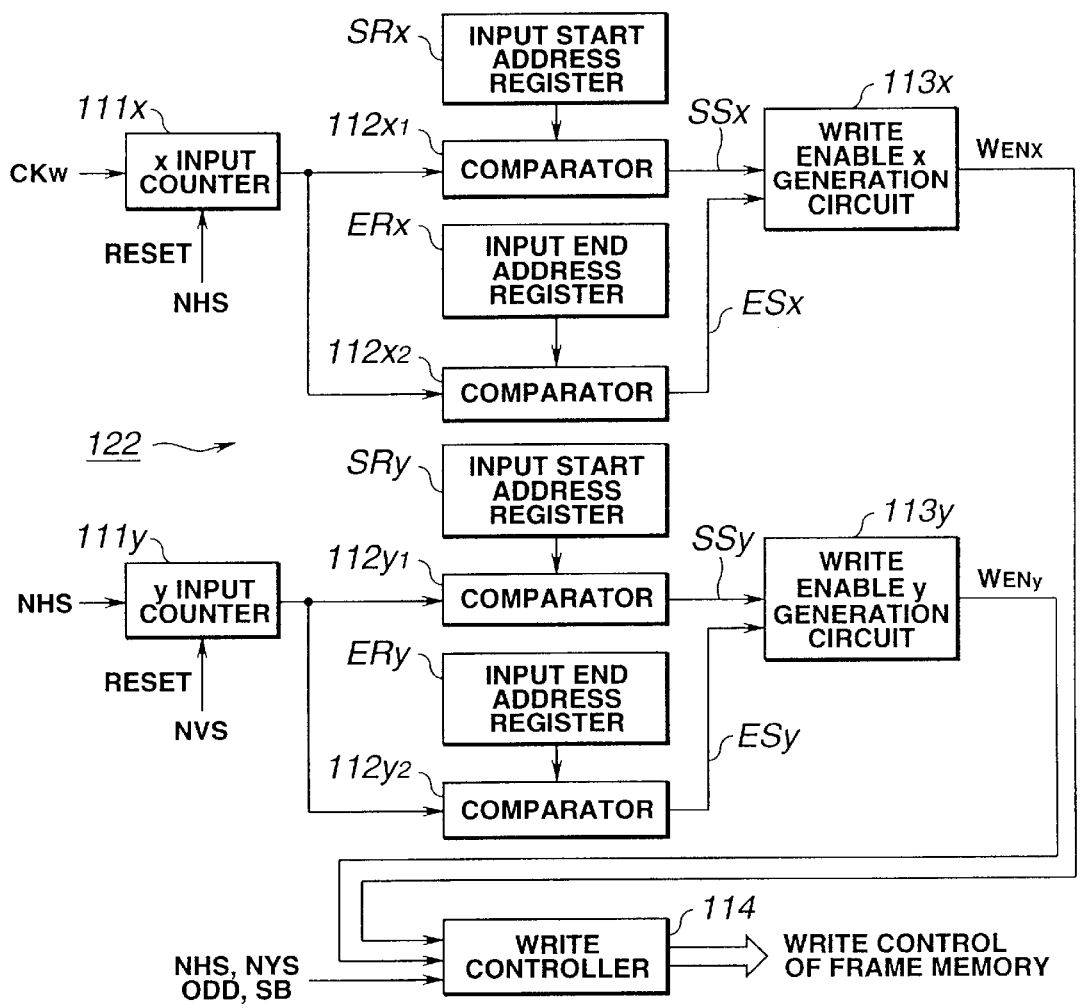
FIG. 6 is a detail block diagram of the sub-image input control circuit in the synthesis controller of the image synthesizing device pertaining to the present invention.

FIG. 6 is a detail block diagram of the above-mentioned sub-image input control circuit 122 in the synthesis controller 110, and the following description is in reference to FIG. 6.

An X input counter 111x and a Y input counter 111y are address counters in the horizontal and vertical directions and are used for incorporating sub-image data. The address count of the X input counter 111x is reset by the horizontal synchronization signal NHS inputted from the synchronous separation circuit 105, after which the address count is tabulated by the above-mentioned write dot clock signal CKw outputted from the above-mentioned input PLL circuit 121. The address count of the above-mentioned Y input counter 111y is reset by the vertical synchronization signal NVS inputted from the synchronous separation circuit 105, after which the address count is tabulated by the above-mentioned horizontal synchronization signal NHS. The address count of the X input counter 111x is outputted in parallel to a comparator 112x1 and a comparator 112x2, and the address count of the Y input counter 111y is outputted in parallel to a comparator 112y1 and a comparator 112y2.

Figure 7:
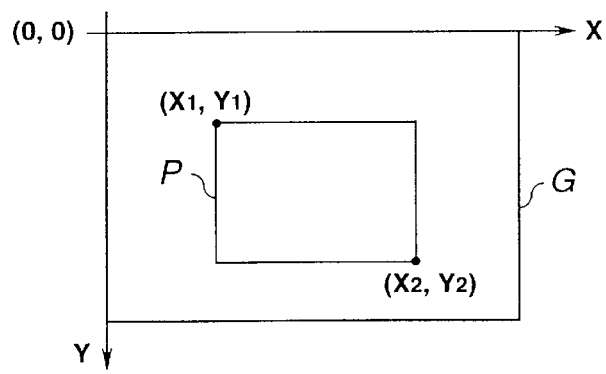
FIG. 7 is a coordinate diagram of the sub-image display region of the image synthesizing device pertaining to the present invention.

An input start address register SRx and an input end address register ERx are registers for respectively setting the start and end addresses in the horizontal direction for each line of scan over the display region P to be synthesized out of one frame of sub-image data. To describe these start and end addresses through reference to FIG. 7, the entire display region G1 of the sub-image is represented by absolute coordinates (X, Y) of the X coordinate in the horizontal direction and the Y coordinate in the vertical direction as shown in FIG. 7, with the line scan starting point for one frame (the upper left of the entire display region G1 in the figure) being the origin (0, 0). The right direction in the figure is the X axis forward direction, and the down direction is the Y axis forward direction. Here, the start and end addresses in the horizontal direction set as above are set according to the absolute coordinates (X, Y) in the above-mentioned entire display region G1. For instance, the start address X1 and the end address X2 are set on the basis of the coordinates (X1, Y1) at the upper left point and the coordinates (X2, Y2) at the lower right point of the display region P to be synthesized out of the sub-image data. The outputs of the input start address register SRx and the input end address register ERx, that is, the data of these set start and end addresses, are inputted to the comparator 112x1 and the comparator 112x2, respectively.

Similarly, an input start address register SRy and an input end address register ERy are registers for respectively setting the start and end addresses in the vertical direction over the above-mentioned display region P to be synthesized out of one frame of sub-image data. To describe this through reference to FIG. 7, since the sub-image is interlaced in this embodiment, this start address is set at (Y1/2) and the end address at (Y2/2). When Y1 or Y2 is an odd number, the computed result for (Y1/2) or (Y2/2) is rounded up or down to the nearest integer. The outputs of the input start address register SRy and the input end address register ERy are inputted to the comparator 112y1 and the comparator 112y2, respectively.

Figure 2:
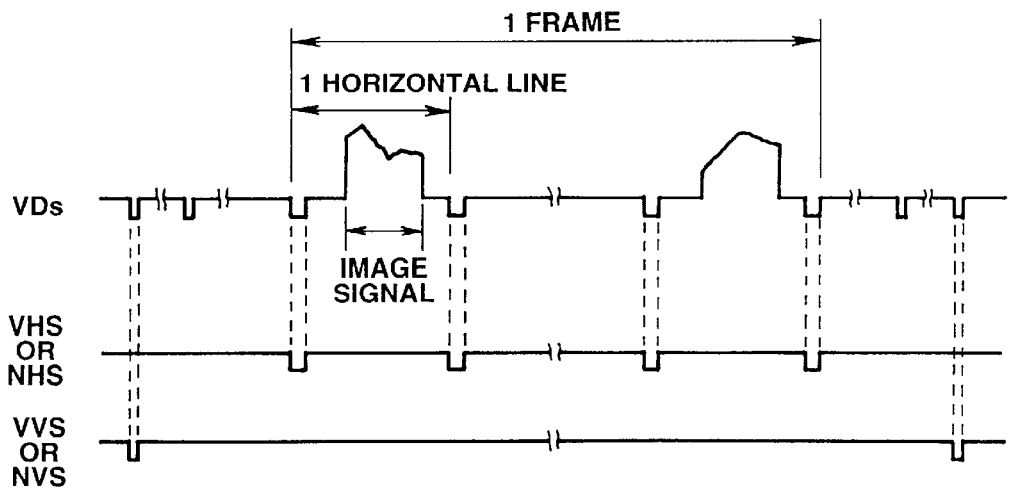
FIG. 2 is a diagram of the horizontal synchronization signals and vertical synchronization signals of the image signals of the image synthesizing device pertaining to the present invention.

In the above description, the upper left end of the display region was termed the origin (0, 0), but other options are also possible, such as using the location where the horizontal synchronization signal is inputted as the origin in the X direction, and the location where the vertical synchronization signal as the origin in the Y direction. Specifically, as shown in FIG. 2, it takes a specific time from the input of the horizontal synchronization signal NHS to the input of the actual image signal, so the address count is tabulated by the write dot clock signal CKw during this time. Thus, in this case, an origin that is equivalent to that expressed in the above description can be achieved by pre-setting an offset for the address corresponding to the above-mentioned specific time, and taking this offset into account during the setting of the address for the input start address register SRx, or by subtracting this offset from the address count of the X input counter 111x. The same applies to the following description.

The above-mentioned comparators 112x1, 112x2, 112y1, and 112y2 are comparison circuits. The comparator 112x1 compares the address count of the X input counter 111x with the start address of the input start address register SRx, and if there is a match, outputs a signal SSx to a write enable X generation circuit 113x. The comparator 112x2 compares the address count of the X input counter 111x with the end address of the input end address register ERx, and if there is a match, outputs a signal ESx to the write enable X generation circuit 113x. The write enable X generation circuit 113x sets a write enable X signal WENx to the high level when the above-mentioned signal SSx has been inputted, after which it returns the above-mentioned write enable X signal WENx to the low level when the above-mentioned signal ESx has been inputted. Thus, this write enable X signal WENx indicates that the horizontal address of the inputted sub-image data corresponds to the above-mentioned display region P, and is inputted to a write controller 114 as a control signal that writes the sub-image data to the frame memories 107a and 107b.

Similarly, the comparator 112y1 compares the address count of the Y input counter 111y with the start address of the input start address register SRy, and if there is a match, outputs a signal SSy to a write enable Y generation circuit 113y. The comparator 112y2 compares the address count of the Y input counter 111y with the end address of the input end address register ERy, and if there is a match, outputs a signal ESy to the write enable Y generation circuit 113y. The write enable Y generation circuit 113y sets a write enable Y signal WENy to the high level when the above-mentioned signal SSy has been inputted, after which it returns the above-mentioned write enable Y signal WENy to the low level when the above-mentioned signal ESy has been inputted. Thus, this write enable Y signal WENy indicates that the vertical address of the inputted sub-image data corresponds to the above-mentioned display region P, and is inputted to the write controller 114 as a write control signal to the frame memories 107a and 107b of the sub-image data.

The synthesis controller 110 is provided with a scale factor register (not shown) for setting scale factor data SB. This scale factor data SB is expressed as a scale factor classification by full-scale, reduced, magnified, and so on, and as numerical data for this scale factor, and the scale factor data SB is set by the CPU 101.

The write controller 114 respectively inputs the write enable X signal WENx and write enable Y signal WENy from the above-mentioned write enable X generation circuit 113x and write enable Y generation circuit 113y, inputs the horizontal synchronization signal NHS and vertical synchronization signal NVS of the sub-image signal VDs and an odd-numbered line signal ODD from the above-mentioned synchronous separation circuit 105, and inputs the scale factor data SB from the above-mentioned scale factor register. Then, a write signal commanding the writing of the sub-image data to the frame memories 107a and 107b, a permission signal that increments the write address pointer within the frame memories 107a and 107b synchronously with the write dot clock signal CKw, or the like is outputted on the basis of these signals and data. Also, the write address is reset when the sub-image data of the display region P to be synthesized is newly incorporated into the frame memories 107a and 107b, which initializes the above-mentioned write address pointer, that is, a command returning the write address to the leading address is outputted.

Figure 8:
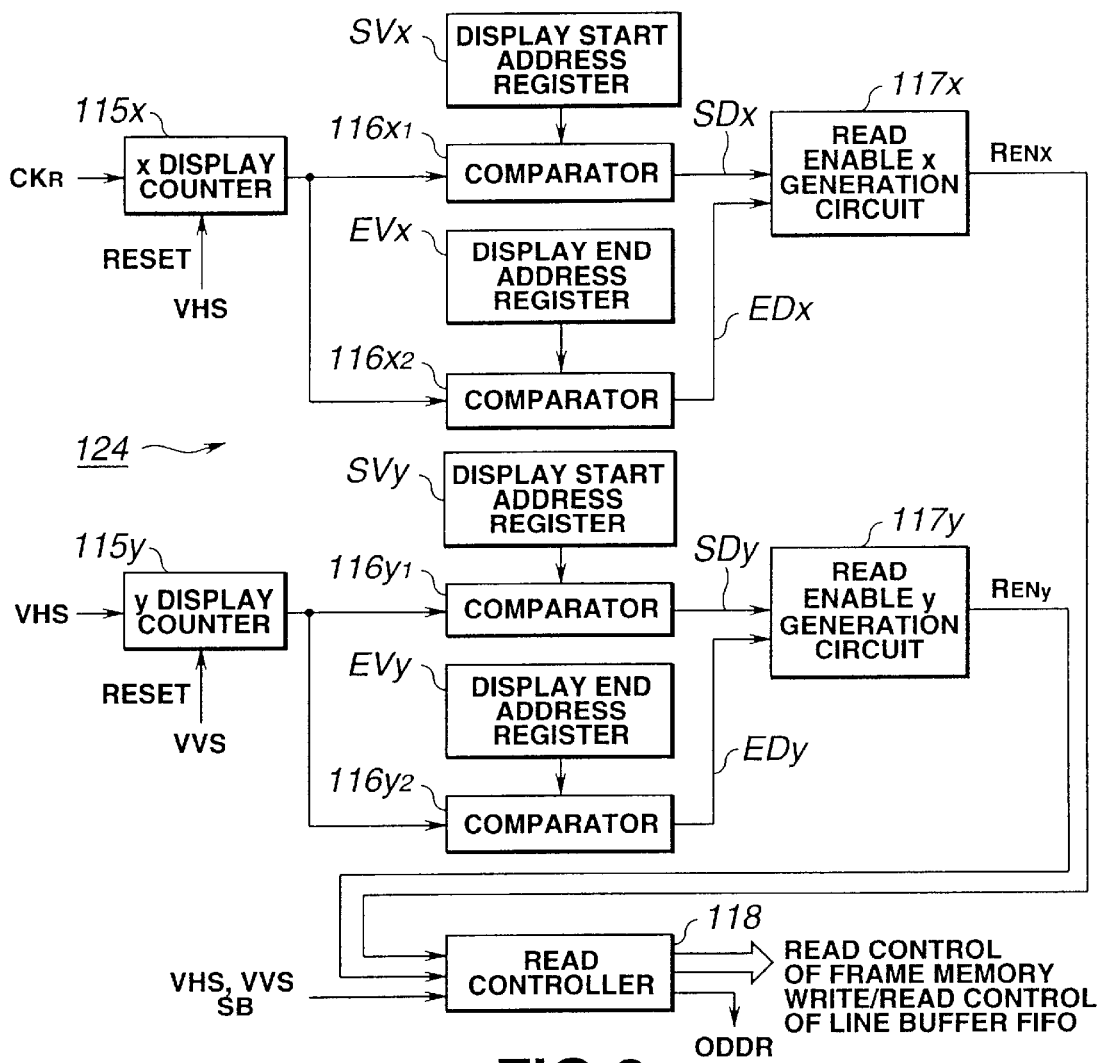
FIG. 8 is a detail block diagram of the sub-image output control circuit in the synthesis controller of the image synthesizing device pertaining to the present invention.

FIG. 8 is a detail block diagram of the above-mentioned sub-image output control circuit 124, and the following description is in reference to this figure.

An X display counter 115x and a Y display counter 115y are respectively address counters in the horizontal and vertical directions for synthesizing and displaying on the main image the sub-image data stored in the frame memories 107a and 107b. The address count of this X display counter 115x is reset by the horizontal synchronization signal VHS of the main image signal VDm inputted from the synchronization detection circuit 102, after which the address count is tabulated by the above-mentioned read dot clock signal CKr outputted from the output PLL circuit 123. The address count of the above-mentioned Y display counter 115y is reset by the vertical synchronization signal VVS inputted from the synchronization detection circuit 102, after which the address count is tabulated by the above-mentioned horizontal synchronization signal VHS. The address count of the above-mentioned X display counter 115x is outputted in parallel to a comparator 116x1 and a comparator 116x2, and the address count of the Y display counter 115y is outputted in parallel to a comparator 116y1 and a comparator 116y2.

Figure 9:
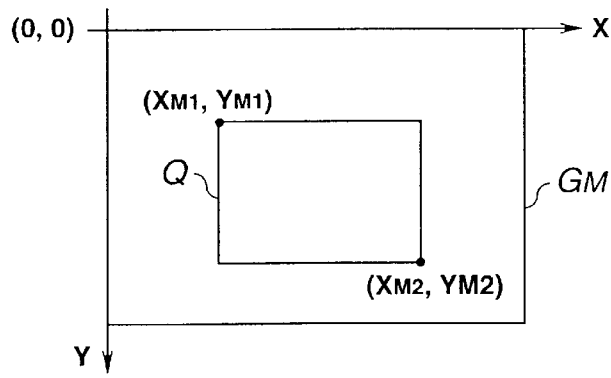
FIG. 9 is a coordinate diagram of the sub-image display region of the image synthesizing device pertaining to the present invention.
Figure 10:
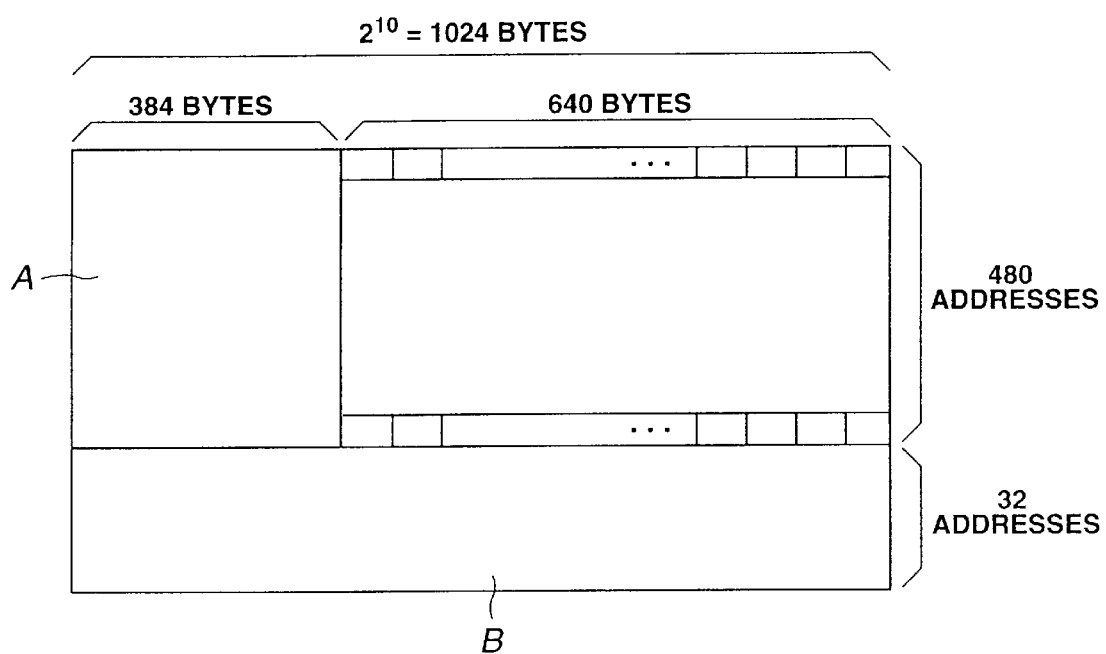
FIG. 10 is an address diagram of the frame memory of a conventional image synthesizing device.

A display start address register SVx and a display end address register EVx are registers for respectively setting the start and end addresses in the horizontal direction for each line over the display region Q in which the sub-image is synthesized out of one frame of sub-image data. As shown in FIG. 9, just as with the sub-image, the entire display region GM of the sub-image is represented by absolute coordinates (X, Y) of the X coordinate in the horizontal direction and the Y coordinate in the vertical direction, with the line scan starting point for one frame of display being the origin (0, 0). The right direction in the figure is the X axis forward direction, and the down direction is the Y axis forward direction. Here, the start and end addresses set as above are set according to the absolute coordinates (X, Y) in the above-mentioned entire display region GM. For instance, the start address is set to XM1 and the end address to XM2 on the basis of the coordinates (XM1, YM1) at the upper left point and the coordinates (XM2, YM2) at the lower right point of the display region Q where the sub-image data is synthesized. The display start address register SVx and the display end address register EVx respectively output the data of these set start and end addresses to the above-mentioned comparator 116x1 and comparator 116x2.

Similarly, a display start address register SVy and a display end address register EVy are registers for respectively setting the start and end addresses in the vertical direction over the above-mentioned display region Q. To describe this through reference to FIG. 9, this start address is set at YM1 and the end address at YM2. The data of the display start address register SVy and the display end address register EVy is outputted to the comparator 116y1 and the comparator 116y2, respectively.

The above-mentioned comparators 116x1, 116x2, 116y1, and 116y2 are comparison circuits. The comparator 116x1 compares the address count of the X display counter 115x with the start address of the display start address register SVx, and if there is a match, outputs a signal SDx to a read enable X generation circuit 117x. The comparator 116x2 compares the address count of the X display counter 115x with the end address of the display end address register EVx, and if there is a match, outputs a signal EDx to the read enable X generation circuit 117x. The read enable X generation circuit 117x sets a read enable X signal RENx to the high level when the above-mentioned signal SDx has been inputted, after which it returns the above-mentioned read enable X signal RENx to the low level when the above-mentioned signal EDx has been inputted. Thus, this read enable X signal RENx indicates that the horizontal address of the displayed main image data corresponds to the above-mentioned display region Q, and is inputted to a read controller 118 as a control signal that reads out the sub-image data from the frame memories 107a and 107b.

Similarly, the comparator 116y1 compares the address count of the Y display counter 115y with the start address of the display start address register SVy, and if there is a match, outputs a signal SDy to a read enable Y generation circuit 117y. The comparator 116y2 compares the address count of the Y display counter 115y with the end address of the display end address register EVy, and if there is a match, outputs a signal EDy to the read enable Y generation circuit 117y. The read enable Y generation circuit 117y sets a read enable Y signal RENy to the high level when the above-mentioned signal SDy has been inputted, after which it returns the above-mentioned read enable Y signal RENy to the low level when the above-mentioned signal EDy has been inputted. Thus, this read enable Y signal RENy indicates that the vertical address of the displayed main image data corresponds to the above-mentioned display region Q, and is inputted to the read controller 118 as a control signal that reads out the sub-image data from the frame memories 107a and 107b.

The read controller 118 respectively inputs the read enable X signal RENx and read enable Y signal RENy from the above-mentioned read enable X generation circuit 117x and read enable Y generation circuit 117y, inputs the horizontal synchronization signal NHS and vertical synchronization signal NVS of the main image signal VDm from the above-mentioned synchronization detection circuit 102, and inputs the scale factor data SB from the scale factor register. Then, a command signal permitting data output from the data output terminals of the frame memories 107a and 107b, a permission signal that increments the read address pointer within the frame memories 107a and 107b synchronously with the horizontal synchronization signal VHS, an odd-numbered line signal ODDR that expresses the odd-numbered lines of the main image, or the like is outputted on the basis of these signals and data. Also, the read address pointer is reset and initialized, that is, a signal returning the read address to the leading address is outputted, when one frame of main image data is displayed from the leading data. The above-mentioned odd-numbered line signal ODDR is produced by a hardware circuit or a software on the basis of the read enable X signal RENx and read enable Y signal RENy. For instance, this odd-numbered line signal ODDR is generated as flip-flop output that is inverted every time the read enable X signal RENx goes to the high level, and is reset by the read enable Y signal RENy.

The operation of the image synthesizing device structured as above will now be described.

First, the method for processing the sub-image data when the scale factor is designated to be full scale will be described.

The sub-image data for when the horizontal lines of the interlaced image are an odd-numbered field (when the signal ODD is at the high level) is written to the first frame memory 107a, and the sub-image data for when the lines are an even-numbered field (when the signal ODD is at the low level) is written to the second frame memory 107b. Here, if the display region P of the sub-image data shown in FIG. 7 is to be synthesized, as discussed above, the CPU 1 sets X1 in the input start address register SRx, (Y1/2) in the input start address register SRy, and (Y2/2) in the input end address register ERy.

The X input counter 111x counts up synchronously with the write dot clock signal CKw, and once this count is equal to X1, the match signal SSx goes to the high level, and the write enable X signal WENx also goes to the high level. When the count reaches X2, the match signal ESx goes to the high level, and the above-mentioned write enable X signal WENx returns to the low level. Once one line of horizontal synchronized scanning is complete, the address pointer of the above-mentioned X input counter 111x is reset by the horizontal synchronization signal NHS, and the count returns to zero, so for the next horizontal line, the above-mentioned X input counter 111x counts from the front of the horizontal line. As a result, the above-mentioned write enable X signal WENx only goes to the high level in the case of the image data of the display region P.

Similarly, the Y input counter 111y counts up according to the horizontal synchronization signal NHS, and the write enable Y signal WENy goes to the high level when this count is between Y1 and Y2.

When the above-mentioned write enable X signal WENx and write enable Y signal WENy are both at the high level and the field is odd-numbered (when the signal ODD is at the high level), the sub-image data is written to the first frame memory 107a, and when the above-mentioned write enable X signal WENx and write enable Y signal WENy are both at the high level and the field is even-numbered (when the signal ODD is at the low level), the sub-image data is written to the second frame memory 107b. At this point, the write address pointer within the frame memories 107a and 107b is incremented synchronously with the write dot clock signal CKw after the image data corresponding to each address (the specific K bits of data) has been written in input order. As a result, the sub-image data of the odd-numbered fields of the display region P is continuously written to the first frame memory 107a, and the sub-image data of the even-numbered fields to the second frame memory 107b.

The following procedure is carried out when the written sub-image data is to be read.

Let us assume that this sub-image data is to be written in the display region Q of the main image shown in FIG. 9. Thus, the CPU 101 sets XM1 in the display start address register SVx, XM2 in the display end address register EVx, and YM2 in the display end address register EVy. Here, the relationships of the following Formulas 1 and 2 must be satisfied between the register setting on the display side and the register setting on the input side. The various register symbols in the numerical formulas express the respective settings, and the same applies hereinafter.

$$ERx - SRx = EVx - SVx \tag{1}$$

$$ERy - SRy \geq (EVy - SVy)/2 \tag{2}$$

When the sub-image is non-interlaced, the conditions in Formula 3 must be substituted for Formula 2.

$$ERy - SRy \geq EVy - SVy \tag{3}$$

After the X display counter 115x has been cleared by the horizontal synchronization signal VHS within the main image signal VDm, it is counted up by the read dot clock signal CKr. When this count is equal to XM1, the match signal SDx is outputted to the read enable X generation circuit 117x, and when the count is equal to XM2, the match signal EDx is outputted. As a result, the read enable X signal RENx is at the high level when the horizontal address of the main image data is between XM1 and XM2. Also, after the Y display counter 115y has been cleared by the vertical synchronization signal VVS within the main image signal VDm, it is counted up using the horizontal synchronization signal VHS as a clock signal. The read enable Y signal RENy goes to the high level when this count is between YM1 and YM2.

When the read enable X signal RENx and read enable Y signal RENy are both at the high level and the horizontal lines are odd-numbered (when the signal ODDR is at the high level), the read controller 118 continuously reads out from the first frame memory 107a in the input order synchronously with the read dot clock signal CKr. Also, when the write read enable X signal RENx and read enable Y signal RENy are both at the high level and the horizontal lines are even-numbered (when the signal ODDR is at the low level), the read controller 118 continuously reads out from the second frame memory 107b in the input order synchronously with the read dot clock signal CKr. At this point, the read address pointer within the frame memories 107a and 107b is reset when the stored sub-image data begins to be read out from the leading address, after which the sub-image data corresponding to each address is read out, and the count is then incremented synchronously with the above-mentioned read dot clock signal CKr. The synthesis controller 110 selects the sub-image side of the input channel of the selector 104 when the read enable X signal RENx and read enable Y signal RENy are both at the high level, which means that the above-mentioned read sub-image data is displayed in the display region Q of the main image, and is synthesized with the main image.

The method for image synthesis processing in the case of reduction will now be described.

1) When the scale factor is 1/2n (n is a natural number)

When sub-image data is to be written to the first frame memory 107a, just as with the above-mentioned full-scale processing, X1 and X2 are set in the input start address register SRx and the input end address register ERx, respectively, and (Y1/2) and (Y2/2) are set in the input start address register SRy and the input end address register ERy, respectively. When the scale factor is 1/2n, either the odd-numbered fields or the even-numbered fields of the sub-image data are written to the first frame memory 7a, for example. In this embodiment, the odd-numbered fields are written, and the following write processing is performed when the write enable X signal WENx and write enable Y signal WENy are both at the high level and there are an odd number of fields. First, for the vertical direction, the lines that are to be written are thinned out to 1/n for every n lines, that is, only one line out of n lines is subjected to the subsequent horizontal thinning-out processing. These thinned-out lines are further thinned out to 1/2n in the dot direction, that is, only the sub-image data at one address is written to the first frame memory 107a for every time the X direction address of the input advances 2n. Here, the write address pointer within the first frame memory 107a is incremented synchronously with the write dot clock signal CKw once for every 2n clock pulses of this write dot clock signal CKw. As a result, the odd-numbered field of the sub-image data are reduced to 1/n in the vertical direction, which in turn results in the sub-image data being reduced to 1/2n in the vertical direction, and also being reduced to 1/2n in the horizontal direction.

During read-out, data is only read from the first frame memory 107a. Specifically, when the read enable X signal RENx and read enable Y signal RENy are both at the high level, the read controller 118 continuously reads from the first frame memory 107a in the input order synchronously with the read dot clock signal CKr. Since the synthesis controller 110 selects the sub-image side of the input channel of the selector 104 when the read enable X signal RENx and read enable Y signal RENy are both at the high level, the sub-image data read out as above ends up being displayed in the display region Q of the main image, and synthesized with the main image. At this point, since the data is read out from only the first frame memory 107a, the synthesized sub-image is displayed reduced to 1/2n in the vertical and horizontal directions. Naturally, the size of the display region Q of the main image has to be reduced to 1/2n along with the size of the display region P of the sub-image in the horizontal and vertical directions, and consequently the relationships of the settings of the various address registers on the input and output sides must be as follows.

$$ERx-SRx=2n\times(EVx-SVx) \tag{4}$$

$$ERy-SRy \geq n\times(EVy-SVy) \tag{5}$$

2) When the scale factor is 1/(2n+1)

The settings of the address registers on the input and output sides are set so as to satisfy the relationships of the following Formulas 6 and 7.

$$ERx-SRx=(2n+1)\times(EVx-SVx) \tag{6}$$

$$ERy-SRy \geq (2n+1)\times(EVy-SVy)/2 \tag{7}$$

In this case, the sub-image data is written to the second frame memory 107b by the following method. When the write enable X signal WENx and write enable Y signal WENy are both at the high level, the lines to be written are thinned out vertically to 1/(2n+1) for every (2n+1) lines in the entire sub-image display. Here, since the sub-image is interlaced, it is thinned out to 1/2(2n+1) for every 2(2n+1) lines when there are an odd number of fields (for example, when the factor is 1/3, the data is thinned out to 1/6 for every six lines, as in 1, 7, 13, and so on), and is also thinned out to 1/2(2n+1) for every 2(2n+1) lines when there are an even number of fields (for example, when the factor is 1/3, the data is thinned out to 1/6 for every six lines, as in 4, 10, 16, and so on), and then subjected to the subsequent horizontal thinning-out processing. These thinned-out lines are further thinned out to 1/(2n+1) in the dot direction when the write enable X signal WENx is at the high level, that is, only the sub-image data at one address for every time the X direction address of the input advances by (2n+1) is written to the first frame memory 107a with odd-numbered fields, or to the second frame memory 107b with even-numbered fields. Each write address pointer within the frame memories 107a and 107b is incremented synchronously with the write dot clock signal CKw once for every (2n+1) clock pulses of the write dot clock signal CKw. As a result, the sub-image data is stored reduced to 1/(2n+1) in the horizontal and vertical directions.

During read-out, the data is read by the same method as for full-scale, and is synthesized and displayed in the display region Q of the main image via the selector 104.

Next, the processing method for magnification will be described.

1) When the scale factor is N times

The settings of the address registers on the input and output sides are set so as to satisfy the relationships of the following Formulas 8 and 9.

$$ER_x - SR_x = (EV_x - SV_x)/N \qquad (8)$$

$$ER_y - SR_y \geq (EV_y - SV_y)/2N \qquad (9)$$

The method for writing to the frame memories 107a and 107b is the same as for full-scale. Specifically, when the above-mentioned write enable X signal WENx and write enable Y signal WENy are both at the high level, the image data of odd-numbered fields is continuously written in input order to the first frame memory 107a, and the sub-image data of even-numbered fields is written to the second frame memory 107b. For read-out, when the read enable X signal RENx and read enable Y signal RENy are both at the high level and the line buffer FIFO 108 is at a line where no data is outputted, the above-mentioned stored data is alternately and continuously read out from the frame memories 107a and 107b in the above-mentioned input order.

The read-out method will now be described in detail.

Once the read enable Y signal RENy goes to the high level, the first line of sub-image data displayed in the display region P to be synthesized in the main image is read out and outputted from the first frame memory 107a while the first read enable X signal RENx is at the high level. The horizontal line data here is read out at a cycle of 1/N the read dot clock signal CKr for every address. Specifically, the read address pointer is incremented once for every N times there is a read dot clock signal CKr, so the same data is outputted for N times in a row for the read dot clock signal CKr. As a result, each line is magnified by N times in the horizontal direction. The display dot number D of the magnified lines is a number of dots expressed by the numerical formula D=(X2−X1)N. The sub-image data outputted after being magnified N times in the horizontal direction is synthesized and displayed in the main image via the selector 104, and is simultaneously written to the line buffer FIFO 108 synchronously with the read dot clock signal CKr, that is, at the same cycle as the read dot clock signal CKr.

Next, from the second line up to the Nth line corresponds to the period while the read enable Y signal RENy is at the high level and the read enable X signal RENx is at the high level (N−1) times from the second line. During this period, the first line of the above-mentioned stored data is continuously read out in input order from the line buffer FIFO 108, and the read address pointer of the line buffer FIFO 108 is reset for every horizontal synchronization signal VHS. This results in the same data as that of the first line being consecutively outputted to the selector 104 over and over for the subsequent (N−1) lines from the second line as well. Therefore, the same sub-image as that of the first line is synthesized and displayed on the second to Nth lines.

Next, the sub-image data at the (N+1)th line is read out from the second frame memory 107b while the read enable Y signal RENy is at the high level and the (N+1)th read enable X signal RENx is at the high level. The data here is read out at a cycle of 1/N of the read dot clock signal CKr for every address, just as with the above-mentioned first line, so the lines are magnified N times in the horizontal direction. This data that has been outputted after being magnified N times is stored in the line buffer FIFO 108 at the same time it is synthesized and displayed via the selector 104. After this, the subsequent (N+2) to 2N lines correspond to the period while the read enable Y signal RENy is at the high level and the read enable X signal RENx is at the high level for (N−1) times from the (N+2)th line. During this period, the (N+1)th line of the above-mentioned stored sub-image data is continuously read out in input order from the line buffer FIFO 108, and the read address pointer of the line buffer FIFO 108 is reset for every horizontal synchronization signal VHS. This results in the same data as that of the (N+1)th line being consecutively outputted to the selector 104 over and over for the subsequent (N−1) lines from the (N+2)th line as well. Therefore, the same sub-image as that of the (N+1) lines is synthesized and displayed on the (N+2) to 2N lines.

Next, the sub-image data at the (2N+1)th line returns to the same processing as for the first line and is read out from the first frame memory 107a while the read enable Y signal RENy is at the high level and the (N+1)th read enable X signal RENx is at the high level. This process continues in the same way, with the sub-image data being alternately read out from the first frame memory 107a (when there are an odd number of sub-image lines) or from the second frame memory 107b (when there are an even number of sub-image lines) for the first of every N lines, the data being magnified N times in the horizontal direction (dot direction) and outputted to the selector 104, and data magnified N times also being simultaneously written to the line buffer FIFO 108. For the rest of the (N−1) lines, the data stored in this line buffer FIFO 108 is read out and displayed via the selector 104.

Thus, the processing continues until the entire display region P of the sub-image has been magnified N times, and as a result, the sub-image is synthesized and displayed magnified N times in width and height.

With the N-fold magnification method described above, sub-image data is magnified N times by reading it out at a cycle of 1/N of the read dot clock signal CKr generated on the basis of the horizontal synchronization signal of the main image signal VDm during read-out from the frame memories 107a and 107b. Then, the sub-image data for these magnified lines is written to the line buffer FIFO 108 synchronously with the above-mentioned read dot clock signal CKr, so the data is stored in the line buffer FIFO 108 in a state in which it is magnified N times. This is not, however, the only method for N-fold magnification, and other methods can be used instead. For instance, the data will be similarly written at 1/N cycle when, during read-out from the frame memories 107a and 107b, the data is read out at a cycle of 1/N of the read dot clock signal CKr and thereby magnified N times. Thus, the data is stored in a full-scale state in the line buffer FIFO 108, just as in the frame memories 107a and 107b. When the data is read out from the line buffer FIFO 108, N-fold magnification is achieved by reading at a cycle of 1/N of the read dot clock signal CKr.

When a specific region obtained by reduction, magnification, or full-scale reproduction of the display region P of the sub-image is synthesized and displayed in the specific display region Q to be synthesized of the main image, if the synthesis is specified so that part of the display region P will protrude from the display region Q, it is possible to keep the protruding portion of the image from being displayed by specific processing. For instance, when only a small portion of data is protruding, the data will not be displayed even if outputted as it is since it takes time for line switching from one horizontal line to the next, such as in the back porch interval or front porch interval. However, if the protruding data is large in size, this size can be calculated ahead of time, the time such as the above-mentioned back porch interval or front porch interval taken into account, and the protruding image data portion processed so as not to be incorporated into the frame memories 107a and 107b, which keeps this portion from being displayed.

When, as described above, a specific display region of a sub-image is synthesized in full scale in a main image, only the sub-image data corresponding to this display region to be synthesized is successively stored in the frame memory in input order, and when this data is to be synthesized and displayed, the main image data is switched once the scanning address of the main image data becomes the synthesis and display region, so that the above-mentioned stored sub-image data is successively read out and displayed in input order. When the sub-image is interlaced, odd-numbered lines and even-numbered lines are stored in the first frame memory 107a and the second frame memory 107b, respectively. If the main image is non-interlaced, the sub-image data from the first frame memory 107a and the second frame memory 107b is alternately read out for every line. Therefore, only a frame memory capable of storing one full screen of sub-image need be readied, so the capacity of the memory used for image synthesis can be decreased. Scanning conversion from an interlaced image to a non-interlaced image is also facilitated.

If a sub-image is to be reduced to a specific scale factor, when only the sub-image data corresponding to the display region where the sub-image is to be synthesized, first the lines to undergo write processing are thinned out to the above-mentioned specific scale factor in the input order, and these thinned-out lines are thinned out to the above-mentioned specific scale factor in the horizontal direction (dot direction) and written to the frame memories 107a and 107b when the image data corresponds to the display region where the sub-image is to be synthesized. When this data is to be synthesized and displayed in the main image, the above-mentioned stored and reduced sub-image data is successively read out in input order just as with the above-mentioned full-scale display. As to thinning out in the vertical direction, if the sub-image is interlaced, and if the reduction factor is (1/2n), then the data of odd-numbered fields (or even-numbered fields) should be thinned out to (1/n) and stored in only the first frame memory 107a (or the second frame memory 107b). If the reduction factor is 1/(2n+1), then the data for the odd-numbered fields and for the even-numbered fields should be thinned out to 1/2(2n+1) and stored in the corresponding first frame memory 107a or second frame memory 107b. When the odd-numbered fields and even-numbered fields are stored in the first frame memory 107a and second frame memory 107b, respectively, they are read out alternately for every line of the main image on the display side. This makes it possible for an image to be synthesized at any reduction factor.

When a sub-image is to be magnified to a specific scale factor, only the sub-image data corresponding to the display region is successively stored in the frame memory in the input order just as with the above-mentioned full-scale display, and when the data is to be synthesized and displayed, this stored sub-image data is displayed while magnification processing corresponding to the above-mentioned specific scale factor is carried out using the line buffer FIFO. This makes it possible to synthesize an image at any magnification factor and allows the capacity of the frame memory to be decreased.

A case in which the sub-image signal is a monochrome image signal is described above, but the present invention is not limited to this, and in the case of a color image, the frame memories 107a and 107b and the line buffer FIFO 108 are each provided in a set of three for red, green, and blue use, or frame memories 107a and 107b and a line buffer FIFO 108 with large bit numbers are provided.

When the sub-image is non-interlaced, there is no need to provide the two frame memories 107a and 107b and perform scan switching for odd- and even-numbered lines as described above, but it can be easily accommodated by writing the data to the same frame memory in input order and reading it out.

Another embodiment of the present invention will now be described through reference to FIGS. 11 to 8.

First, a summary of the invention will be given through reference to FIGS. 12 to 15.

Figure 12:
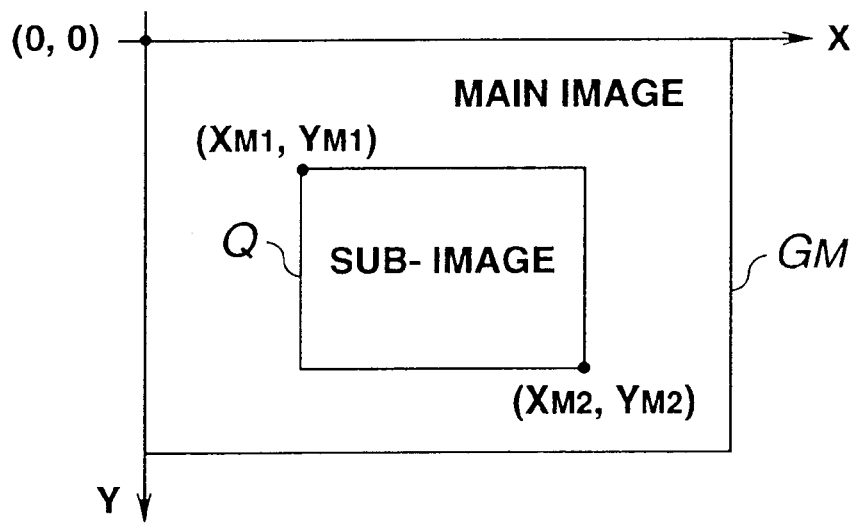
FIG. 12 is a diagram of the synthesis screen of the main and sub-images.

As shown in FIG. 12, an interlaced scan sub-image that constitutes a one-frame screen is displayed by superimposition in odd-numbered fields and even-numbered fields in a partial region Q of the display area GM of a display on which a non-interlaced scan main image is displayed (hereinafter referred to as the synthesis region Q).

Figure 13:
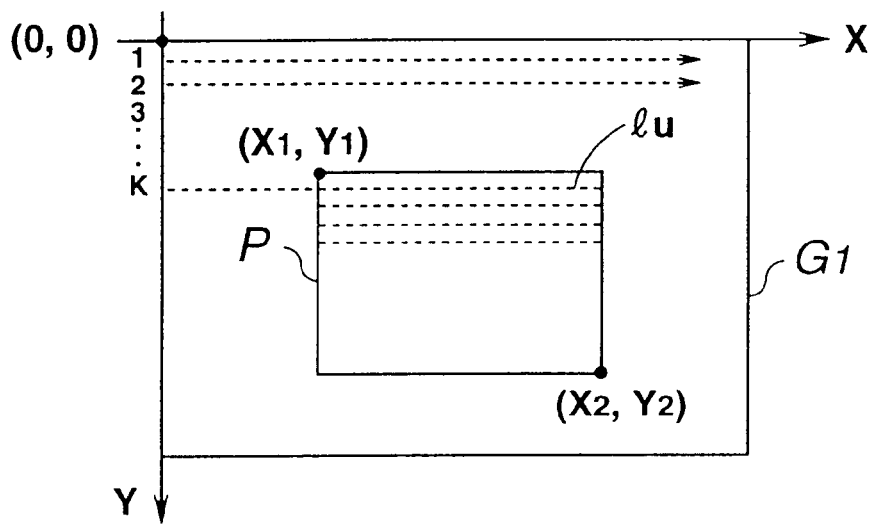
FIG. 13 is a diagram of the extraction region used for synthesis in the sub-image.

As shown in FIG. 13, the sub-image has a total image region G1, any arbitrary area out of this image region G1 is extracted as a synthesis area P with respect to the main image (hereinafter referred to as extraction region P), and the sub-image of this extraction region P is synthesized and displayed in any synthesis region Q of the main image display area in FIG. 2.

Figure 14:
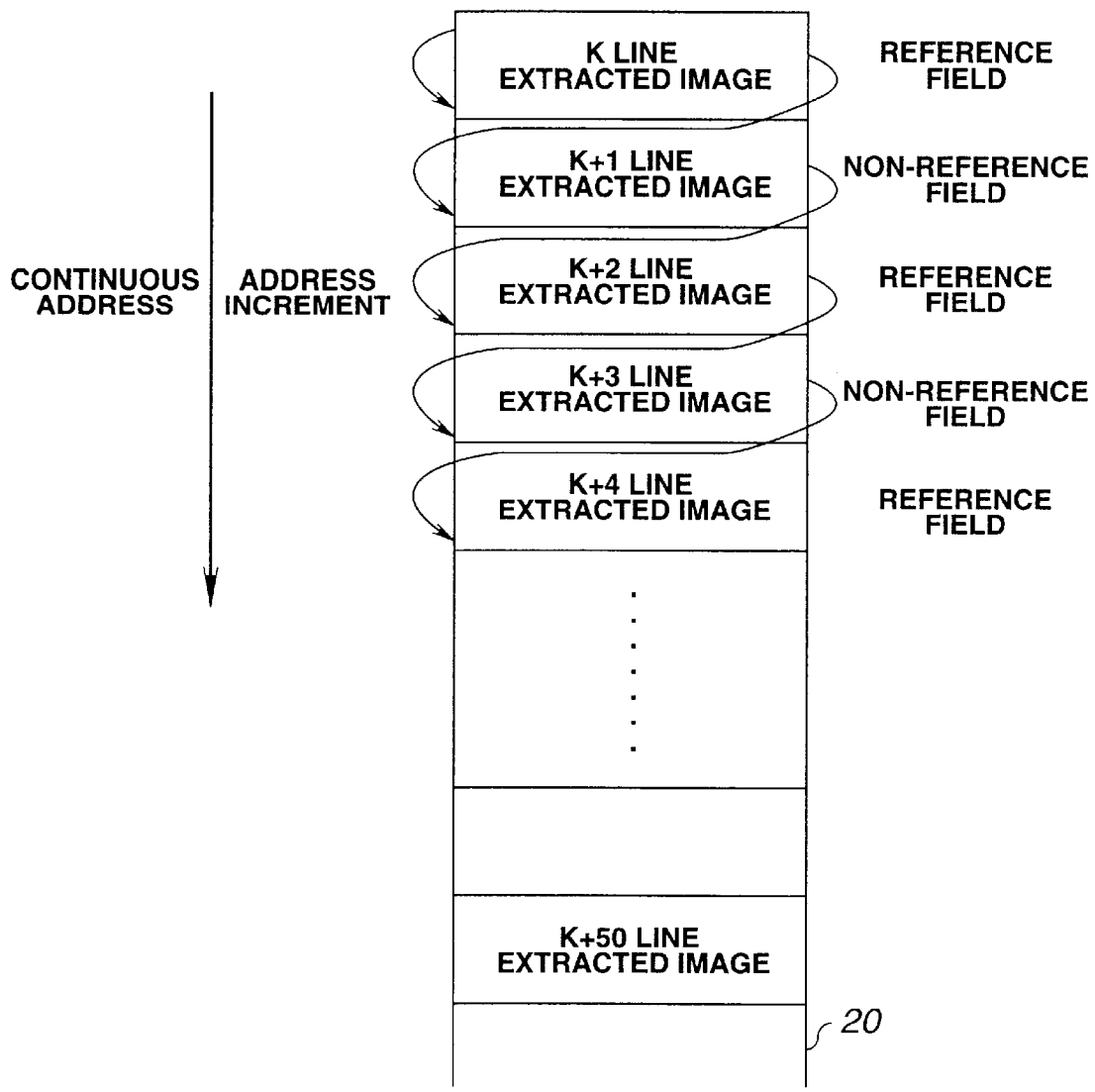
FIG. 14 is a diagram of a sub-image storage aspect with a frame memory.

In this embodiment, in the course of this synthesis and display, the interlaced scan sub-image included in the extraction region P extracted from the total image region G1 is stored in the order of scan lines of the non-interlaced scan in the continuous address region of one frame memory 20 as shown in FIG. 14.

For example, let us assume that the sub-image included in the extraction region P in FIG. 13 consists of the Kth to the (K+50)th scan lines. K may be an odd or an even number, depending on the location in the sub-scanning direction (Y direction) of the synthesis area P. Hereinafter, fields including the scan line (u in the uppermost location in the extraction region P will be called base fields, and the other fields will be called non-base fields. A base field may be an odd-numbered field or an even-numbered field, depending on whether K is an odd or even number.

Specifically, because the sub-image is an interlaced scan, first the images of all lines included in odd-numbered fields (1, 3, 5, . . . ) are inputted, then images of all lines included in even-numbered fields (2, 4, 6, . . . ) are inputted, and this is repeated over and over, so if an attempt is made to store the extraction region P, which is part of the sub-image, at a continuous address in chronological order of input of the data to the frame memory 20, the images of the lines of odd-numbered fields included in the extraction region P will be stored in the address region in the first half of the frame memory 20, and the images of the lines of even-numbered fields will be stored in the subsequent address region, so the sub-image data cannot be stored at a continuous address in the order of non-interlaced scan lines.

Figure 15:
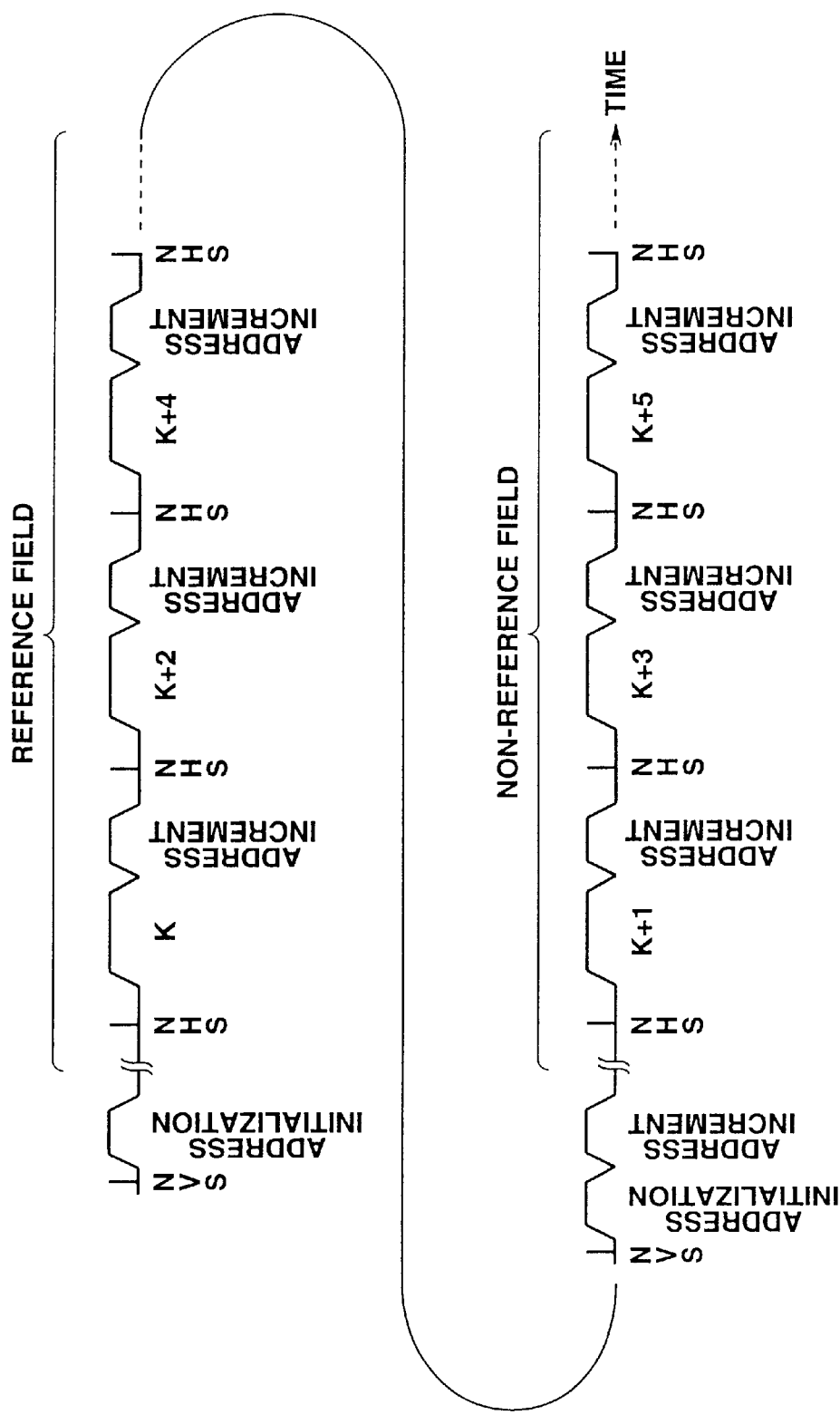
FIG. 15 is a conceptual time chart for when the sub-image is written.

With the present invention, however, writing to the frame memory 20 is controlled as shown in FIG. 15, the result of which is that the sub-image data is stored in a continuous address region of the frame memory 20 in the order of non-interlaced scan lines as shown in FIG. 14. Specifically, the image of the line K, which is the highest in the extraction region P in FIG. 13, is stored in the first address region of the frame memory 20, the image of the second line (K+1) in the extraction region P of FIG. 13 is stored in the next address region, the image of the third line (K+2) in the extraction region P of FIG. 13 is stored in the next address region after that, and this is repeated over and over.

Next, the time chart in FIG. 15 will be used to give a summary of the write control that permits the sub-image storage shown in FIG. 14.

First, let us assume that the input of the sub-image on the base field side including the scan line (u in the uppermost location of the extraction region P in FIG. 13 has begun from the uppermost line of the total image region G1 of the sub-image. Since the vertical synchronization signal NVS is inputted prior to the input of the image of this base field, the address of the frame memory 20 is initialized at this point and the data is stored from the leading address region.

After this, the images of the lines on the base field side are successively inputted along with the horizontal synchronization signal NHS for every line.

Then, when the line number of the inputted image on the base field side becomes K, an image corresponding to this Kth line is stored in the leading address region of the frame memory 20. Naturally, not all of the pixel images included in the Kth line are stored here, and only the images corresponding to the pixels included in the extraction region P in relation to the main scanning direction (X direction) (images from coordinate X1 to coordinate X2 in FIG. 13) are stored.

When this storage operation is complete, the address region where the extracted image of the (K+1)th line of the next non-base field is stored is reserved by using a high-speed clock to increment the address by an amount equal to the address region corresponding to the images of the number of pixels in the main scanning direction within the extraction region P (the images from coordinate X1 to coordinate X2 in FIG. 13). Specifically, the waiting time from immediately after the writing of the data until the next horizontal synchronization signal NHS is inputted is utilized, and addresses are skipped in an amount equal to the address region corresponding to the images from coordinate X1 to coordinate X2 during this waiting time.

After this, the image of the (K+2) line, the image of the (K+4) line, and so forth are inputted successively, so those line images that are included in the extraction region P are successively stored in the frame memory 20 while the address is incremented just as above. As a result, first, the images on the base field side out of the sub-image in the extraction region P are stored in alternating address regions.

Next, let us assume that the input of the sub-image on the non-base field side is begun from the uppermost line in the total image region G1 of the sub-image. Since the vertical synchronization signal NVS is inputted prior to the input of these non-base field images, the address of the frame memory 20 is initialized at this point. Furthermore, the address is offset by an amount equal to the address region corresponding to the extracted image of the Kth line in the base field already stored, by subjecting the address to the same incrementation as mentioned above.

The images of the lines on the non-base field side are then successively inputted along with the horizontal synchronization signal NHS for every line.

After this, when the line number of the inputted image on the base field side becomes (K+1), an image corresponding to this (K+1)th line is stored in the leading address region of the frame memory 20. Naturally, not all of the pixel images included in the (K+1)th line are stored here, and only the images corresponding to the pixels included in the extraction region P in relation to the main scanning direction (X direction) are stored. Specifically, the extracted image of the (K+1) line is stored in the address region reserved (emptied) for the extracted image of the (K+1) line in the previous write operation in the base field.

When this storage operation of the (K+1) line is complete, the address corresponding to the address region reserved for the (K+3)th line is skipped by performing the same address incrementation as above.

After this, the image of the (K+3) line, the image of the (K+5) line, and so forth are inputted successively, so those line images that are included in the extraction region P are successively stored in the frame memory 20 while the address is incremented just as above. As a result, the images on the non-base field side out of the sub-image in the extraction region P are stored in the address regions emptied in alternating fashion.

The above write operation is executed repeatedly.

Thus, an interlaced image can be stored in a continuous address region of a single frame memory 20 in the order of non-interlaced scan lines.

Therefore, when a sub-image is superimposed on the synthesis region Q, which is part of the main image display area, as shown in FIG. 12, it should be switched to the main image when the synthesis region Q of the display area is scanned synchronously with the non-interlaced scan timing of the main image, and the sub-image stored in the frame memory 20 thereby read out and outputted.

Embodiments of the present invention will now be described in further detail.

Figure 11:
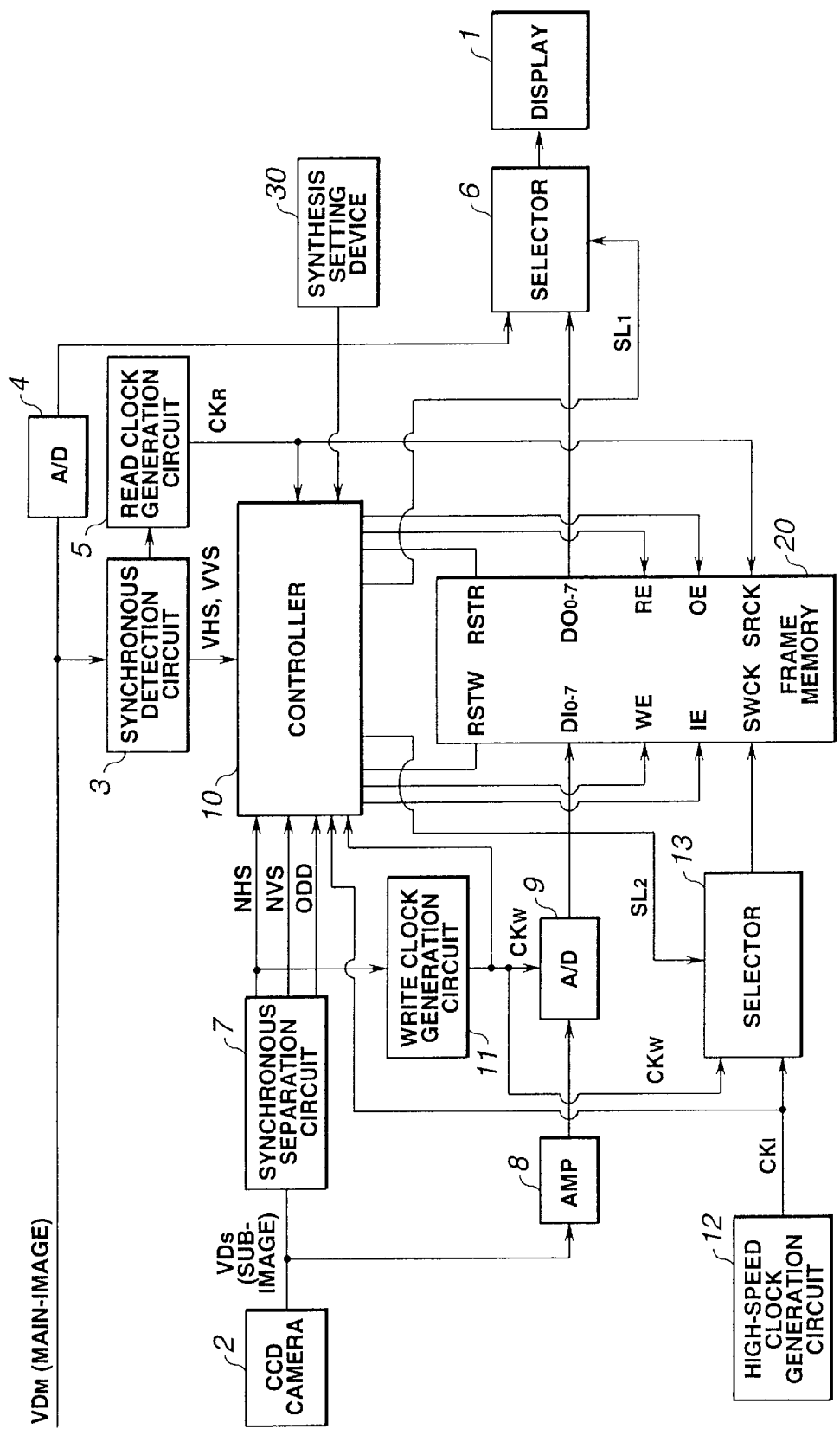
FIG. 11 is a block diagram of the overall system in another embodiment of this invention.

FIG. 11 is an overall view of an image synthesizing device.

This image synthesizing device is used to display superimposed interlaced signals from a CCD camera 2 or the like in a partial region of a non-interlaced scan display 1 such as an LCD or CRT display. Specifically, in this case, the main image signals used for the display 1 are non-interlaced signals, and the sub-image signals synthesized in the main image are interlaced signals.

In FIG. 11, the non-interlaced scan type of main image signal VDm is inputted to a synchronous detection circuit 3 and an A/D converter 4. The synchronous detection circuit 3 extracts the horizontal synchronization signal VHS and vertical synchronization signal VVS of the main image from the main image signal VDm and outputs this to a controller 10. Specifically, the main image signal VDm, as already shown in FIG. 2, includes a horizontal synchronization signal VHS and a vertical synchronization signal VVS, and the synchronous detection circuit 3 extracts this horizontal synchronization signal VHS and vertical synchronization signal VVS from the main image signal VDm. The horizontal synchronization signal VHS is a signal inputted at a specific time interval once every horizontal line, and the vertical synchronization signal VVS is a signal inputted before the image signal for every frame (screen). The VHS signal and VVS signal may also be signals that are independent from the start.

The A/D converter 4 converts the inputted main image signal VDm from gradation data of a specific number of bits into digital data, and outputs this to a selector 6.

A read clock signal generation circuit 5 is constituted, for example, by a PLL (phase lock loop) circuit, a multiplication circuit, or the like, and forms and outputs, on the basis of the horizontal synchronization signal VHS inputted from the synchronous detection circuit 2, a read dot clock signal CKr of a specific phase and frequency that is locked to the phase of this horizontal synchronization signal VHS. The frequency of this read dot clock signal CKr is set to coincide with the image frequency of the horizontal lines of the main image signal (the repeating frequency of the pixels). This read dot clock signal CKr is inputted to the controller 10, the frame memory 20, and the A/D converter 4 and is used to read data from the frame memory 20, for example.

The interlaced scan type of sub-image signal VDs outputted from the CCD camera 2 is inputted to a synchronous separation circuit 7 and an amplifier 8. The synchronous separation circuit 7 separates the horizontal synchronization signal NHS and vertical synchronization signal NVS from the sub-image signal VDs (see FIG. 2), generates a field discrimination signal ODD (H (high) for an odd-numbered field and L (low) for an even-numbered field) that distinguishes between odd-numbered fields (a combination of image data for all odd-numbered lines) and even-numbered fields (a combination of image data for all even-numbered lines), and outputs these signals to the controller 10. The vertical synchronization signal NVS in the sub-image signal VDs appears for every field, rather than for every frame as with the main image signal VDm.

The inputted sub-image signal VDs is amplified by the amplifier 8, and this product is inputted to an A/D converter 9. The A/D converter 9 converts the inputted sub-image signal VDs from gradation data of a specific number of bits into digital data, and outputs this to the frame memory 20.

A write clock generation circuit 11 is constituted, for example, by a PLL (phase lock loop) circuit, a multiplication circuit, or the like, and forms and outputs a write dot clock signal CKw of a specific phase and frequency on the basis of the horizontal synchronization signal NHS inputted from the synchronous separation circuit 7. The frequency of this write dot clock signal CKw is set to correspond to the image frequency of the horizontal lines of the sub-image signal (the repeating frequency of the pixels). This write dot clock signal CKw is inputted to the controller 10, the frame memory 20, and the A/D converter 9 and is used to write data to the frame memory 20, for example.

The frame memory 20 is a serial access memory capable of asynchronous read and write operations at high speed. The stored sub-image data is inputted in parallel in K-bit (such as 8-bit) units, and the stored data is outputted in parallel in K-bit units. Specifically, this serial access memory 20 performs a write operation to a continuous address in K-bit units by means of a write address pointer, performs a read operation from a continuous address by means of a read address pointer, and is able to perform read and write operations completely independently through the operation of these address pointers.

Sub-image data composed of odd-numbered fields and even-numbered fields is stored at a continuous address in the order of the non-interlaced scan lines through the above-mentioned write control for this one frame memory 20.

The functions of the various terminals of this frame memory 20 are as follows.

DI0-7 (data input):
Serial data input terminals
RSTW (reset write):
A reset input terminal for initializing the write address pointer (returning it to the zero address)
WE (write enable):
A terminal for enabling the write address pointer. When the WE is "H," the write address pointer is incremented synchronously with the SWCK.
IE (input enable):
A terminal for enabling a write operation. When the IE is "H," the data is incorporated inside, but is not when the IE is "L." When the SWCK is inputted with the WE at "H" and the IE at "L," the write address pointer is incremented, but the actual write operation is not carried out.
SWCK (serial write clock):
Write clock input terminal
DO0-7 (data output):
Serial data output terminals
RSTR (reset read):
A reset input terminal for initializing the read address pointer (returning it to the zero address)
RE (read enable):
A terminal for enabling the read address pointer.
OE (output enable):
A terminal for enabling a read operation
SRCK (serial read clock):
Read clock input terminal.

The selector 6 synthesis and displays the sub-image data in the main image data by switching the main image data outputted from the A/D converter 4 with the sub-image data outputted from the frame memory 20 by means of a select signal SL1 outputted from the controller 10, and outputting this to the display 1.

A high-speed clock generation circuit 12 generates an incrementation-use high-speed clock signal CKi for incrementing the write address pointer of the frame memory 20 at high speed in the above-mentioned address incrementation of the frame memory 20, and outputs this to a selector 13. In the high-speed incrementation of the write address pointer of the frame memory 20 by the high-speed clock signal CKi, only the write address pointer is incremented, and the writing of the actual sub-image data is not carried out, because the write enable terminal RE is set to H and the input enable terminal IE to L.

The selector 13 uses a select signal SL2 outputted from the controller 10 to switch the write dot clock signal CKw outputted from the write clock generation circuit 11 with the high-speed clock signal CKi outputted from the high-speed clock generation circuit 12, and inputs this to the serial write clock terminal SWCK of the frame memory 20.

A synthesis setting device 30 executes display region management, scale factor management, synthesis management, and the like through software processing in the course of synthesizing the sub-image in the main image.

Specifically, with the synthesis setting device 30, when data specifying the region of the sub-image to be synthesized in the main image, data specifying the region of the main image display area where the sub-image is to be displayed, scale factor data SB specifying that the sub-image is to be displayed in the main image in full scale or in reduced or magnified form, and other such data is set, the various address data and the like given below are computed on the basis of the above data, and the resulting data is outputted to the controller 10.

NISX:
X address corresponding to the start X coordinate of the extracted sub-image region
NISY:
Y address corresponding to the start Y coordinate of the extracted sub-image region
NIEX:
X address corresponding to the end X coordinate of the extracted sub-image region
NIEY:
Y address corresponding to the end Y coordinate of the extracted sub-image region
VDSX:
X address corresponding to the start X coordinate of the region of the main image where the sub-image is to be synthesized
VDSY:
Y address corresponding to the start Y coordinate of the region of the main image where the sub-image is to be synthesized
VDEX:
X address corresponding to the end X coordinate of the region of the main image where the sub-image is to be synthesized VDEY:
Y address corresponding to the end Y coordinate of the region of the main image where the sub-image is to be synthesized N2SX:
Data indicating the number of pixels in the horizontal line direction (X direction) of the region of the sub-image used for synthesis.

For example, if, as shown in FIG. 13, a region P that has upper left coordinates of (X1, Y1) and lower right coordinates of (X2, Y2) is designated as the region of extraction out of the total region G1 of the sub-image for synthesis in the main image, the synthesis setting device 30 computes the address values corresponding to NISX=X1, NISY=Y1/2, NIEX=X2, and NIEY=Y2/2 and outputs these to the controller 10. NISY is set to Y1/2 and NIEY to Y2/2 because the sub-image is an interlaced signal and has odd-numbered fields and even-numbered fields.

If, as shown in FIG. 12, a synthesis region Q that has upper left coordinates of (XM1, YM1) and lower right coordinates of (XM2, YM2) is designated as the area for the synthesis and display of the sub-image in the total display area GM of the main image, the synthesis setting device 30 computes the address values corresponding to VDSX=XM1, VDSY=YM1, VDEX=XM2, and VDEY=YM2 and outputs these to the controller 10.

The data N2SX indicating the amount of address incrementation is $$N2SX=NIEX-NISX \qquad (10)$$

in the case of full-scale, and is $$N2SX=(1/n)(NIEX-NISX) \qquad (11)$$

n: natural number
in the case of reduction. N2SX=X2−X1 when the region P shown in FIG. 13 is synthesized in the main image in full scale.

Next, the controller 10 shown in FIG. 11 will be described. This controller 10 controls the input of the sub-image to the frame memory 20 and controls the switching of the selectors 6 and 13 on the basis of the above-mentioned synthesis-use address data, scale factor data SB, and the like inputted from the synthesis setting device 30. A detailed structural example thereof is illustrated in FIGS. 16 and 17.

Figure 16:
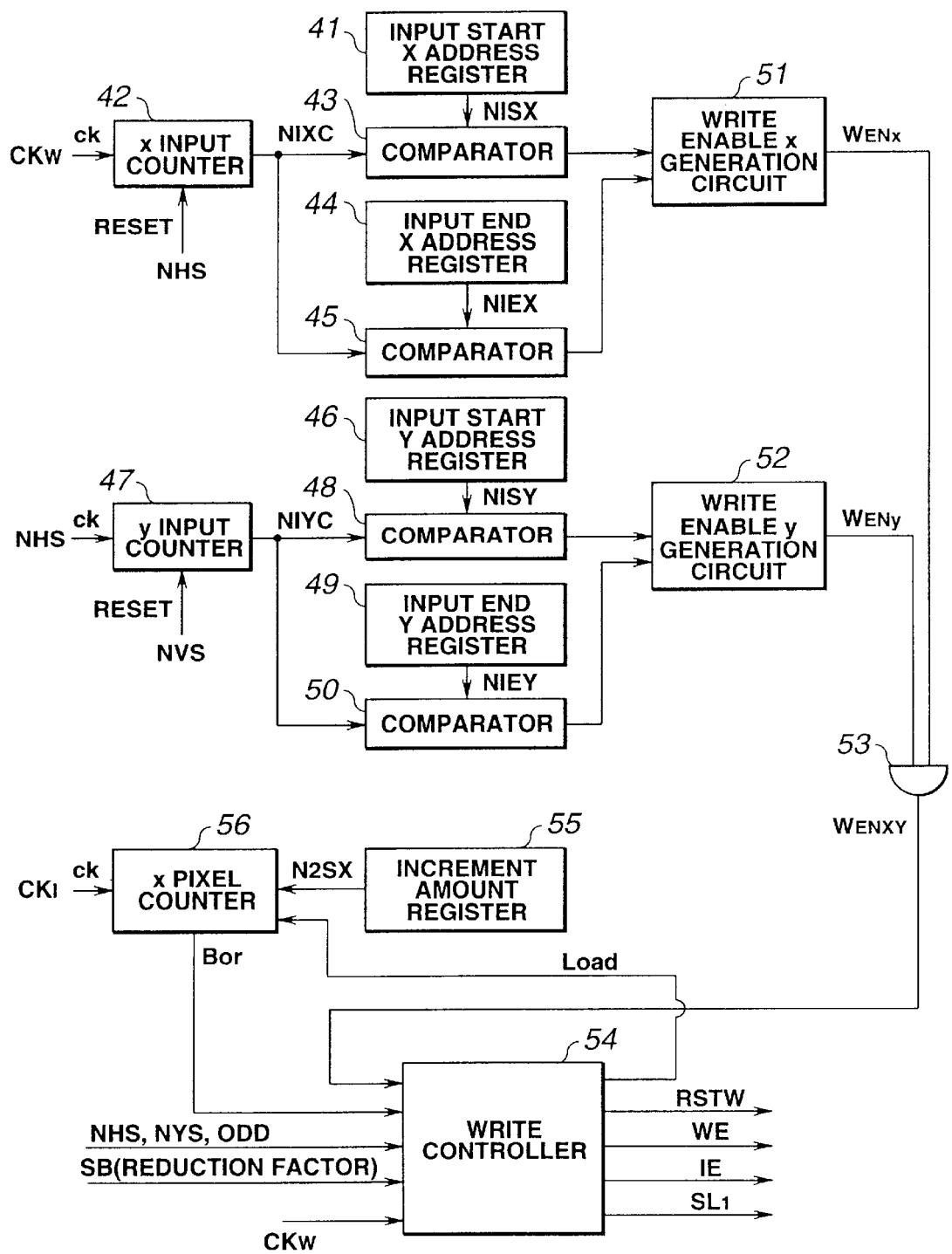
FIG. 16 is a block diagram of the write control system.
Figure 17:
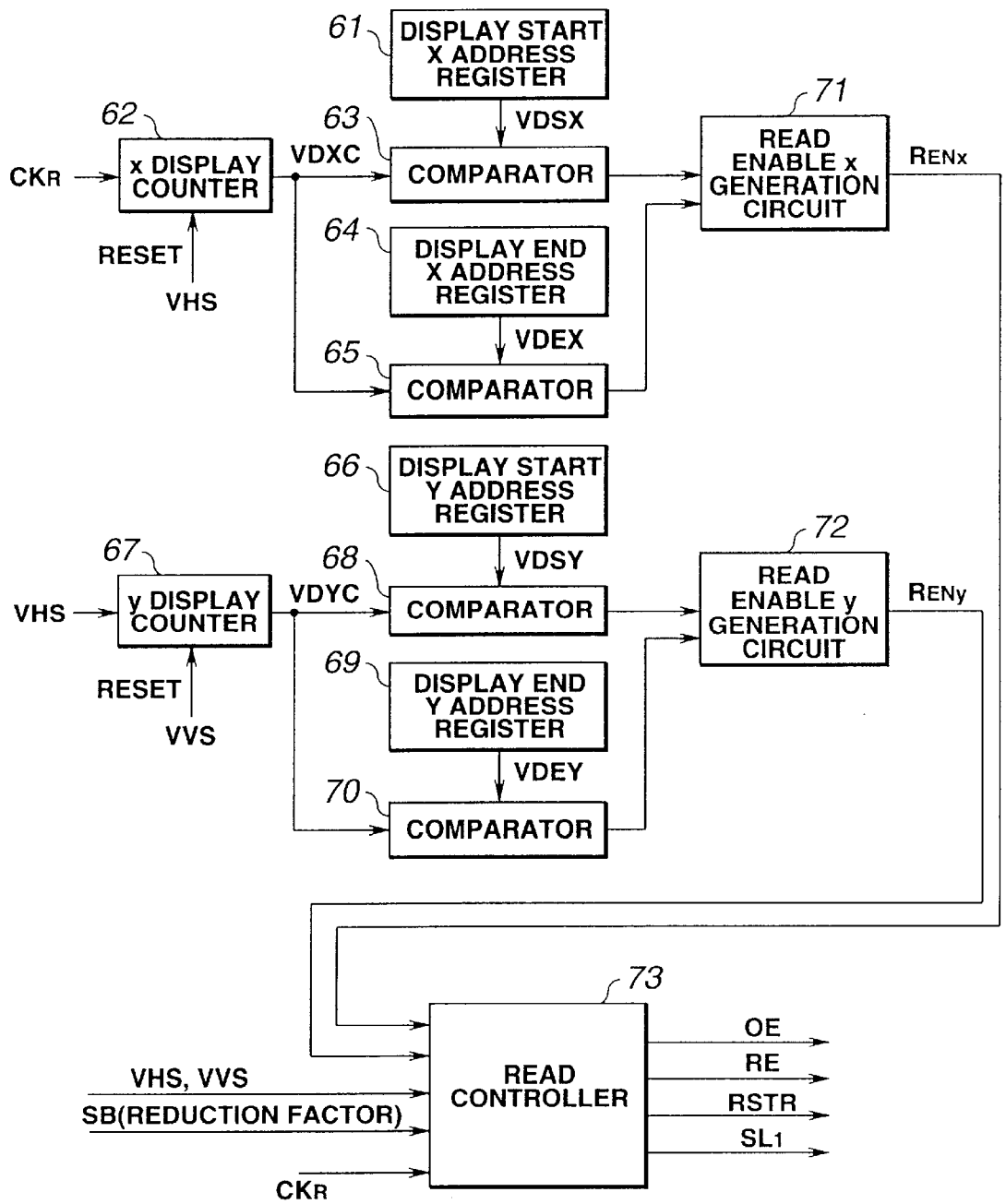
FIG. 17 is a block diagram of the read control system.

FIG. 16 illustrates the structure of the write control system for the frame memory 20 in the controller 10. The functions of the various structural elements will be described through reference to the time chart of FIG. 18.

In FIG. 16, the address values NISX, NIEX, NISX, and NIEY inputted from the synthesis setting device 30 in FIG. 1 are set to an input start X address register 41, an input end X address register 44, an input start Y address register 46, and an input end Y address register 49, respectively.

The count of an X input counter 42 is reset by the horizontal synchronization signal NHS inputted from the synchronous separation circuit 7, and this X input counter 42 executes its counting operation synchronously with the write dot clock signal CKw inputted from the write clock generation circuit 11. The count NIXC thereof is outputted to comparators 43 and 45. The comparator 43 compares the above-mentioned count NIXC with the set address value NISX, and if there is a match, outputs a match signal. The comparator 45 compares the count NIXC with the set address value NIEX, and if there is a match, outputs a match signal. A write enable X generation circuit 51 generates a write enable X signal WENx that is H when the match signal is outputted from the comparator 43, and is then L when the match signal from the comparator 45 is outputted.

The count of a Y input counter 47 is reset by the vertical synchronization signal NVS inputted from the synchronous separation circuit 7, and this Y input counter 47 executes its counting operation synchronously with the horizontal synchronization signal NHS. The count NIYC thereof is outputted to comparators 48 and 50. The comparator 48 compares the above-mentioned count NIYC with the set address value NISY, and if there is a match, outputs a match signal. The comparator 50 compares the count NIYC with the set address value NIEY, and if there is a match, outputs a match signal. A write enable Y generation circuit 52 generates a write enable Y signal WENy that is H when the match signal is outputted from the comparator 48, and is then L when the match signal from the comparator 50 is outputted.

Specifically, the write enable X signal WENx indicates that the main scanning direction address of the inputted sub-image data corresponds to the synthesis region P shown in FIG. 3, and the write enable Y signal WENy indicates that the sub-scanning direction address of the inputted sub-image data corresponds to the synthesis region P shown in FIG. 3. The signals WENx and WENy are ANDed by an AND circuit 53, and are inputted to a write controller 54 as a write enable signal WENxy used for controlling the writing of the sub-image data.

The increment amount data N2SX inputted from the synthesis setting device 30 is set to an increment amount register 55. An X pixel counter 56 loads the setting N2SX of the increment amount register 55 every time a load signal Load is inputted from the write controller 54, and decrements the count of this load value synchronously with the high-speed clock signal CKi outputted from the high-speed clock generation circuit 12 of FIG. 11. Therefore, a borrow signal Bor generated upon completion of the count decrementation is outputted to the write controller 54. Specifically, this borrow signal Bor is outputted when the above-mentioned address incrementation operation is completed.

The write controller 54 forms and outputs the reset write signal RSTW to the frame memory 20, the write enable signal WE, the input enable IE, and the switch signal SL2 for the selector 13 on the basis of the write enable signal WENxy, the borrow signal Bor, the horizontal synchronization signal NHS, the vertical synchronization signal NVS, the field discrimination signal ODD, the scale factor data SB, and so forth.

The reset write signal RSTW generates the vertical synchronization signal NVS of the sub-image data as a trigger (see FIG. 18(e)). With the sub-image data, the vertical synchronization signal NVS is generated at the start of each odd-numbered field and even-numbered field, so the write address pointer of the frame memory 20 is reset in field units (odd-numbered fields and even-numbered fields).

The load signal is outputted at the point when the vertical synchronization signal NVS is inputted and every time the write enable signal WENxy inputted from the AND circuit 53 drops from H to L (see FIG. 18(d)).

The write enable signal WE goes to H when the write enable signal WENxy is at H and during the period from immediately after the drop in this write enable signal WENxy from H to L until the borrow signal Bor is outputted from the X pixel counter 56 (see FIG. 18(g)). Specifically, the purpose of setting the write enable signal WE to H when the write enable signal WENxy is at H is so that the sub-image will actually be written to the frame memory 20, while the purpose of setting the write enable signal WE to H during the period from immediately after the drop in this write enable signal WENxy from H to L until the borrow signal Bor is outputted from the X pixel counter 56 is so that the above-mentioned address incrementation operation (write address pointer incrementation operation) will be performed.

However, in the case of non-base fields (the even-numbered fields in FIG. 18), as shown above in FIG. 15, the address incrementation operation must be performed immediately after the vertical synchronization signal NVS of the non-base fields, so the write enable signal WE is set to H during the period from after the rise in the vertical synchronization signal NVS to H until the borrow signal Bor is outputted from the X pixel counter 56 by using the rise in the vertical synchronization signal NVS of the non-base fields as a trigger for effecting the count decrementation in the X pixel counter 56.

The input enable terminal IE is set to L when the above-mentioned address incrementation operation (write address pointer incrementation operation) is performed using the logic for producing the above-mentioned write enable signal WE.

Figure 18:
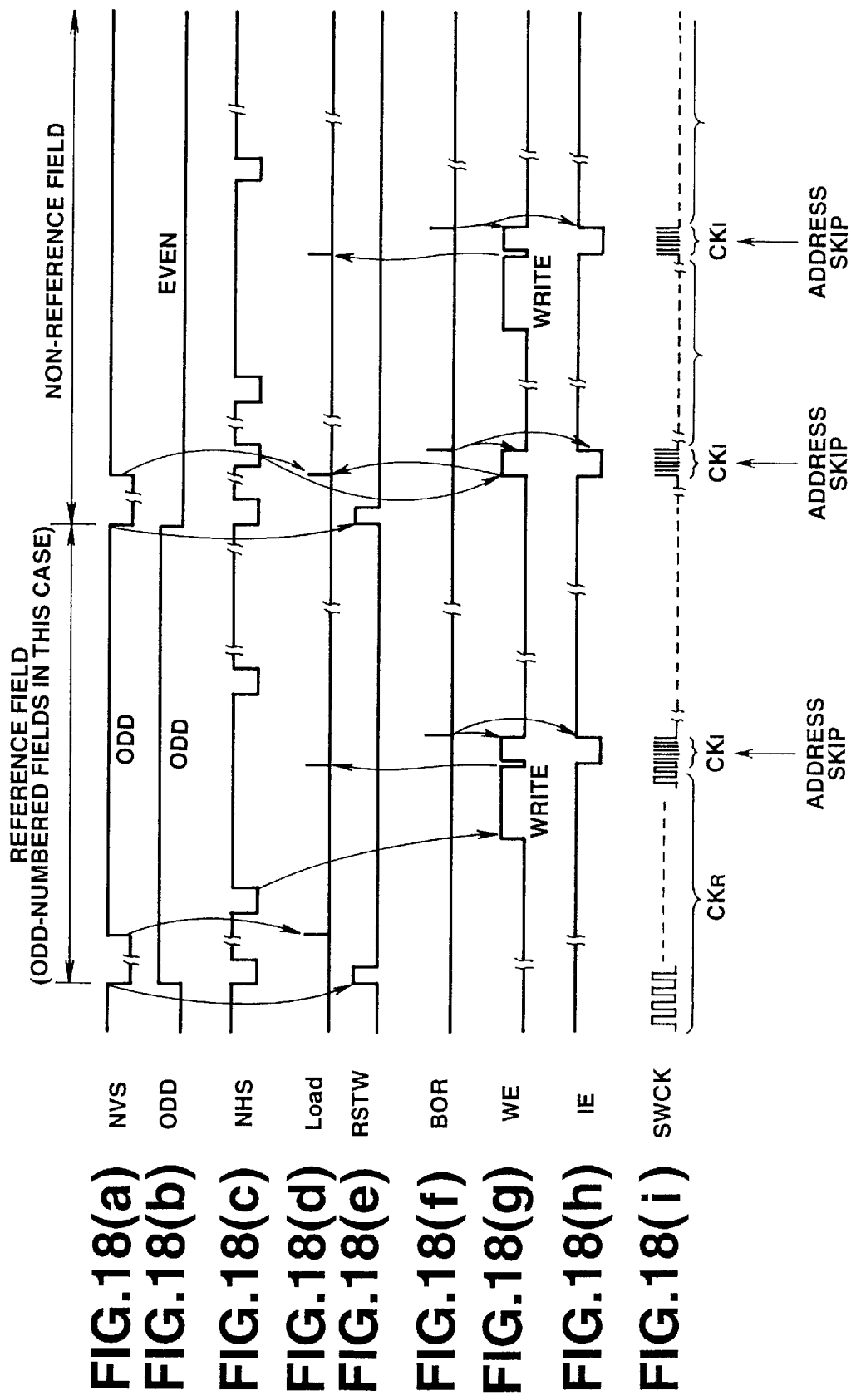
FIGS. 18(a) to 18(i) are time charts of various signals used in write control.

The select signal SL2 is the same signal as the input enable terminal IE. Therefore, as shown in FIG. 18(*i*), during the period while the select signal SL2 (the input enable terminal IE) is L, the address incrementation-use high-speed clock signal CKi is inputted to the serial write clock terminal SWCK of the frame memory, and during other periods, the write dot clock signal CKw outputted from the write clock generation circuit 11 is inputted to the serial write clock terminal SWCK.

FIG. 17 illustrates the structure of the read control system for the frame memory 20 in the controller 10.

In FIG. 17, the address values VDSX, VDEX, VDSX, and VDEY inputted from the synthesis setting device 30 in FIG. 1 are set to a display start X address register 61, a display end X address register 64, a display start Y address register 66, and a display end Y address register 69, respectively.

The count of an X display counter 62 is reset by the horizontal synchronization signal VHS inputted from the synchronous detection circuit 3, and this X display counter 62 executes its counting operation synchronously with the read dot clock signal CKr inputted from the read clock signal generation circuit 5. The count VDXC thereof is outputted to comparators 63 and 65. The comparator 63 compares the above-mentioned count VDXC with the set address value VDSX, and if there is a match, outputs a match signal. The comparator 65 compares the count VDXC with the set address value VDEX, and if there is a match, outputs a match signal. A read enable X generation circuit 71 generates a read enable X signal RENx that is H when the match signal is outputted from the comparator 63, and is then L when the match signal from the comparator 65 is outputted.

The count of a Y display counter 67 is reset by the vertical synchronization signal VVS inputted from the synchronous detection circuit 3, and this Y display counter 67 executes its counting operation synchronously with the horizontal synchronization signal VHS. The count VDYC thereof is outputted to comparators 68 and 70. The comparator 68 compares the above-mentioned count VDYC with the set address value VDSY, and if there is a match, outputs a match signal. The comparator 70 compares the count VDYC with the set address value VDEY, and if there is a match, outputs a match signal. A read enable Y generation circuit 72 generates a read enable Y signal RENy that is H when the match signal is outputted from the comparator 68, and is then L when the match signal from the comparator 70 is outputted.

Specifically, the read enable X signal RENx indicates that the main scanning direction address of the inputted main image data corresponds to the synthesis region Q shown in FIG. 2, and the read enable Y signal RENx indicates that the sub-scanning direction address of the inputted main image data corresponds to the synthesis region Q shown in FIG. 2. The signals RENx and RENy are inputted to a read controller 73 in order to control the read-out of the sub-image data.

The read controller 73 forms and outputs the reset read signal RSTR that goes to the frame memory 20, the read enable signal RE, the output enable OE, and the switching signal SL1 for the selector 6 on the basis of the read enable signals RENx and RENy, the horizontal synchronization signal VHS, the vertical synchronization signal VVS, the scale factor data SB, and so on.

This read controller 73 superimposes the sub-image over the partial region Q of the main image display area by switching to the main image and reading and outputting the sub-image stored in the frame memory 20 when the synthesis region Q of the display area is scanned synchronously with the timing of the non-interlaced scanning of the main image. The output signal of this read controller 73 will not be described in detail since the function thereof is the same as in the past. However, because the interlaced sub-image is stored in a continuous address region of the frame memory 20 in the order of the non-interlaced scan lines, as mentioned above, the read address thereof is a continuous address, and the required sub-image data can be read out by extremely simple address control. Furthermore, the H or L level of the switching signal SL1 of the selector 6 outputted from the read controller 73 is determined so that the sub-image data read out from the frame memory 20 will be selected during the period while the read enable signals RENx and RENy are both H, and the main image data outputted from the A/D converter 4 will be selected during other periods.

The action of the image synthesizing device structured as above will now be described.

Since the operation in the course of superimposing the sub-image over the main image in full scale is probably clear from the above description, the operation in the course of superimposing the sub-image over the main image in reduced scale will be described.

Here, we will describe the synthesis of the sub-image of the extraction region P shown in FIG. 13, reduced to a scale of 1/M.

Specifically, a reduction of 1/M is accomplished by the following thinning-out processing.

For the Y direction, the images of the odd-numbered fields and even-numbered fields out of the sub-image included in the extraction region P are both extracted once every M lines, and these extracted images are written to the frame memory 20, resulting in the sub-image being reduced to 1/M in the Y direction. For example, when the reduction is to 1/3, the number-one line in the odd-numbered fields (the first line in terms of a frame), the number-four line (the seventh line of a frame), the number-seven line (the thirteenth line of a frame), and so forth are extracted to reduce the odd-numbered fields to 1/3. Meanwhile, the number-two line of the even-numbered fields (the fourth line in terms of a frame), the number-five line (the tenth line of a frame), the number-eight line (the sixteenth line of a frame), and so forth are extracted to reduce the even-numbered fields to 1/3.

For the X direction, the images are extracted once every M dots with respect to the images of the lines in the above-mentioned thinned-out odd- and even-numbered fields, which reduces the sub-image to 1/M in the X direction.

Thus, the sub-image is stored in the frame memory 20 after being reduced to 1/M in the main and sub-scanning directions. However, the address incrementation operation described through reference to FIGS. 14 and 15 above is also carried out in the course of the writing operation with this reduction, and the reduced sub-image is stored in a continuous address region of the frame memory 20 in the order of the non-interlaced scan.

In the course of reading, the main and sub-images undergo a switching operation so that the size of the sub-image synthesis region Q shown in FIG. 12 is reduced to 1/M in the X and Y directions, and the above-mentioned reduced sub-image data is displayed within this reduced area Q.

This 1/M reduction operation will now be described in more detail.

First, the address values corresponding to NISX=X1, NISY=Y1/2, NIEX=X2, and NIEY=Y2/2 and the amount of address incrementation corresponding to N2SX=(X2−X1)/M are outputted from the synthesis setting device 30, and this data is set in the various registers of the controller 10 as shown in FIG. 16. 1/M is inputted as the scale factor data SB to the write controller 54 in FIG. 16.

If we assume the synthesis of sub-image data reduced to 1/M in the synthesis region Q shown in FIG. 12, then address values corresponding to VDSX=XM1, VDSY=YM1, VDEX=XM2, and VDEY=YM2 are outputted from the synthesis setting device 30, and this data is set in the various registers of the controller 10 as shown in FIG. 17.

In this case, since there is no need for the size of the synthesis region Q to be reduced according to the reduced sub-image, the values of the above-mentioned VDSX=XM1, VDSY=YM1, VDEX=XM2, and VDEY=YM2 are computed in the synthesis setting device 30 so as to satisfy the following:

NIEX−NISX=M(VDEX−VDSX)

NIEY−NISY≧M(VDEY−VDSY)/2        (12)

and these values are set in the various registers of the controller 10 as shown in FIG. 17.

First, the write processing by the controller 10 is performed as follows.

We will assume in this case that the base fields are odd-numbered fields and the non-base fields are even-numbered fields.

The write controller 54 outputs the reset write signal RSTW at the point when the vertical synchronization signal NVS of the odd-numbered fields is detected, and resets the write address pointer of the frame memory 20 so that the data from the leading address region is stored.

After this, the images of the lines of the odd-numbered fields are successively inputted along with the horizontal synchronization signal NHS for every line.

Then, when the write enable signal WENxy outputted from the AND circuit 53 goes to H, the write controller 54 thins the sub-image of the odd-numbered fields at the scale factor 1/M and writes to the frame memory 20 while this H is in effect (when the extraction region P is being scanned), and this processing is carried out as follows.

For the Y direction, the horizontal synchronization signals NHS are counted, and the write enable signal WE and the input enable signal IE are raised to H once every time M number of horizontal synchronization signals have been inputted, which results in a sub-image of corresponding lines being written to the frame memory 20 once for every M lines.

For the X direction, the write dot clock signals CKw are counted, and the write enable signal WE is raised to H once every time M number of dot clock signals CKw have been inputted, which results in a sub-image of corresponding pixels being written to the frame memory 20 once for every M pixels.

Every time the thinning-out and writing is complete for one line of the sub-image included in the extraction region P, the write controller 54 outputs a load signal to the X pixel counter 56 and loads the address incrementation value N2SX set in the incrementation amount register to the X pixel counter 56, and the decrementation operation from this load value N2SX is carried out synchronously with the high-speed clock signal CKi. The write controller 54 then changes the input enable signal IE to L during the period while the decrementation operation is being performed by the X pixel counter 56, which advances the write address pointer of the frame memory 20 by an address amount corresponding to an image equal to the number of pixels after reduction in the main scanning direction within the extraction region P. As a result, an address region is reserved in the next non-base field (an even-numbered field in this case) for the storage of an extracted image of the corresponding lines. During the period while the incrementation processing of this write address pointer is being carried out, the dot clock signal CKw is switched and the high-speed clock CKi is inputted to the serial write clock terminal SWCK of the frame memory 20, as mentioned above, so the above-mentioned incrementation operation is accomplished in an extremely short time.

Thus, at this stage, images of odd-numbered fields of the extraction region P reduced to 1/M are stored in alternating address regions of the frame memory 20.

Next, when the write controller 54 detects the vertical synchronization signal NVS of an even-numbered field, a reset write signal RSTW is outputted at this point and the write address pointer of the frame memory 20 is reset, so that the data from the leading address region is stored. The write controller 54 then makes use of the X pixel counter 56 to perform the incrementation operation for the write address pointer in the same manner as above, the result of which is that the address is offset by an amount equal to the address region corresponding to the image of the first of the previously stored lines in the extraction region P of the even-numbered fields (more precisely, the first line selected by thinning out).

After this, the images of the lines of the even-numbered fields are successively inputted along with the horizontal synchronization signal NHS for every line.

Then, when the write enable signal WENxy outputted from the AND circuit 53 goes to H, the write controller 54 thins the sub-image of the even-numbered fields at the scale factor 1/M and writes to the frame memory 20 in the same manner as above while this H is in effect (when the extraction region P is being scanned).

The write controller 54 writes the reduced images of even-numbered fields to the address regions emptied in the course of the previous writing of the odd-numbered fields by performing the same address pointer incrementation operation as above every time the thinning-out and writing of one line of sub-image is completed for the even-numbered fields included in the extraction region P. As a result, a reduced interlaced image is stored in a continuous address region of the one frame memory 20 in the order of the non-interlaced scan lines. The above write operation is executed repeatedly.

Next, in the course of reading, the values VDSX, VDSY, VDEX, and VDEY that satisfy the above-mentioned Formula 12 are set by the synthesis setting device 30 in the various registers of the controller 10 as shown in FIG. 17.

Therefore, the write enable signals RENx and RENy go to H and are outputted from the read enable X generation circuit 71 and the read enable Y generation circuit 72 in FIG. 17 when the scanning address of the main image is within the range designated by VDSX, VDSY, VDEX, and VDEY.

When these write enable signals RENx and RENy are both H, the read controller 73 outputs the sub-image stored in the frame memory 20 in order from the leading address synchronously with the read dot clock signal CKr. The read controller 73 switches the select signal SL1 to the sub-image selection side when the above-mentioned write enable signals RENx and RENy are both H, which causes the sub-image that is read out to be outputted to the display 1 via the selector 6.

As a result, the sub-image in the above-mentioned extraction region P is reduced to 1/M and superimposed over a specific region of the display 1.

Thus, with this embodiment, it is possible to display an interlaced scan sub-image superimposed over the main image screen of a non-interlaced scan by using a single serial access memory 20.

Next, yet another embodiment of this invention will be described through reference to FIGS. 19 to 23, among others.

Again with this embodiment in FIGS. 19 to 23, just as with the previous embodiment illustrated in FIGS. 11 to 18, the image in any extraction region P out of an interlaced scan sub-image is displayed superimposed over a synthesis region Q that is part of the display area G of a display on which a non-interlaced scan main image is displayed, as shown in FIGS. 12 and 13.

In this embodiment illustrated in FIGS. 19 to 23, a single ordinary video memory (VRAM) 200 is used as the frame memory in which the sub-image is stored, an interlaced signal is converted into a non-interlaced signal by performing the above-mentioned write control illustrated in FIGS. 14 and 15 for this VRAM 200, and the converted non-interlaced signal is stored in a continuous address region within the VRAM 200. Also, with this embodiment, the function of the above-mentioned line buffer FIFO 108 illustrated in FIG. 1 is substituted with a serial access memory (hereinafter referred to as SAM) housed within the VRAM 200, which allows magnification processing to be carried out without providing a line buffer consisting of a special and separate IC on the output side of the frame memory.

Figure 19:
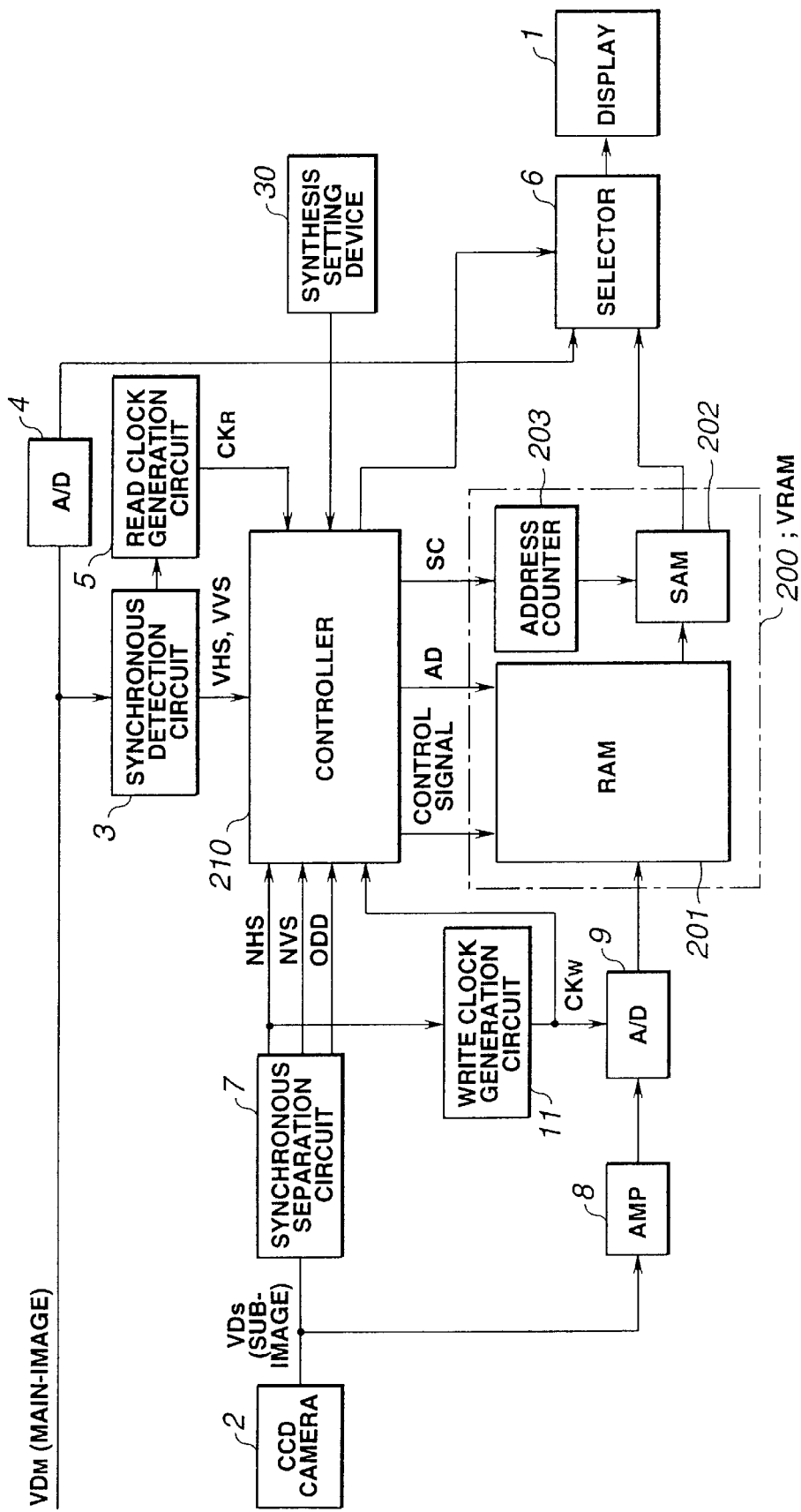
FIG. 19 is a block diagram of the overall system in another embodiment of this invention.
Figure 20:
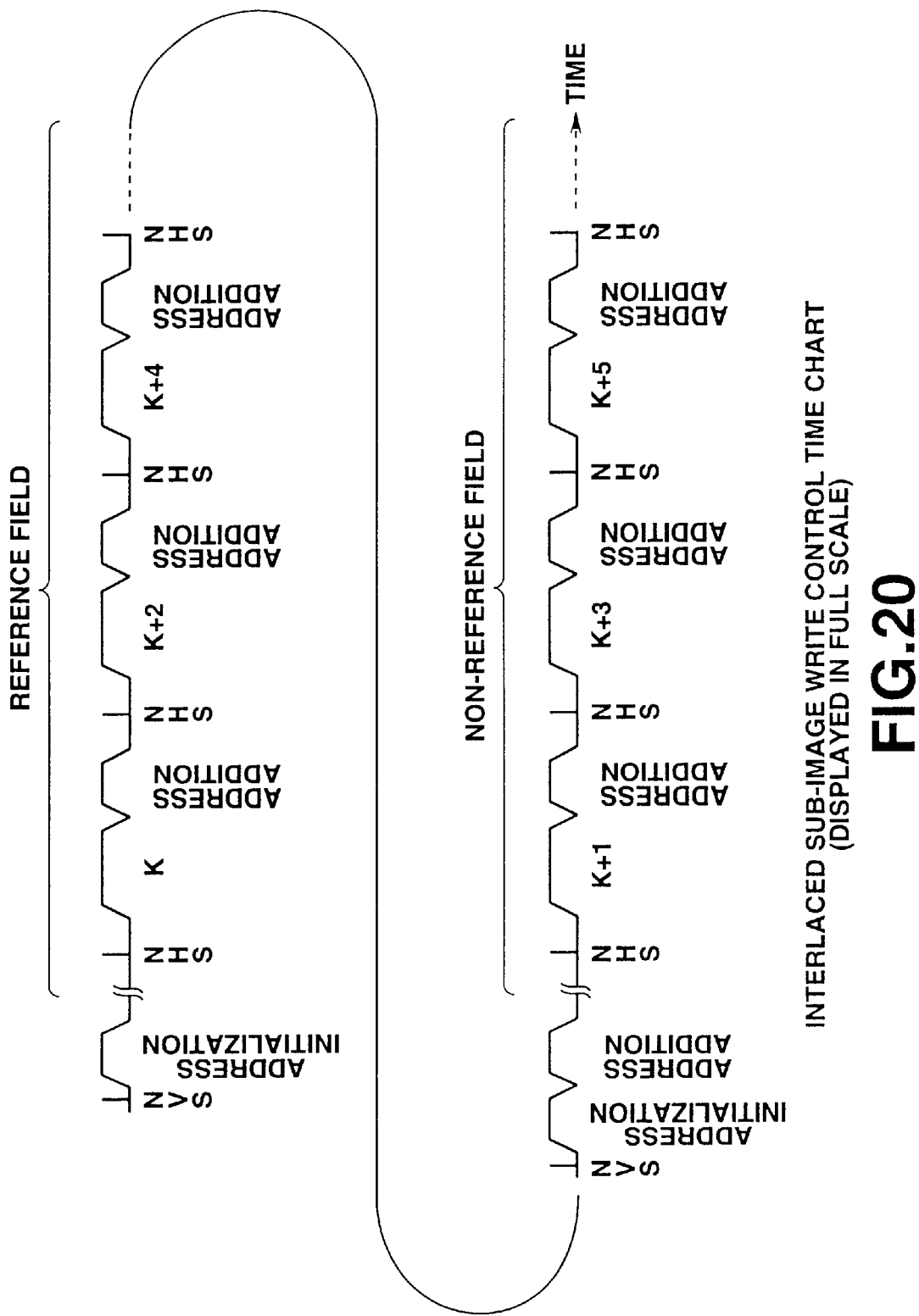
FIG. 20 is a diagram of a sub-image storage aspect with a video memory.

FIG. 20 conceptually illustrates a time chart of the write control of the full-scale display of an interlaced sub-image with respect to the VRAM 200 in this embodiment. In FIG. 20, the "address incrementation processing" illustrated in FIG. 15 is replaced with "address addition processing." Specifically, in the VRAM 200 shown in FIG. 19, the address is not renewed by an incrementation operation on the basis of the write address pointer clock signal as it was with the serial access memory 20 in FIG. 11, and instead the address signal itself is directly inputted to the VRAM 200 to effect addressing, so the sub-image of the base fields is written to alternating address regions of the VRAM 200 just as above by subjecting the address to addition processing by an address equal to the amount of the above-mentioned incrementation. As a result of the sub-image of the non-base fields being written in between these alternating address regions, an interlaced sub-image is stored in a continuous address region of the one VRAM 200 in the order of the non-interlaced scan lines.

This embodiment will now be described in further detail through reference to the figures.

FIG. 19 is an overall view of the image synthesizing device in this embodiment. In FIG. 19, those components that have the same function as the constituent elements shown in FIG. 11 are labeled the same, and redundant description will be omitted.

In FIG. 19, the VRAM 200 used as the frame memory where the interlaced scan sub-image is stored has a dynamic random access memory (hereinafter referred to as RAM) 201, a SAM 202, and an address counter 203. The RAM 201 executes a write operation, in which the sub-image data inputted from the A/D converter 9 is written according to the writing and reading control signals and address signals that are inputted from a controller 210, and a data transfer operation, in which the stored sub-image data is outputted to the SAM 202 according to these same control signals and address signals. The address counter 203 forms and outputs the output address of the SAM 202 according to a serial clock signal SC inputted from the controller 210. The SAM 202 serially outputs the temporarily stored sub-image data according to the address signals inputted from the address counter 203.

Figure 21:
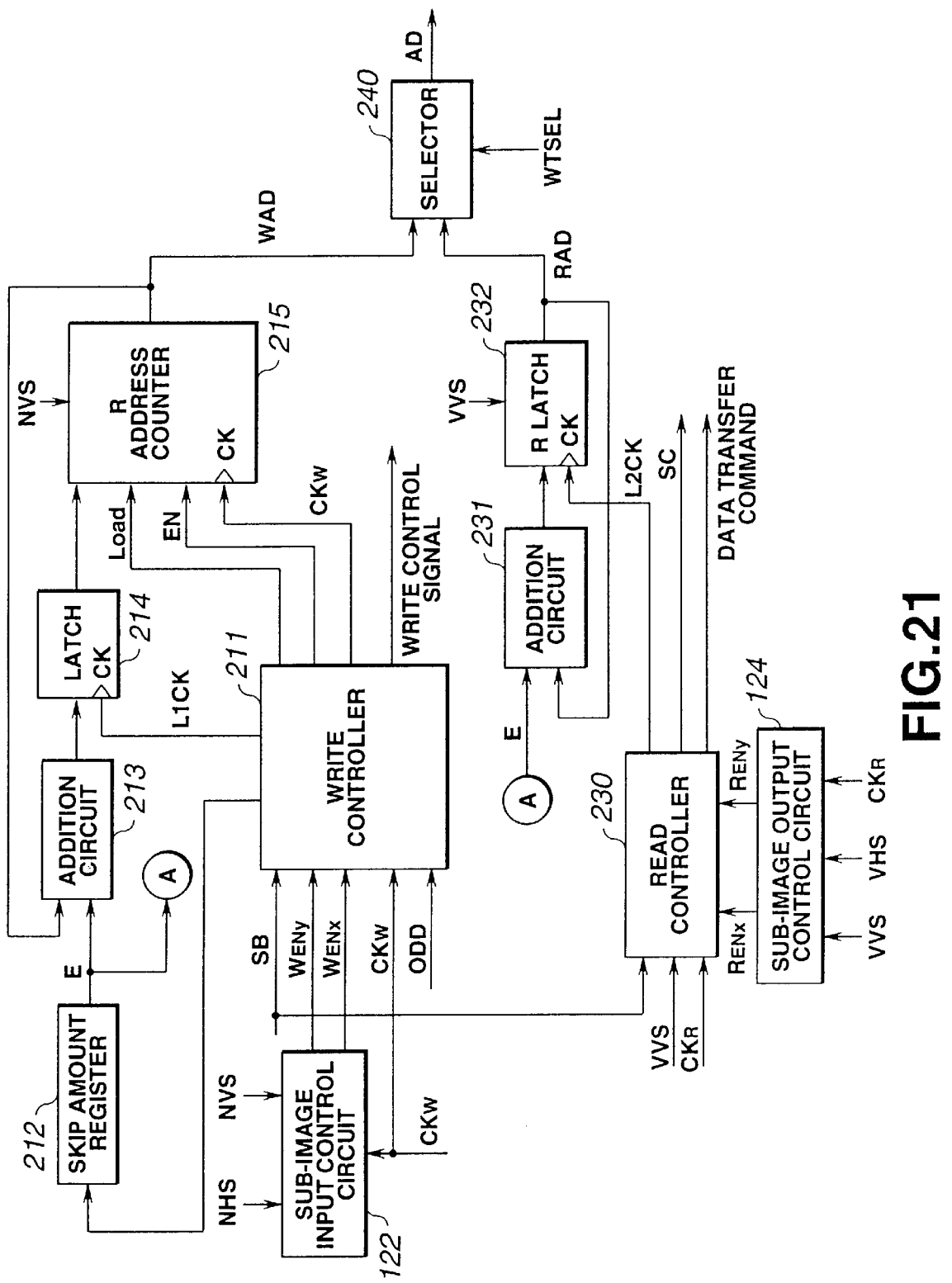
FIG. 21 is a diagram of an example of the internal structure of the controller in FIG. 19.

FIG. 21 illustrates the internal structure of the controller 210 in FIG. 19. The write control system has a write controller 211, a sub-image input control circuit 122, a skip amount register 212, an addition circuit 213, a latch 214, and an address counter 215. The read control system has a read controller 230, a sub-image output control circuit 124, an addition circuit 231, a latch 232, and so on.

First, let us describe the write control system.

The sub-image input control circuit 122 has the same internal structure as that illustrated in FIG. 6 or FIG. 16. The write enable X signal WENx and the write enable Y signal WENy are formed on the basis of the write dot clock signal CKw, the horizontal synchronization signal NHS, and the vertical synchronization signal NVS, and these signals are inputted to the write controller 211. Specifically, as discussed above, this write enable X signal WENx indicates that the main scanning direction address of the inputted sub-image data corresponds to the display region P shown in FIG. 13, and this write enable X signal WENx is at the high level only when the main scanning direction address of the sub-image data is the image data in the extraction region P. The write enable Y signal WENy indicates that the sub-scanning direction address of the inputted sub-image data corresponds to the display region P shown in FIG. 13, and is at the high level only when the sub-scanning direction address of the sub-image data is the image data in the extraction region P.

The skip amount register 212 corresponds to the increment amount register 55 in the embodiment illustrated in FIG. 11 (see FIG. 16), and when full-scale synthesis is effected by the write controller 211, an address amount E is set which corresponds to the number of dots in the horizontal direction within the extraction region P shown in FIG. 13. In the case of synthesis reduced to 1/M, an address amount corresponding to E/M is set.

The addition circuit 213 adds the output address WAD of the address counter 215 to the skip amount E set in the skip amount register 212, and outputs this addition result to the latch circuit 214. The latch circuit 214 latches the output of the addition circuit 213 according to a latch timing signal L1CK.

The address counter 215 has its output reset by the synchronization component of the vertical synchronization signal NVS, incorporates the output of the latch circuit 214 as an initial setting according to the load signal Load, and performs a count operation synchronously with the write dot clock signal CKw from this incorporated initial setting. The count output thereof is outputted as the write address signal WAD to the VRAM 200. However, this address counter 215 only executes its count operation when the enable signal EN is enabled.

Figure 22:
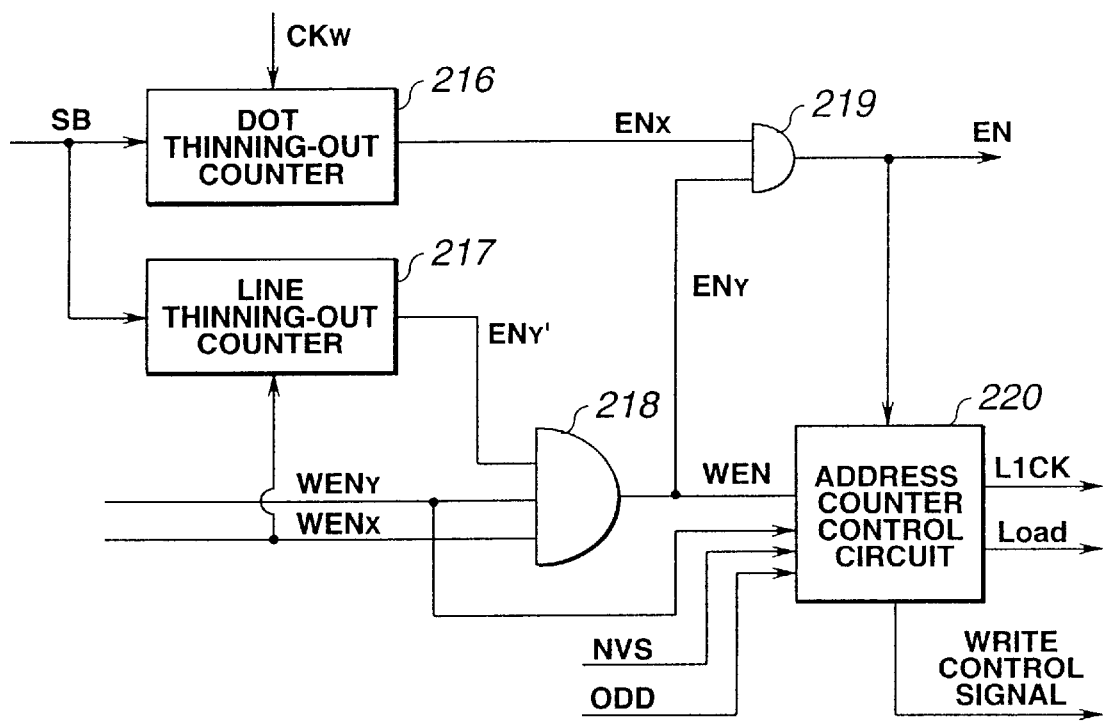
FIG. 22 is a diagram of an example of the internal structure of the write controller in FIG. 21.

The internal structure of the write controller 211 is illustrated in FIG. 22.

In FIG. 22, a dot thinning-out counter 216 thins the dots in the horizontal direction during reduction processing, and when the reduction is to 1/M, forms an enable signal ENx such that the count operation of the address counter 215 will be executed just once for every M number of write dot clock signals CKw that are inputted, and outputs this enable signal ENx to an AND circuit 219. Specifically, the dot thinning-out counter 216 counts the write dot clock signals CKw on the basis of the scale factor data SB (at a reduction factor of 1/M), which results in the enable signal ENx being raised to H once for every M number of write dot clock signals CKw that are inputted. Naturally, the enable signal ENx is always at H in the case of full-scale processing.

A line thinning-out counter 216 thins in the sub-scanning direction in reduction processing. If the reduction is to 1/M, then this line thinning-out counter 217 forms an enable signal ENy' such that the count operation of the address counter 215 will be executed just once for every M number of write enable X signals WENx that are inputted, and outputs this enable signal ENy' to an AND circuit 218. Specifically, the line thinning-out counter 217 counts the write enable X signals WENx on the basis of the scale factor data SB (at a reduction factor of 1/M), which results in the enable signal ENy' being raised to H once for every M number of write enable X signals WENx that are inputted. Naturally, the enable signal ENy' is always at H in the case of full-scale processing.

The AND circuit 218 ANDs the enable signal ENy', the write enable X signal WENx, and the write enable Y signal WENy, and outputs the AND output WEN thereof to the AND circuit 219 and an address counter control circuit 22. Therefore, the output WEN of the AND circuit 218 goes to the high level when there is a line which is actually written and which has remained after the thinning-out to the reduction factor of 1/M (there is no thinning-out in the case of full-scale display) out of the lines in the extraction region P shown in FIG. 13. The duration of this high level is defined by the write enable X signal WENx.

This signal WEN and the enable signal ENx are ANDed by the AND circuit 219, and this AND output is inputted as the enable signal EN to the address counter 215. Therefore, the enable signal EN is the result of adding horizontal thinning-out (there is no thinning-out in the case of full-scale display) to the above-mentioned signal WEN, and goes to the high level when there is a dot which is actually written and which has remained after the thinning-out by the dot thinning-out counter 216 out of the interval when the signal WEN is at the high level.

Figure 23:
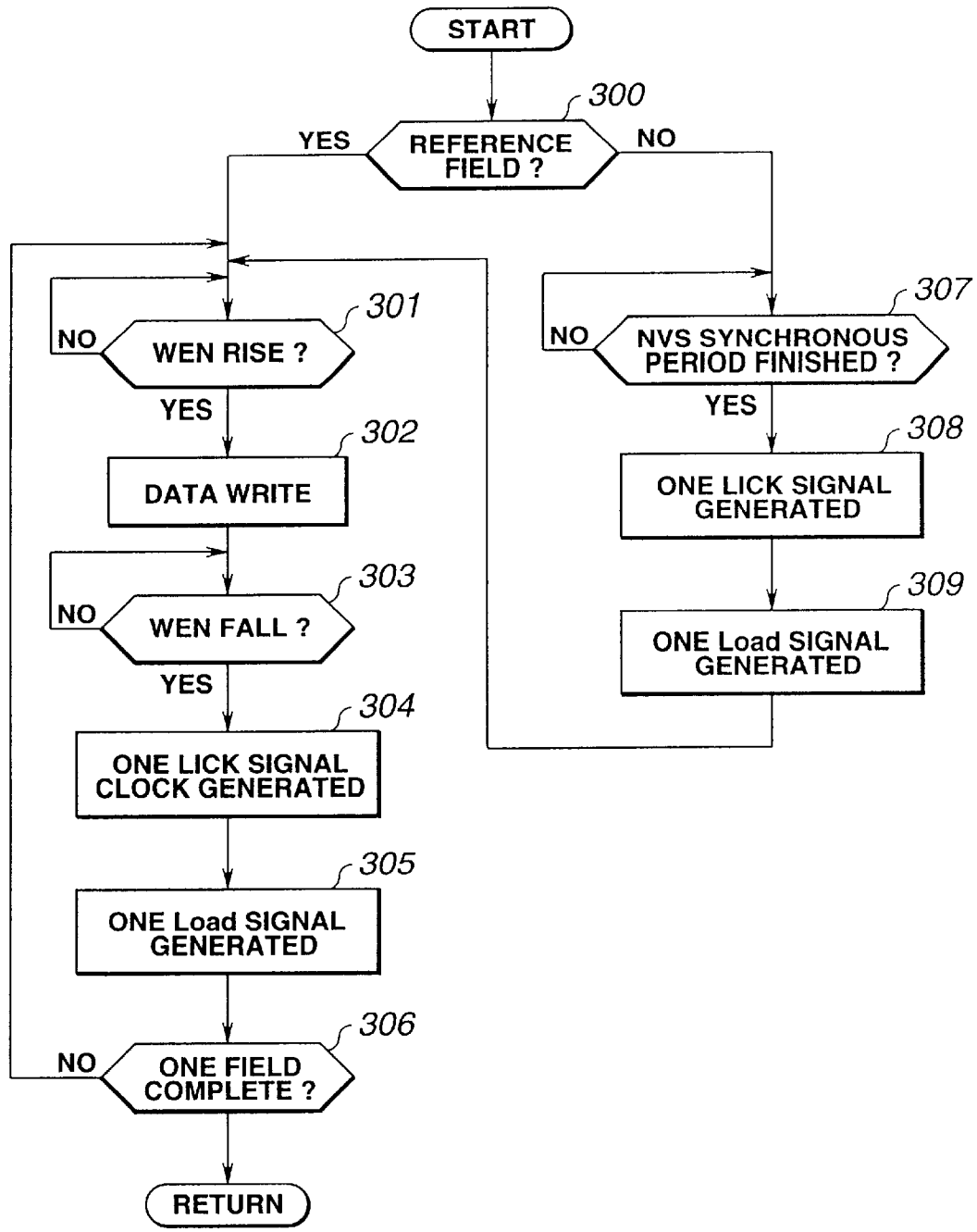
FIG. 23 is a time chart illustrating the conceptual operation of the address counter control circuit in FIG. 22.

On the basis of the above-mentioned WEN signal, the enable signal EN, the vertical synchronization signal NVS, the field discrimination signal ODD, and the like, the address counter control circuit 220 forms the latch timing signal L1CK outputted to the latch circuit 214 shown in FIG. 21, the load signal Load outputted to the address counter 215, and a write control signal for writing data to the VRAM 200, and the details of this formation are shown in the flow chart of FIG. 23. The address counter control circuit 220 actually comprises a digital circuit, but for the sake of convenience the processing details thereof are illustrated in a flow chart.

The address counter control circuit 220 decides on the basis of the field discrimination signal ODD or the like whether the current field is a base field (step 300) and, if it is a base field, decides the rise of the WEN signal (step 301). It then forms write control signals for writing data to the VRAM 200 while WEN signal is rising, and inputs these write control signals to the VRAM 200, thereby causing the sub-image corresponding to the extraction region P to be written to the VRAM 200 during the period while the WEN signal is rising (step 302). Address control during writing will be discussed below.

When the fall of the WEN signal is subsequently detected, the latch timing signal L1CK and the load signal Load at this point are generated in that order as one pulse each (steps 303 to 305). Then, while a decision is made on the basis of the WENy signal and the like as to whether the scan lines of the sub-image belong to the extraction region P (step 306), the above processing is executed repeatedly, the result of which is that the above operation is repeatedly executed between the scan lines of the base fields corresponding to the extraction region P.

Meanwhile, once the input of the sub-image on the non-base field side begins, the address counter control circuit 220 detects this on the basis of the field discrimination signal ODD or the like. As mentioned above, the synchronization component of the vertical synchronization signal NVS is inputted prior to the input of the image of the non-base fields, so the address counter control circuit 220 generates one pulse each of the latch timing signal L1CK and the load signal Load (steps 308 and 309), in that order, at the point when the synchronization interval of the vertical synchronization signal NVS is complete (step 307). The processing thereafter is the same as for the base fields, wherein processing in which write control signals for writing data to the VRAM 200 are formed during the period when the WEN signal is rising, and processing in which the latch timing signal L1CK and the load signal Load are each generated as one pulse at the point when the fall of the WEN signal is detected, are repeatedly executed between the scan lines corresponding to the extraction region P (steps 301 to 306).

Next, the write operation carried out by the write control system in FIG. 21 will be described through reference to the time chart in FIG. 20. Here, we will assume that the sub-image of extraction region P shown in FIG. 13 is to be written in full scale to the VRAM 200.

Because the synchronization component of the vertical synchronization signal NVS is inputted prior to the input of the image of the base fields, the address counter 215 is reset by this synchronization component of the vertical synchronization signal NVS. Therefore, the write address signal WAD outputted from the address counter 215 at this point specifies the leading address region of the RAM 201. After this, the sub-image of the lines on the base field side is successively inputted along with the horizontal synchronization signal NHS for every line, but since the enable signal EN outputted from the write controller 211 does not become enabled until the line number of the images of the inputted base fields reaches line K, which is the leading line in the extraction region P, the address counter 215 does not operate, and the output WAD thereof is maintained at the initial address. Also, because the write control signals needed for performing the write operation from the write controller 211 to the VRAM 200 do not become enabled during this period either, no write operation is performed by the VRAM 200.

Then, when the line number of the sub-image of the inputted base fields reaches the leading line number K of the extraction region P, and when the X direction address thereof is included in the extraction region P, the enable signal EN becomes enabled at this point, and the write control signal outputted from the write controller 211 also becomes enabled. Therefore, the address counter 215 executes a renewal operation for the write address signal WAD needed to write the images from the coordinate X1 to the coordinate X2 of the leading line K of the extraction region P by performing a count operation synchronously with the write dot clock signal CKw that is inputted. As a result, the sub-image of the Kth line included in the extraction region P is stored in order from the leading address region of the VRAM 200.

Because the WEN signal falls to the low level when this storage operation is complete, the latch timing signal L1CK and the load signal Load are each outputted as one pulse in that order from the address counter control circuit 220 of the write controller 211 (steps 303 to 305 in FIG. 23).

At this point, the final count value of the current count operation of the address counter 215 is inputted to the addition circuit 213, and this final count is added by the addition circuit 213 to the skip amount E set in the skip amount register 212. This addition result is latched by the latch circuit 214 at the point of input of the latch timing signal L1CK, after which it is loaded as the initial count into the address counter 215 by the load signal Load. The address counter 215 therefore executes the next count operation using this loaded value as the initial count.

Specifically, the above processing causes the write address signal WAD outputted from the address counter 215 to be skipped by the address E set in the skip amount register 212. Therefore, just as in the previous embodiment in FIG. 11, an address region is reserved for storing the extracted image of the (K+1)th line of the next non-base field. Specifically, the address is skipped by an address region corresponding to the images from the coordinate X1 to the coordinate X2 by performing the above-mentioned addition processing through utilization of the waiting period from immediately after the data is written until the next line is written.

After this, the image of the (K+2) line, the image of the (K+4) line, and so forth are successively inputted, so that portion of these line images included in the extraction region P is successively stored in the VRAM 200 by performing the same addition operation as above. As a result, first, the images on the base field side out of the sub-image in the extraction region P are stored in alternating address regions.

Next, the synchronization component of the vertical synchronization signal NVS is inputted prior to the input of the images on the non-base field side, so the address counter 215 is again reset at this point. When the synchronization interval of the vertical synchronization signal NVS is complete, the latch timing signal L1CK and the load signal Load are each outputted in one pulse in that order from the address counter control circuit 220 of the write controller 211 (steps 307 to 309 in FIG. 23).

At this point, the initial reset value of the address counter 215 has been inputted to the addition circuit 213, and this initial value and the skip amount E set in the skip amount register 212 are added by the addition circuit 213. This addition result is latched by the latch circuit 214 at the point of input of the latch timing signal L1CK, after which it is loaded as the initial count to the address counter 215 by the load signal Load. Therefore, the address counter 215 executes the subsequent count operation using this loaded value as the initial count.

Specifically, the above processing causes the write address signal WAD outputted from the address counter 215 to be skipped by the address E set in the skip amount register 212, and to be offset by an address region corresponding to the extracted image of the Kth line of the base field where the address WAD outputted from the address counter 215 has already been stored.

After this, the images of the lines on the non-base field side are successively inputted along with the horizontal synchronization signal NHS for every line.

Then, when the line number of the inputted image on the non-base field side becomes (K+1), an image corresponding to this (K+1)th line from the coordinate X1 to the coordinate X2 is stored in the next leading address region of the VRAM 200 by the same processing as above or other such processing. Specifically, the extracted image of the (K+1) line is stored in the address region reserved (skipped) for the extracted image of the (K+1) line in the course of the previous write operation in the base field.

When this storage of the (K+1) line is complete, the address is skipped to the address regions that were reserved for the (K+3)th line by performing the same address addition processing as above.

After this, the image of the (K+3) line, the image of the (K+5) line, and so forth are successively inputted, so that portion of these line images included in the extraction region P is successively stored in the frame memory 20 while the addresses are added in the same manner as above. As a result, the images on the non-base field side out of the sub-image in the extraction region P are stored in the address regions that were emptied in alternating fashion.

The above write operation is executed repeatedly.

Thus, an interlaced image can be stored in a continuous address region of the one VRAM 200 in the order of the non-interlaced scan lines.

Next, the read control system in FIG. 21 will be described.

As discussed above, the VRAM 200 has the RAM 201, the SAM 202, and the address counter 203, when a data read operation is to be performed, the data in the RAM 201 is first transferred to the SAM 202, and the data is outputted via the SAM 202. In the following description, the SAM 202 is assumed to have a capacity that allows one line of sub-image data to be stored.

If the read start address is specified to the RAM 201 in this read-out, data equal to the storage capacity of the SAM 202 can be transferred from the address region following this start address. This SAM 202 serially outputs the data from this start address on the basis of the count output according to the serial clock signal SC of the address counter 203.

In FIG. 21 the sub-image input control circuit 124 has the same internal structure as that shown in FIG. 8 or FIG. 17. The read enable X signal RENx and read enable Y signal RENy are formed on the basis of the horizontal synchronization signal VHS of the main image and the read dot clock signal CKr, and these signals are inputted to the read controller 230. Specifically, as discussed above, the read enable X signal RENx indicates that the main scanning direction address of the inputted main image data corresponds to the synthesis region Q shown in FIG. 12, and this read enable X signal RENx goes to the high level when the main scanning address of the main image data is the image data of the synthesis region Q. The read enable Y signal RENy indicates that the sub-scanning direction address of the inputted main image data corresponds to the synthesis region Q shown in FIG. 12, and goes to the high level when the sub-scanning direction address of the main image data is the image data of the synthesis region Q.

The addition circuit 231 adds the output of the latch circuit 232 to the value E set in the skip amount register 212, and outputs this addition result to the latch circuit 232. The latch circuit 232 latches the output of the addition circuit 231 according to a latch timing signal L2CK, and the latch output RAD thereof is outputted as a read start address to the VRAM 200 via a selector 240.

The selector 240 selects either the write address signal WAD or the read address signal RAD depending on a select signal WTSEL formed by a circuit (not shown) within the controller 210, and outputs this selected address signal to the address terminal of the VRAM 200. Here, the selector 240 usually selects the write address signal WAD, but the one time it will select the read address signal RAD is during the period from after the reading of data from the SAM 202 of this line included in the synthesis region Q is complete until the reading of data from the next line included in the synthesis region Q (the period when the read enable X signal RENx is disabled), and when the write processing to the VRAM 200 has not been performed. The data transfer operation from the RAM 201 to the SAM 202 is executed at this time.

The read controller 230 forms the latch timing signal L2CK, the serial clock signal SC, and the data transfer command on the basis of the vertical synchronization signal VVS of the main image, the read dot clock signal CKr, the scale factor data SB, the read enable X signal RENx, the read enable Y signal RENy, and so on, outputs the latch timing signal L2CK to the latch circuit 232, outputs the serial clock signal SC to the address counter 203, and outputs the data transfer command to the RAM 201.

Specifically, the latch timing signal L2CK, the serial clock signal SC, and the data transfer command are outputted in the following modes by the operation of the read controller 230 on the basis of the above-mentioned various input signals.

(a) Serial Clock Signal SC

With full-scale and reduction processing, the serial clock signal SC is outputted at the same frequency as the read dot clock signal CKr. When the processing is magnified M times, the serial clock signal SC is outputted after being divided to a frequency of 1/M of the read dot clock signal CKr.

(b) Data Transfer Command

As discussed above, the read enable X signal RENx goes to the high level for every main scanning line during the period from the coordinate X1 to the coordinate X2 when the main scanning direction address of the main image data is between the coordinate YM1 and the coordinate YM2 in FIG. 12, but a data transfer command is outputted once for every period while the sub-scanning direction address is from the coordinate YM1 to the coordinate YM2, and for every period during which the read enable X signal RENx falls to the low level and then rises to the next high level. Specifically, a data transfer command is generated once between the time from the completion of the reading of the sub-image data for a given line included in the synthesis region Q until the reading of the sub-image data for the next line included in the synthesis region Q, regardless of whether the processing is full-scale, reduced, or magnified. However, the vertical synchronization signal VVS is inputted prior to the input of one frame of main image, but if this vertical synchronization signal VVS is inputted by the read controller 230, a data transfer command is generated one time at this point. When a data transfer command is outputted, data is transferred from the RAM 201 to the SAM 202, and the address counter 203 is reset to the initial value.

(c) Latch Timing Signal L2CK

With full-scale and reduction processing, the latch timing signal L2CK is generated in one pulse for every scanning line of the main image. When the processing is magnified M times, one pulse is generated for every M scanning lines of the main image. However, the point when this L2CK is generated is the same as for the data transfer command, that is, L2CK is generated between the time from the completion of the reading of the main image data for a given line included in the synthesis region Q until the reading of the main image data for the next line included in the synthesis region Q (with magnified processing, M lines ahead).

Next, the read operation performed by the read control system in FIG. 21 will be described. Here, we will assume that the image stored in the VRAM 200 is read out in full scale.

First, the vertical synchronization signal VVS of the main image is inputted prior to the input of one frame of main image data. The latch circuit 232 is reset depending on the synchronization interval of this vertical synchronization signal VVS. Therefore, the leading address region of the RAM 201 is specified as the read address signal RAD for data transfer at this point. Using the completion of the interval in which this vertical synchronization signal VVS is synchronized as a trigger, the read controller 230 switches the selector 240 to the read address signal RAD side, switches the selector 6 in FIG. 19 to the VRAM 200 side, and outputs a data transfer command one time to the RAM 201 when the write operation to the VRAM 200 is not being performed. As a result, a data transfer operation is performed in which the leading address of the RAM 201 is used as the read start address for transferring data, and this results in a data transfer operation being executed in which sub-image data corresponding to the capacity of the SAM 202 is transferred from the leading address of the RAM 201 to the SAM 202.

After this, the main image of the various lines is successively inputted along with the horizontal synchronization signal VHS for every line, but the latch timing signal L2CK, the serial clock signal SC, and a new data transfer command are not outputted from the read controller 230 and no read operation is performed until the address in the Y direction of the inputted main image is in the area included in the synthesis region Q.

Then, when the addresses in the X and Y directions of the inputted main image reach the first line, the read enable X signal RENx and read enable Y signal RENy are enabled, so a serial clock signal SC of the same frequency as that of the read dot clock signal CKr is outputted from the read controller 230 to the address counter 203 of the VRAM 200 only during the period while the read enable X signal RENx is enabled. The address counter 203 performs a count operation synchronized with this serial clock signal SC, and the count output thereof is outputted to the SAM 202. Therefore, the sub-image data that was stored in the leading address region of the RAM 201, which was transferred from the RAM 201 at the time of input of the vertical synchronization signal VVS, is outputted from the SAM 202, and as a result, the sub-image data of the first line of the extraction region P shown in FIG. 13 is displayed on the first line of the synthesis region Q of the main image display screen shown in FIG. 12. Naturally, the selector 6 in FIG. 19 is switched to the VRAM 200 during this data read-out from the SAM 202.

Next, when the read enable X signal RENx falls to the low level, the read controller 230 generates one latch timing signal L2CK using this event as a trigger, and then outputs a data transfer command. As a result, the result of adding the zero data latched to the latch circuit 232 to the skip amount E in the skip amount register 212 is latched to the latch circuit 232, and this latched data is outputted as the read address signal RAD for data transfer. Therefore, a data transfer operation is executed in which an address advanced by an amount equal to the address corresponding to the skip amount E from the leading address of the RAM 201 is used as the read start address for data transfer, the result of which is that a data transfer operation is executed in which sub-image data corresponding to the capacity of the SAM 202 is transferred to the SAM 202 using the above-mentioned address E as the leading address.

Then, when the addresses in the X and Y directions of the inputted main image reach the second line included in the synthesis region Q, the read enable X signal RENx and read enable Y signal RENy are enabled, so the serial clock signal SC is outputted to the address counter 203 of the VRAM 200 in the same manner as above, and as a result, out of the sub-image data transferred to the SAM 202 in the previous data transfer operation, that portion that is to be displayed on the second line of the synthesis region Q of the main image display screen is serially outputted from the SAM 202. The result of this is that the sub-image data for the second line in the extraction region P shown in FIG. 13 is displayed on the second line of the synthesis region Q of the main image display screen shown in FIG. 12.

Next, when the read enable X signal RENx again falls to the low level, the read controller 230 generates one latch timing signal L2CK using this event as a trigger, and then outputs a data transfer command. As a result, the result of adding the address amount corresponding to the number of dots in the horizontal direction within the extraction region P latched by the latch circuit 232 to the skip amount E set in the skip amount register 212 is latched to the latch circuit 232. Specifically, the product of doubling the skip amount E set in the skip amount register 212 is latched. Thus, 0, E, 2E, 3E, and so on are outputted from the latch circuit 232 for the various lines. As a result, in this case, a data transfer operation is performed in which an address advanced by an amount equal to the address 2E from the leading address of the RAM 201 is used as the read start address for data transfer, the result of which is that a data transfer operation is executed in which sub-image data corresponding to the capacity of the SAM 202 is transferred from the address 2E of the RAM 201 to the SAM 202.

Then, when the addresses in the X and Y directions of the inputted main image reach the third line included in the synthesis region Q, the read enable X signal RENx and read enable Y signal RENy are enabled, so the serial clock signal SC is outputted to the address counter 203 of the VRAM 200 in the same manner as above, and as a result, out of the sub-image data transferred to the SAM 202 in the previous data transfer operation, that portion that is to be displayed on the third line of the synthesis region Q of the main image display screen is serially outputted from the SAM 202. The result of this is that the sub-image data for the third line in the extraction region P shown in FIG. 13 is displayed on the third line of the synthesis region Q of the main image display screen shown in FIG. 12.

This operation is executed repeatedly so that the sub-image in the extraction region P is superimposed over the specific synthesis region Q of the display screen.

Next, the write and read operations with reduction processing in the embodiment of FIG. 19 will be described.

First, the write operation will be described.

When the reduction is to 1/M, the write controller 211 sets an address amount corresponding to E/M in the skip amount register 212. Also, the enable signal EN outputted from the AND circuit 219 in FIG. 22 goes to the H level once for every M times the write dot clock signal CKw is outputted. The output WEN of the AND circuit 218 goes to H once for every M lines when the inputted sub-image data is in the period included in the extraction region P of FIG. 13, so the latch timing signal L1CK and the load signal Load outputted from the address counter control circuit 220 are each generated as one pulse at the point of the fall of the above-mentioned WEN signal which goes to H once for every M lines.

First, the reduced write processing of the base fields will be described.

Since the vertical synchronization signal NVS is inputted prior to the input of the sub-image of the base fields, the address counter 215 is reset during the synchronization interval of this vertical synchronization signal NVS. Therefore, the write address signal WAD outputted from the address counter 215 at this point specifies the leading address region of the RAM 201.

After this, the following reduced write processing is performed so that the Y address of the sub-image of the inputted base fields will be included in the extraction region P.

For the X direction, the enable signal EN outputted from the AND circuit 219 in FIG. 22 goes to H just once for every M times the write dot clock signal CKw is outputted, so the address counter 215 performs its count operation just once for M cycles of the write dot clock signal CKw, and the count output thereof is outputted as the write address signal WAD to the VRAM 200. The write control signal outputted from the write controller 211 is also outputted to the VRAM 200 just once for every M cycles of the write dot clock signal CKw. Therefore, only one dot for every M dots of the inputted sub-image data is extracted and stored in the RAM 201.

For the Y direction, the output WEN of the AND circuit 218 goes to H just once for every M lines, which results in the enable signal EN outputted from the AND circuit 219 in FIG. 22 also going to H just once for every M lines. Therefore, if we focus on the Y direction, the address counter 215 performs one count operation for every M lines, and the count output thereof is outputted as the write address signal WAD to the VRAM 200. The write control signal outputted from the write controller 211 is also outputted to the VRAM 200 just once for every M lines. Therefore, only one line of the inputted sub-image data is extracted and stored in the RAM 201 for every M lines.

In this way, reduced write processing is performed in the X and Y directions.

As discussed above, during this reduced write processing, the WEN signal outputted from the AND circuit 218 in FIG. 22 goes to H just once for every M lines during the period when the address of the inputted sub-image data is included in the extraction region P in FIG. 13, so the latch timing signal L1CK and load signal Load outputted from the address counter control circuit 220 are each generated as one pulse at the point of the fall of the above-mentioned WEN signal which goes to H once for every M lines.

Since, as mentioned above, the address amount corresponding to E/M is set to the skip amount register 212 during reduction processing, the result of adding the final count of the previous count operation of the address counter 215 to the setting E/M of the skip amount register 211 is latched to the latch circuit 214 at the point when the latch timing signal L1CK is outputted, and this latched data is loaded as the initial count to the address counter 215. Therefore, the write address signal WAD outputted from the address counter 215 is skipped by E/M, and as a result the above-mentioned address skipping of the VRAM 200 is performed. Specifically, this processing reserves an address region for storing one line of the reduced image within the extraction region P of the next non-base field.

As a result of the above processing, an image that has been reduced on the base field side out of the sub-image of the extraction region P is stored in alternating address regions of the VRAM 200.

Next, the reduced write processing in the non-base fields will be described.

In the case of the non-base fields, as discussed above, the above-mentioned address skipping is performed upon completion of the synchronization interval of the vertical synchronization signal NVS, which results in the write address signal WAD to the VRAM 200 being offset from the leading address by the address E/M set in the skip amount register 212. The other processing is the same as in the operation during the reduced writing of the base fields as discussed above, and this processing results in reduced images of the non-base fields being written to the address regions emptied in the course of the previous write operation for the base fields.

As a result, a reduced interlaced image can be stored in a continuous address region of the one VRAM 200 in the order of the non-interlaced scan lines.

The read operation will now be described.

In the case of the read operation of reduction processing, and the only difference from the above-mentioned read operation at full scale is that the size of the synthesis region Q is reduced according to the reduced image by setting the address settings of the display start address register SVx, display end address register EVx, display start address register SVy, and display end address register EVy shown in FIG. 8, or the display start X address register 61, display end X address register 64, display start Y address register 66, and display end Y address register 69 shown in FIG. 17 according to Formulas 4 to 7 or 12 as given above, and the reduced sub-image in the extraction region P is superimposed over the display screen of the display 1 by performing the above-mentioned data transfer from the RAM 201 to the SAM 202 and performing serial data output from the SAM 202.

Next, the write and read operations with magnification in the embodiment of FIG. 19 will be described.

The write operation with magnification is the same as the write operation at full scale, and redundant description will be omitted.

When magnified to a scale of M, the address settings of the display start address register SVx, display end address register EVx, display start address register SVy, and display end address register EVy shown in FIG. 8, or the display start X address register 61, display end X address register 64, display start Y address register 66, and display end Y address register 69 shown in FIG. 17 are set so as to satisfy the following in FIGS. 12 and 13.

$$M(XM2-XM1)=X2-X1$$

$$M(YM2-YM1)\leq Y2-Y1$$

In the case of magnification to a scale of M, the serial clock signal SC, which is produced by dividing the read dot clock signal CKr read out from the read controller 230 to a frequency of 1/M, is outputted, and one pulse of the latch timing signal L2CK is generated for every M scan lines of the main image. The data transfer command is generated once during the period from the completion of the reading of the sub-image data for a given line included in the synthesis region Q until the beginning of the reading of the sub-image data for the next line included in the synthesis region Q, regardless of whether the processing is full-scale, reduced, or magnified.

First, the vertical synchronization signal VVS of the main image is inputted prior to the input of one frame of main image data. The latch circuit 232 is reset by the synchronization interval of this vertical synchronization signal VVS. Therefore, at this point the leading address region of the RAM 201 is specified as the read address signal RAD for data transfer. Using the completion of the interval in which this vertical synchronization signal VVS is synchronized as a trigger, the read controller 230 switches the selector 240 to the read address signal RAD side, switches the selector 6 in FIG. 19 to the VRAM 200 side, and outputs a data transfer command one time to the RAM 201 when writing to the VRAM 200 is not being performed. As a result, a data transfer operation is performed in which the leading address of the RAM 201 is used as the read start address for transferring data, and this results in a data transfer operation being executed in which sub-image data corresponding to the capacity of the SAM 202 is transferred from the leading address of the RAM 201 to the SAM 202.

After this, the main image of the various lines is successively inputted along with the horizontal synchronization signal VHS for every line, but the latch timing signal L2CK, the serial clock signal SC, and a new data transfer command are not outputted from the read controller 230 and no read operation is performed until the address in the Y direction of the inputted main image is in the area included in the synthesis region Q.

Then, when the addresses in the X and Y directions of the inputted main image reach the first line, the read enable X signal RENx and read enable Y signal RENy are enabled, so a serial clock signal SC produced by dividing the read dot clock signal CKr to a frequency of 1/M is outputted from the read controller 230 to the address counter 203 of the VRAM 200 only during the period while the read enable X signal RENx is enabled. The address counter 203 performs a count operation synchronized with this serial clock signal SC, and the count output thereof is outputted to the SAM 202. Therefore, the sub-image data that was stored in the leading address region of the RAM 201, which was transferred from the RAM 201 at the time of input of the vertical synchronization signal VVS, is outputted from the SAM 202 at a frequency of 1/M the full-scale mode. Meanwhile, since the display 1 in FIG. 19 performs scanning in the X direction synchronously with the read dot clock signal CKr, the same pixel data ends up being displayed continuously for M times in the X direction, which results in a magnification to M times in the X direction. Thus, the sub-image data of the first line in the extraction region P shown in FIG. 13 is displayed magnified M times on the first line of the synthesis region Q set for magnification use on the main image display screen shown in FIG. 12.

Next, when the read enable X signal RENx falls to the low level, the read controller 230 outputs a data transfer command using this event as a trigger. Here, one pulse of the latch timing signal L2CK is not generated, and the latch circuit 232 remains reset. As a result, the sub-image data that was stored in the leading address region of the RAM 201 is transferred again to the SAM 202, and the address counter 203 is reset.

Then, when the addresses in the X and Y directions of the inputted main image reach the second line included in the synthesis region Q set for magnification, the same operation as discussed above is again executed, and the sub-image data stored in the leading address region of the RAM 201 stored in the SAM 202 is outputted at a frequency of 1/M of the full-scale mode. Thus, the sub-image data of the first line of the extraction region P shown in FIG. 13 is magnified M times and displayed on the second line of the synthesis region Q set for magnification on the main image display screen shown in FIG. 12.

This processing is executed repeatedly for the first to Mth lines included in the synthesis region Q set for magnification, and as a result the sub-image data of the first line of the extraction region P shown in FIG. 13 is magnified M times in the X and Y directions.

Using the fall of the read enable X signal RENx to the low level as a trigger, the read controller 230 generates one latch timing signal L2CK when the magnification of one line of sub-image to an image of M lines is complete, and then outputs a data transfer command.

As a result, the result of adding the zero data latched to the latch circuit 232 to the skip amount E set in the skip amount register 212 is latched to the latch circuit 232, and this latched data is outputted as the read address signal RAD of data transfer. Therefore, a data transfer operation is performed in which an address advanced by the skip amount E from the leading address of the RAM 201 then is used as the read start address for data transfer.

Thereafter, the operation discussed above is executed repeatedly. As a result, the sub-image in the extraction region P is magnified M times and superimposed over the synthesis region Q set for magnification on the display screen.

Thus, in this embodiment illustrated in FIGS. 19 to 23, it is possible to display an interlaced scan sub-image superimposed over a non-interlaced scan main image screen using a single, ordinary video memory (VRAM) 200. Also, a magnified sub-image can be superimposed over a main image using the serial access memory (SAM) 202 housed in the ordinary video memory 200, so the line buffer FIFO 108 used in the embodiment of FIG. 1 can be omitted, the circuit structure thereof can be simplified, and the cost can be reduced.

In the above-mentioned embodiment of FIG. 19, data was transferred a number of times from the RAM 201 to the SAM 202 during magnification in order to reset the address counter 203, but as long as the address counter 203 can be suitably reset, the above-mentioned data transfer need only be performed once.

Also, a partial region of the sub-image was synthesized in the main image in the embodiments given above, but the entire region of the sub-image may instead be synthesized and displayed in the main image. Furthermore, the present invention may be used merely to convert an interlaced signal into a non-interlaced signal.

INDUSTRIAL APPLICABILITY

This invention is useful for application to image processing in which an interlaced sub-image is synthesized by superimposition over a non-interlaced main image.

What is claimed is:

1. An image synthesizing device with which a sub-image included in a specific extraction region of an interlaced scan sub-image composed of odd-numbered fields and even-numbered fields is synthesized and displayed within a specific display region of a non-interlaced scan main image displayed on a display, comprising:

a first frame memory with which write and read operations can be performed asynchronously and which stores data for odd-numbered fields out of the sub-image in an address region specified by an address signal;

a second frame memory with which write and read operations can be performed asynchronously and which stores data for even-numbered fields out of the sub-image in an address region specified by the address signal;

write control means for packing and sequentially storing data for odd-numbered fields out of that data within the extraction region to be synthesized out of the sub-image, in a continuous address region of the first frame memory in the order of extraction from the extraction region, and for packing and sequentially storing data for even-numbered fields out of that data within the extraction region to be synthesized out of the sub-image, in a continuous address region of the second frame memory in the order of extraction from the extraction region;

read control means for alternately reading the sub-image data stored in the first and second frame memories in the order of the address when the scanning address of the main image data corresponds to being within the display region of the main image; and selection means for selecting the main image data when the scanning address of the main image data is outside the display region of the main image, selecting the sub-image data sequentially read from the first and second frame memories when the scanning address of the main image data is within the display region of the main image, and outputting the selected data to the display.

2. The image synthesizing device according to claim 1, wherein, when the extraction region of the sub-image is reduced to a specific scale factor and synthesized and displayed in the display region of the main image, the first and second frame memories thin lines in a vertical direction to a specific scale factor when the scanning address of the sub-image data at a time of sub-image data input corresponds to the display region, and stores the sub-image data which have been inputted after being horizontally thinned out to the specific scale factor when the scanning address in the horizontal direction corresponds to the display region for each of these thinned-out lines, after which the thinned-out and stored sub-image data is continuously read out in the order of the input when the scanning address of the main image data corresponds to the display region of the main image.

3. The image synthesizing device according to claim 1, wherein a line buffer FIFO is provided with which, after the sub-image data read from the first and second frame memories has been inputted and then stored in the order of input, the stored sub-image data is read out in the order of input;

when the extraction region of the sub-image is magnified to a specific scale factor and synthesized and displayed in the display region of the main image, the first and second frame memories continuously store only that data out of the sub-image data that is within the extraction region in the inputted order, after which one line of data out of the stored sub-image data is read out at a cycle reduced to the specific scale factor with respect to a frequency of a horizontal dot clock of the main image one line at a time for a specific number of lines corresponding to the specific scale factor when the scanning address of the main image data corresponds to the display region of the main image; and the line buffer FIFO stores this one line of read sub-image data synchronously with the horizontal dot clock of the main image in the inputted order, after which the stored one line of sub-image data is repeatedly outputted for each line in the input order for remaining lines of the specific lines corresponding to the specific scale factor of the display region of the main image data.

4. The image synthesizing device according to claim 3, wherein the line buffer FIFO stores one line of the sub-image data read from the first and second frame memories at a cycle reduced to the specific scale factor with respect to the frequency of the horizontal dot clock of the main image in the inputted order, after which one line of the stored sub-image data is read out at a cycle reduced to the specific scale factor with respect to the frequency of the horizontal dot clock of the main image in the inputted order for the remaining lines of the specific lines corresponding to the specific scale factor of the display region of the main image data, and is repeatedly outputted for each line.

5. An image conversion device which converts interlaced scan image signals composed of odd-numbered fields and even-numbered fields into non-interlaced scan image signals, comprising:

one serial access memory with which write and read operations can be performed asynchronously and which sequentially stores interlaced scan image signals in an address region incremented synchronously with inputted clock signals;

write clock formation means for extracting control-use synchronization signals from inputted interlaced scan image signals and forming write-use clock signals with respect to the serial access memory on the basis of the extracted signals;

high-speed clock signal generation means for generating high-speed clock signals with a higher frequency than the write-use clock signals;

first write control means for storing the image data of one of the fields in an intermittent address region of the serial access memory corresponding to an order of lines in the one field by alternately executing a first operation, in which one line of interlaced scan image data is written while the write address of the serial access memory is incremented synchronously with the write-use clock signals when image data of one of the fields of the interlaced scan image signals has been inputted, and a second operation, in which the write address of the serial access memory is incremented by an amount equal to the address region corresponding to one line of image data synchronously with the high-speed clock signals without data writing being performed, with a specific address of the serial access memory serving as a first origin address;

second write control means for storing, corresponding to an order of lines in the other field, image data of the other field in empty address regions formed between the address regions where the image of the lines of the one field of the serial access memory is stored by alternately executing a third operation, in which one line of interlaced scan image data is written while the write address of the serial access memory is incremented synchronously with the write-use clock signals when image data of the other field of the interlaced scan image signals has been inputted, and a fourth operation, in which the write address of the serial access memory is incremented by an amount equal to the address region corresponding to one line of image data synchronously with the high-speed clock signals without data writing being performed, with a second origin address advanced by an address region corresponding to one line of image data from the first origin address serving as the origin; and read control means for reading, in the address order from the first origin address, the interlaced scan image data stored in the serial access memory by the first and second write control means;

and wherein one frame of interlaced scan image signals are packed and stored in a continuous address region of the serial access memory.

6. An image synthesizing device with which a sub-image included in a specific extraction region of an interlaced scan sub-image composed of odd-numbered fields and even-numbered fields is synthesized and displayed within a specific display region on a display screen on which a non-interlaced scan main image is displayed, comprising:

one serial access memory with which write and read operations can be performed asynchronously and which sequentially stores sub-image signals in an address region which is advanced synchronously with inputted clock signals;

write clock formation means for extracting control-use synchronization signals from inputted sub-image signals and forming write-use clock signals with respect to the serial access memory on the basis of the extracted signals;

high-speed clock signal generation means for generating high-speed clock signals with a higher frequency than the write-use clock signals;

first write control means for storing the image data to be displayed in the display region of one of the fields out of the sub-image signals in an intermittent address region of the serial access memory corresponding to an order of lines in the one field by alternately executing a first operation, in which one line of data to be displayed in the display region of the one field is written while the write address of the serial access memory is incremented synchronously with the write-use clock signals when an image of the one field has been inputted and when the sub-image included in the specific extraction region has been inputted, and a second operation, in which the write address of the serial access memory is incremented by an amount equal to the address region corresponding to one line of sub-image data to be displayed in the display region synchronously with the high-speed clock signals without data writing being performed, with a specific address of the serial access memory serving as a first origin address;

second write control means for storing, corresponding to an order of lines in the other field out of the sub-image signals, the image data to be displayed in the display region of the other field in empty address regions formed between the address regions where the image of the lines of the one field of the serial access memory is stored by alternately executing a third operation, in which one line of data to be displayed in the display region of the other field is written while the write address of the serial access memory is incremented synchronously with the write-use clock signals when an image of the other field has been inputted and when the sub-image included in the specific extraction region has been inputted, and a fourth operation, in which the write address of the serial access memory is incremented by an amount equal to the address region corresponding to one line of sub-image data to be displayed in the display region synchronously with the high-speed clock signals without data writing being performed, with an origin address being a second origin address advanced from the first origin address by an amount equal to the address region corresponding to one line of image data to be displayed in the display region;

read control means for reading, in the address order from the first origin address, the sub-image data stored in the serial access memory by the first and second write control means when the scanning address of the main image is an address corresponding to the specific display region; and switching means for selecting the main image when the scanning address of the main image is not an address corresponding to the specific display region, and selecting and outputting the sub-image outputted from the serial access memory when the scanning address of the main image is an address corresponding to the specific display region;

and wherein one frame of interlaced scan image signals are packed and stored in a continuous address region of the serial access memory.

7. The image synthesizing device according to claim 6, further comprising:

reduction factor setting means for setting a reduction factor of the sub-image; and display region setting means for setting a reduction of the display region in which the sub-image is displayed on the display screen according to the reduction factor set by the reduction factor setting means;

wherein the first write control means, in a course of the execution of the first operation, thins the sub-image of one of the fields included in the specific extraction region in a main scanning direction and a sub-scanning direction according to the set reduction factor, and in a course of the execution of the second operation, increments the write address of the serial access memory by an amount equal to the address region corresponding to one line of reduced sub-image data to be displayed in the display region;

the second write control means, in a course of the execution of the third operation, thins the sub-image of the other field included in the specific extraction region in the main scanning direction and the sub-scanning direction according to the set reduction factor, and in a course of the execution of the fourth operation, increments the write address of the serial access memory by an amount equal to the address region corresponding to one line of reduced sub-image data to be displayed in the display region, and alternately executes these third and fourth operations, with the second origin address being an address advanced from the first origin address by an amount equal to the address region corresponding to one line of reduced image data to be displayed in the display region;

the read control means reads the sub-image data stored in the serial access memory by the first and second write control means in the address order from the first origin address when the scanning address of the main image is an address corresponding to the display region reduced by the display region setting means; and the switching means selects the main image when the scanning address of the main image is not an address corresponding to the display region reduced by the display region setting means, and selects and outputs the sub-image outputted from the serial access memory when the scanning address of the main image is an address corresponding to the display region reduced by the display region setting means.

8. An image conversion device which converts interlaced scan image signals composed of odd-numbered fields and even-numbered fields into non-interlaced scan image signals, comprising:

one video memory with which write and read operations can be performed asynchronously and which sequentially stores interlaced scan image signals in an address region corresponding to inputted address signals;

first write control means for storing the image data of one of the fields in an intermittent address region of the video memory corresponding to an order of lines in the one field by alternately executing a first operation, in which one line of interlaced scan image data is written while the write address of the video memory is advanced when image data of one of the fields of the interlaced scan image signals has been inputted, and a second operation, in which the write address of the video memory is skipped by an amount equal to the address region corresponding to one line of image data without data writing being performed, with a specific address of the video memory serving as a first origin address;

second write control means for storing, corresponding to an order of lines in the other field out of the sub-image signals, image data of the other field in empty address regions formed between the address regions where the image of the lines of the one field of the video memory is stored by alternately executing a third operation, in which one line of interlaced scan image data is written while the write address of the video memory is advanced when an image of the other field has been inputted, and a fourth operation, in which the write address of the video memory is skipped by an amount equal to the address region corresponding to one line of image data without data writing being performed, with the origin being a second origin address advanced from the first origin address by an amount equal to the address region corresponding to one line of image data; and read control means for reading, in the address order from the first origin address, the interlaced scan image data stored in the video memory by the first and second write control means;

and wherein one frame of interlaced scan image signals are packed and stored in a continuous address region of the video memory.

9. An image synthesizing device with which a sub-image included in a specific extraction region of an interlaced scan sub-image composed of odd-numbered fields and even-numbered fields is synthesized and displayed within a specific display region on a display screen on which a non-interlaced scan main image is displayed, comprising:

one video memory with which write and read operations can be performed asynchronously and which sequentially stores sub-image signals in an address region corresponding to inputted address signals;

first write control means for storing the image data to be displayed in the display region of one of the fields out of the sub-image signals in an intermittent address region of the video memory corresponding to an order of lines in the one field by alternately executing a first operation, in which one line of data to be displayed in the display region of the one field is written while the write address of the video memory is advanced when an image of the one field has been inputted and when the sub-image included in the specific extraction region has been inputted, and a second operation, in which the write address of the video memory is skipped by an amount equal to the address region corresponding to one line of sub-image data to be displayed in the display region without data writing being performed, with a specific address of the video memory serving as a first origin address;

second write control means for storing, corresponding to an order of lines in the other field out of the sub-image signals, image data to be displayed in the display region of the other field in empty address regions formed between the address regions where the image of the lines of the one field of the video memory is stored by alternately executing a third operation, in which one line of data to be displayed in the display region of the other field is written while the write address of the video memory is advanced when an image of the other field has been inputted and when the sub-image included in the specific extraction region has been inputted, and a fourth operation, in which the write address of the video memory is skipped by an amount equal to the address region corresponding to one line of sub-image data to be displayed in the display region without data writing being performed, with the origin being a second origin address advanced from the first origin address by an amount equal to the address region corresponding to one line of image data to be displayed in the display region;

read control means for reading, in the address order from the first origin address, the sub-image data stored in the video memory by the first and second write control means when the scanning address of the main image is an address corresponding to the specific display region; and switching means for selecting the main image when the scanning address of the main image is not an address corresponding to the specific display region, and selecting and outputting the sub-image outputted from the video memory when the scanning address of the main image is an address corresponding to the specific display region;

and wherein one frame of interlaced scan image signals are packed and stored in a continuous address region of the video memory.

10. The image synthesizing device according to claim 9, further comprising:

reduction factor setting means for setting a reduction factor of the sub-image; and display region setting means for setting a reduction of the display region in which the sub-image is displayed on the display screen according to the reduction factor set by the reduction factor setting means;

wherein the first write control means, in a course of the execution of the first operation, thins the sub-image of one of the fields included in the specific extraction region in a main scanning direction and a sub-scanning direction according to the set reduction factor, and in a course of the execution of the second operation, skips the write address of the video memory by an amount equal to the address region corresponding to one line of reduced sub-image data to be displayed in the display region;

the second write control means, in a course of the execution of the third operation, thins the sub-image of the other field included in the specific extraction region in the main scanning direction and the sub-scanning direction according to the set reduction factor, and in a course of the execution of the fourth operation, skips the write address of the video memory by an amount equal to the address region corresponding to one line of reduced sub-image data to be displayed in the display region, and alternately executes these third and fourth operations, with the second origin address being an address advanced from the first origin address by an amount equal to the address region corresponding to one line of reduced image data to be displayed in the display region;

the read control means reads the sub-image data stored in the video memory by the first and second write control means in the address order from the first origin address when the scanning address of the main image is an address corresponding to the display region reduced by the display region setting means; and the switching means selects the main image when the scanning address of the main image is not an address corresponding to the display region reduced by the display region setting means, and selects and outputs the sub-image outputted from the video memory when the scanning address of the main image is an address corresponding to the reduced display region.

11. The image synthesizing device according to claim 9, wherein the video memory comprises:

random access memory means allowing write and read operations to be performed asynchronously and for sequentially storing sub-image signals written by the first and second write control means;

serial access memory means for temporarily storing at least one line of sub-image signals by data transfer from the random access memory means; and first read control means for performing data read control from the serial access memory means on the basis of inputted serial clock signals;

read clock formation means is provided for extracting control-use synchronization signals from inputted main image signals and forming read-out clock signals with respect to the video memory on the basis of the extraction signals;

the display screen on which the main image is displayed performing a display operation synchronously with the read clock signals;

magnification factor setting means is provided for setting a magnification factor M; and display region setting means is provided for setting the magnification of the display region in which the sub-image is displayed on the display screen according to the magnification factor M set by the magnification factor setting means;

the read control means comprises:

address generation means for generating addresses increased by an amount of address skipped by the first and second write control means once for every M-number of sub-scans of the main image, with an initial value being the first origin address of the random access memory means;

second read control means for causing the data transfer to be performed, with an output address of the address generation means being a transfer start address, at least once for every M-number of sub-scans of the main image when the sub-scanning address of the main image is an address corresponding to the display region magnified by the display region setting means;

main scanning direction magnification means for causing data corresponding to the amount of address skipped by the second write control means to be outputted at a frequency of 1/M that of the read clock signals out of the sub-image signals stored temporarily in the serial access memory means when the scanning address of the main image is an address corresponding to the display region magnified by the display region setting means; and sub-scanning direction magnification means for outputting the sub-image signals temporarily stored in the serial access memory means continuously for M times and synchronously with the sub-scanning of the main image when the scanning address of the main image is an address corresponding to the display region magnified by the display region setting means;

and wherein the switching means selects the main image when the scanning address of the main image is not an address corresponding to the display region magnified by the display region setting means, and selects and outputs the sub-image outputted from the video memory when the scanning address of the main image is an address corresponding to the display region magnified by the display region setting means.

12. An image synthesizing device with which a sub-image included in a specific extraction region of a sub-image is synthesized and displayed within a specific display region of a main image displayed on a display, comprising:

a frame memory with which write and read operations can be performed asynchronously and which stores sub-image data in an address region specified by an address signal, and when the extraction region of the sub-image is reduced to a specific scale factor and synthesized and displayed in the display region of the main image, the frame memory thins lines in a vertical direction to a specific scale factor when the scanning address of the sub-image data at a time of sub-image data input corresponds to the display region, and stores the sub-image data which have been inputted after being horizontally thinned out to the specific scale factor when the scanning address in the horizontal direction corresponds to the display region for each of these thinned-out lines, after which the thinned-out and stored sub-image data is continuously read out in the order of the input when the scanning address of the main image data corresponds to the display region of the main image;

write control means for packing and sequentially storing that data within the extraction region to be synthesized out of the sub-image, in a continuous address region of the frame memory in an order of extraction from the extraction region;

read control means for sequentially reading the sub-image data stored in the frame memory in an order of the address when a scanning address of the main image data corresponds to being within the display region of the main image; and selection means for selecting the main image data when the scanning address of the main image data is outside the display region of the main image, selecting the sub-image data sequentially read from the frame memory when the scanning address of the main image data is within the display region of the main image, and outputting the selected data to the display.

13. An image synthesizing device with which a sub-image included in a specific extraction region of a sub-image is synthesized and displayed within a specific display region of a main image displayed on a display, comprising:

a frame memory with which write and read operations can be performed asynchronously and which stores sub-image data in an address region specified by an address signal;

write control means for packing and sequentially storing that data within the extraction region to be synthesized out of the sub-image, in a continuous address region of the frame memory in an order of extraction from the extraction region;

read control means for sequentially reading the sub-image data stored in the frame memory in an order of the address when a scanning address of the main image data corresponds to being within the display region of the main image;

selection means for selecting the main image data when the scanning address of the main image data is outside the display region of the main image, selecting the sub-image data sequentially read from the frame memory when the scanning address of the main image data is within the display region of the main image, and outputting this selected data to the display; and a line buffer FIFO is provided with which, after the sub-image data read from the frame memory has been inputted and then stored in the order of input, the stored sub-image data is read out in the order of input;

wherein, when the extraction region of the sub-image is magnified to a specific scale factor and synthesized and displayed in the display region of the main image, the frame memory continuously stores only that data out of the sub-image data that is within the extraction region in the inputted order, after which one line of data out of the stored sub-image data is read out at a cycle reduced to the specific scale factor with respect to a frequency of a horizontal dot clock of the main image one line at a time for a specific number of lines corresponding to the specific scale factor when the scanning address of the main image data corresponds to the display region of the main image; and the line buffer FIFO stores this one line of read sub-image data synchronously with the horizontal dot clock of the main image in the inputted order, after which the stored one line of sub-image data is repeatedly outputted for each line in the input order for remaining lines of the specific lines corresponding to the specific scale factor of the display region of the main image data.

* * * * *